United States Patent
Sato et al.

(10) Patent No.: US 6,416,922 B2
(45) Date of Patent: Jul. 9, 2002

(54) AZOMETHINE DYE PRECURSOR, IMAGE-FORMING MATERIAL, AND IMAGE-FORMING METHOD

(75) Inventors: Hiroshi Sato; Masatoshi Yumoto; Yoshimitsu Arai; Hirotaka Matsumoto, all of Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/770,281

(22) Filed: Jan. 29, 2001

(30) Foreign Application Priority Data

Jan. 27, 2000 (JP) ......................... 2000-018425

(51) Int. Cl.$^7$ ................................. G03C 1/00

(52) U.S. Cl. ............... 430/138; 430/280.1; 430/285.1; 430/284.1; 430/281.1; 430/283.1; 430/944; 430/287.1; 430/292; 430/333; 430/334; 430/336; 430/332; 430/341; 430/343; 540/488; 540/489; 540/500; 544/3; 544/70; 544/184; 544/220; 544/281

(58) Field of Search ............... 430/138, 280.1, 430/285.1, 292, 288.1, 284.1, 287.1, 283.1, 944, 945, 333, 334, 336, 332, 339, 341, 343; 540/485, 489, 500; 544/3, 70, 184, 220, 281

(56) References Cited

U.S. PATENT DOCUMENTS

| | | | | | |
|---|---|---|---|---|---|
| 4,373,017 | A | * | 2/1983 | Masukawa et al. | 430/270 |
| 4,902,604 | A | * | 2/1990 | Yamaguchi et al. | 430/281 |
| 5,705,676 | A | * | 1/1998 | Biavaso et al. | 560/27 |
| 5,717,079 | A | * | 2/1998 | Viski et al. | 534/649 |
| 6,303,269 | B1 | * | 10/2001 | Morita et al. | 430/270.1 |

FOREIGN PATENT DOCUMENTS

| | | | |
|---|---|---|---|
| EP | 035262 | * 2/1981 | |
| JP | 3-500395 | 1/1991 | ............ B41M/5/26 |
| JP | 5-42359 | 6/1993 | ............ B41M/5/26 |
| JP | 5-148426 | 6/1993 | ............ C09B/55/00 |
| JP | 5-204087 | 8/1993 | ............ G03C/1/498 |
| JP | 8-507885 | 8/1996 | ............ G03C/8/40 |
| JP | 8-325469 | 12/1996 | ............ C09B/55/00 |
| JP | 2744101 | 2/1998 | ............ B41M/5/30 |
| JP | 10-502459 | 3/1998 | ............ G03C/8/40 |
| JP | 10-502460 | 3/1998 | ............ G03C/8/40 |
| JP | 2000-212464 | 8/2000 | ............ C09B/57/00 |

OTHER PUBLICATIONS

US Abstract No. 4,602,263, dated Jul. 22, 1986.
WO Abstract No. 90/00978, dated Feb. 8, 1990.
WO Abstract No. 94/22052, dated Sep. 29, 1994.
WO Abstract No. 96/00929, dated Jan. 11, 1996.
US Abstract No. 5,236,884, dated Aug. 17, 1993.
WO Abstract No. 96/00928, dated Jan. 11, 1996.

* cited by examiner

*Primary Examiner*—Janet Baxter
*Assistant Examiner*—Amanda C. Walke
(74) *Attorney, Agent, or Firm*—Sughrue Mion, PLLC

(57) ABSTRACT

The present invention related to an azomethine dye precursor represented by the following general formula (1) and the image-forming material and image-forming method using the azomethine dye precursor: wherein Ar represents an aryl group or a heterocyclic group which may each have a substituent; X represents a bivalent group linking a carbon atom and a nitrogen atom; and Cp represent a coupler residue which may or may not form a ring.

General formula (1)

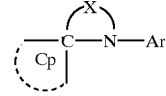

18 Claims, 1 Drawing Sheet

AZOMETHINE DYE PRECURSOR, IMAGE-FORMING MATERIAL, AND IMAGE-FORMING METHOD

BACKGROUND OF THE INVENTION

1. Field of the Invention

The present invention relates to an azomethine dye precursor as a useful novel compound.

Further, the present invention relates to a single-color or multicolor image-forming material containing the azomethine dye precursor and an image-forming method using the image-forming material.

2. Description of the Related Art

Heretofore, various dry-type image-forming methods that do not use a liquid developing agent and the like and do not produce wastes have been studied. Among these methods, a method, which uses a light-hardenable composition as a component of the image-forming layer of a recording material (an image-forming material), has been the focus of much attention.

This method is characterized in that the exposure to light causes the composition that hardens on exposure to light contained in the image-forming layer to harden and thereby form a latent image, while the component, contained in the unexposed portions of the image-forming layer which contributes to the color-developing reaction, is transferred by heat or pressure within the image-forming layer to thereby form a colored image. When a recording material based on such a method is used, the process comprises exposing the image-forming material to light through an image original to thereby form a latent image by hardening the exposed portions, and applying heat or pressure to the recording material to thereby cause the component, contained in unhardened portions (unexposed portions) and which contributes to the color development reaction, to move so as to form a visible image.

Conventionally known as such a recording material is a recording material which is disclosed in Japanese Patent Application Laid-Open (JP-A) No. 61-123838 and which is formed by laminating the following: a layer containing a photopolymerizable composition composed of a vinyl monomer having an acidic group and a photopolymerization initiator; an isolating layer; and a layer composed of an electron-donating colorless dye. In the case of this recording material, since the thermal diffusion of the acidic group does not occur in the non-image portions, i.e., portions hardened by photopolymerization, the non-image portions are free from a coloration problem. However, the problem of this recording material is that the density of the developed color is low and the durability is low.

Recording materials, in which the low density of developed color is improved, include the recording materials described in JP-A No. 3-87827 and JP-A No. 4-211252. The former is a two-component, photo- and heat-sensitive, color-developing recording material in which one of the two components is enclosed in microcapsules while the other component is contained outside the microcapsules (1) as a hardenable compound of the composition which hardens on exposure to light or (2) together with the composition which hardens on exposure to light. The latter is a photo- and heat-sensitive recording material comprising a support having thereon a layer having microcapsules enclosing an electron-donating colorless dye and a composition which hardens on exposure to light containing an electron-accepting compound, a polymerizable vinyl monomer, and a photopolymerization initiator outside the microcapsules. However, none of these two recording materials reached a fully satisfactory level in terms of durability of images because an electron-donating colorless dye, i.e., a so-called phthalide compound, was used as the dye precursor.

Likewise, recording materials, described in Japanese Patent Application Publication (JP-B) Nos. 64-7378, 64-7377, 64-7376, and so on, are known as examples of photo- and pressure-sensitive paper. However, none of these recording materials reached a fully satisfactory level in terms of durability of images because the dye precursors used in these recording materials were also phthalide compounds.

JP-B No. 5-42359 discloses a thermal image-forming method in which images can be formed by heating image-wise, a recording material having in the image - forming layer thereof a compound having a thermally unstable carbamate moiety and capable of causing an irreversible monomolecular fission, to thereby cause the compound to thermally decompose and undergo a visible change image-wise. Although a dye precursor besides a phthalide compound can also be used in this method, since the image-wise color development is carried out by heat alone, this method is associated with the following problems. The problems are that, since a large amount of heat is required when images are written, the apparatus is necessarily large and the processing speed is slow and that fogging tends to occur in non-image portions due to remaining heat or accumulated heat derived from the writing step. Another problem is a storability problem that, since the color development is controlled by heat alone, fogging tends to occur during storage.

Japanese Patent No. 2744101 describes a heat-sensitive element which forms images when heated image-wise and which comprises a dye precursor substituted by a blocking group that can be thermally removed when heated and a leaving group that irreversibly leaves when heated. This heat-sensitive element is also associated with problems similar to those of the thermal image-forming method described in JP-B No. 5-42359 because the color develop-ability is controlled by heat alone. Another problem is a storability problem that, since the developed color is not fixed, the dye precursor is gradually decomposed in the white background portions (non-image portions) and fogging tends to occur, for example, under a thermally enforced condition.

Accordingly, a dye precursor, which develops color by an element other than heat or by the action of heat and an element other than heat, is desired.

Further, JP-A No. 5-204087, PCT National Publication No. 8-507885, and PCT National Publication No. 10-502460 disclose photo- and heat-sensitive photographing materials using dye precursors. However, since these materials use silver halides as a photosensitive material, a need exists for an image-forming material capable of forming images in a perfectly dry processing system without using silver halides (hereinafter referred to as "non-silver salt" system) from the standpoint of storability, ease in handling, etc.

SUMMARY OF THE INVENTION

An object of the present invention is to provide an azomethine dye precursor as a useful novel compound which can develop color by the action of a deblocking agent or by the action of heat and a deblocking agent and which, when used in the image-forming layer of an image-forming material, exhibits good color development by a small amount of energy and provides images having very good durability.

Another object of the present invention is to provide a single-color or multicolor image-forming material capable of forming high-quality and highly durable images in a rapid way in a perfectly dry processing system, which does not require a developing solution or the like and does not produce wastes, and to provide an image forming method using the image-forming material.

The objects described can be achieved by the present invention described below. That is, the first aspect of the present invention is an azomethine dye precursor represented by the following general formula (1):

general formula (1)

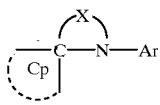

In the general formula (1), Ar represents an aromatic ring which may have a substituent or a heterocycle; and X represents a bivalent group linking a carbon atom and a nitrogen atom. Cp represent a coupler residue which may or may not form a ring.

The second aspect of the present invention is an image-forming material comprising a support having thereon an image-forming layer containing at least one deblocking agent and at least one azomethine dye precursor represented by the following general formula (1):

General formula (1)

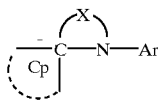

wherein Ar represents an aryl group or a heterocyclic group which may each have a substituent; X represents a bivalent group linking a carbon atom and a nitrogen atom; and Cp represent a coupler residue which may or may not form a ring.

The third aspect of the present invention is an image-forming method comprising the steps of:

(a) forming an image-forming material by disposing an image-forming layer on a support, with the image-forming layer containing at least one deblocking agent and at least one azomethine dye precursor represented by the following general formula (1):

General formula (1)

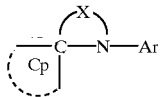

wherein Ar represents an aryl group or a heterocyclic group which may each have a substituent; X represents a bivalent group linking a carbon atom and a nitrogen atom; and Cp represent a coupler residue which may or may not form a ring;

(b) producing a visible image by heating and/or pressing the image-forming material.

The azomethine dye precursor of the present invention produces an azomethine dye (i.e., develops a color) by the action of a deblocking agent at room temperature or in a temperature range in which the azomethine dye precursor does not develop a color on its own by being heated alone unless a deblocking agent is present. The use of the azomethine dye precursor of the present invention in an image-forming layer of the image-forming material enables the image-forming material to develop a good color using a small amount of energy, imparts high sensitivity, and raises durability such as storability of the images obtained to a very good level.

Unlike an image-forming material and an image-forming method using a dye precursor which develops a color by heat alone, the image-forming material and the image-forming method of the present invention, which uses a novel azomethine dye precursor capable of developing a color when brought into contact with a deblocking agent, has a high sensitivity and can rapidly form a high-quality and highly durable image whose non-image portions are less likely to produce fogging. If necessary, at least one photopolymerization initiator and at least one polymerizable compound may be incorporated in the image-forming layer; and this incorporation enables the image-forming layer to have high sensitivity to light and to provide highly durable images having a good hue. Furthermore, if necessary, the thus-obtained image, including image portions and background portions (non-image portions), may be polymerized; and this polymerization can fix the image and thus raise the durability to a higher level.

DESCRIPTION OF THE PREFERRED EMBODIMENTS

[Azomethine Dye Precursor]

Figure 1:
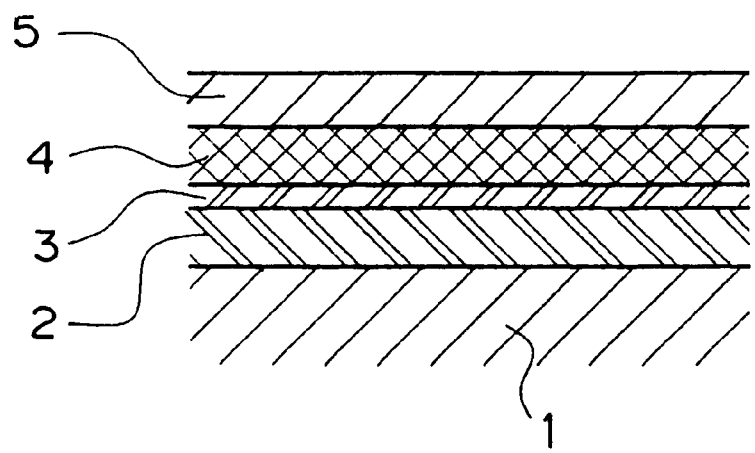
FIG. 1 is an enlarged cross-sectional view of the image-forming material prepared in the examples.

First, the azomethine dye precursor of the present invention is explained below. The azomethine dye precursor of the present invention is a dye precursor, which, when brought into contact with a deblocking agent, produces an azomethine dye (i.e., develops a color), and is a dye precursor represented by the following general formula (1).

General formula (1)

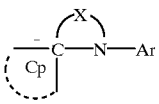

In the general formula (1), Ar represents an aryl group or a heterocyclic group which may each have a substituent; and X represents a bivalent group linking a carbon atom and a nitrogen atom. Cp represents a coupler residue which may or may not form a ring.

Ar in the general formula (1) represents an aryl group or a heterocyclic group which may each have a substituent, wherein examples of the aryl group which may have a substituent include, for example, groups represented by the following structural formula (3).

Structural formula (3)

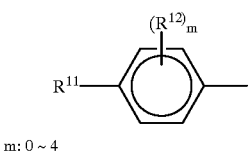

m: 0 ~ 4

In the structural formula (3), $R^{11}$ and $R^{12}$ each represents a hydrogen atom, an alkyl group, an aryl group, a halogen atom, a cyano group, a nitro group, $SO_3H$, a heterocyclic group, $NR^{13}R^{14}$, $OR^{15}$, $CO_2H$, $SR^{15}$, $COR^{16}$, $CO_2R^{16}$, $SO_2R^{16}$, $SOR^{16}$, $CONR^{17}R^{18}$. $R^{11}$ is preferably $NR^{13}R^{14}$. $R^{11}$ and $R^{12}$ may join together to form a ring. When $R^{11}$ and $R^{12}$ each has a dissociative proton such as OH, $CO_2H$, or $SO_3H$, a salt may be formed with an inorganic cation or an organic cation such as a tetraalkylammonium cation.

$R^{13}$ and $R^{14}$ each represents a hydrogen atom, an alkyl group, an aryl group, or a heterocyclic group. And the alkyl group, the aryl group, and the heterocyclic group may each have a substituent.

Preferably, $R^{13}$ and $R^{14}$ are each a hydrogen atom, an alkyl group having 1 to 30 carbon atoms, and an aryl group having 6 to 20 carbon atoms. Specific examples of $R^{13}$ and $R^{14}$ include hydrogen, methyl, ethyl, propyl, butyl, octyl, octadecyl, hydroxyethyl, methanesulfonylaminoethyl, phenoxyethyl, cyanoethyl, benzoyloxyethyl, cyclohexyl, phenyl, tolyl, methoxyphenyl, and benzyl.

$NR^{13}R^{14}$ may form a ring which may contain a heteroatom such as O, S, N by $R^{13}$ and $R^{14}$, or the like, or otherwise may form a ring together with the phenyl ring by which $NR^{13}R^{14}$ is substituted.

$R^{15}$ represents a hydrogen atom, $COR^{16}$, $CO_2R^{16}$, $SO_2R^{16}$, $CONR^{17}R^{18}$, an alkyl group, or an aryl group; and $R^{16}$ represents a hydrogen atom, an alkyl group, an aryl group, or a heterocyclic group. $R^{17}$ and $R^{18}$ each represents a hydrogen atom, an alkyl group, an aryl group, or a heterocyclic group. $R^{15}$ is preferably a hydrogen atom, $COR^{16}$, $CO_2R^{16}$, $SO_2R^{16}$, $CONR^{17}R^{18}$, an alkyl group, or an aryl group, each having 1 to 40 carbon atoms. Specific examples of $R^{15}$ include hydrogen atom, methyl, ethyl, octyl, benzyl, phenyl, acetyl, benzoyl, ethoxycarbonyl, phenylsulfonyl, and dibutylaminocarbonyl.

The above-mentioned $SO_3H$, $CO_2H$, and OH may be in salt form.

The alkyl group, the aryl group, and the heterocyclic group listed as $R^{11}$~$R^{18}$ in the general formula (1) may have substituents. Examples of the substituents include an alkyl group, an aryl group, a hydroxyl group, a nitro group, a cyano group, a halide group, an alkylsulfonyl group, an arylsulfonyl group, an alkoxycarbonyl group, an aryloxycarbonyl group, an acyl group, an amino group, an alkylamino group, a dialkylamino group, an acylamino group, an alkylsulfonylamino group, an arylsulfonylamino group, a carbamoyl group, a sulfamoyl group, an alkylthio group, an arylthio group, a heterocyclic group, an arylamino group, a diarylamino group, an arylalkylamino group, an alkoxy group, and an aryloxy group.

Examples of the heterocyclic group of Ar as an heterocyclic group which may have a substituent in the general formula (1) include pyridine, pyrimidine, triazine, pyridazine, pyrazine, furan, thiophene, pyrrole, pyrazole, triazole, isooxazole, isothiazole, imidazole, oxazole, thiazole, and tetrazole. Examples of the substituents include those illustrated by $R^{11}$ and $R^{12}$ described previously.

In the general formula (1), Ar may be fused with an aromatic ring or a heterocycle. The alkyl group included in Ar may or may not be saturated, or otherwise may be a ring.

Cp in the general formula (1) represents a coupler residue. As these couplers, all couplers known in the field of silver salt photography, diazo heat-sensitive recording materials, etc. can be used.

Examples of the couplers are described in Research Disclosure No. 17643, VII, -C~G and in Research Disclosure No. 307105, VII, -C~G. Among these couplers, preferable are non-diffusive couplers having hydrophobic groups that are called ballast groups, couplers having no hydrophobic groups, and polymerized couplers. The couplers that are preferably used in the present invention include cyan couplers, such as naphthol-based couplers, phenol-based couplers, and so on. Examples of the cyan couplers are described in U.S. Pat. Nos. 2,369,929, 2,772, 162, 2,801,171, 2,895,826, 3,446,622, 3,758,308, 3,772,002, 4,052,212, 4,126,396, 4,146,396, 4,228,233, 4,254,212, 4,296,199, 4,296,200, 4,327,173, 4,333,999, 4,334,011, 4,343,011, 4,427,767, 4,451,559, 4,690,889, and 4,775,616, German Laid-Open Patent Application No. 3,329,729, European Patent Nos. 121,365A and 249,453A, JP-A No. 61-42, 658, etc. Examples of magenta couplers include imidazole [1,2-b]pyrazoles described in U.S. Pat. No. 4,500,630 and so on, and pyrazolo[1,5-b] [1,2,4]triazoles described in U.S. Pat. Nos. 4,540,654 and so on.

Other examples include a pyrazolotriazole coupler described in JP-A No. 61-65,245 in which a branched alkyl group is linked directly to a 2-, 3-, or 6-position of the pyrazolotriazole ring; a pyrazoloazole coupler described in JP-A No. 61-65,245 which contains in the molecule thereof a sulfonamide group; a pyrazoloazole coupler described in JP-A No. 61-147,254 which has an alkoxyphenylsulfonamide ballast group; a pyrazolotriazole coupler described in European Patent (Laid Open) Nos. 226,849 and 294,785 in which the pyrazolotriazole ring has an alkoxy or aryloxy group in a 6-position; and couplers described in U.S. Pat. Nos. 3,061,432, 3,725,067, 4,310,619, 4,351,897, and 4,556,630, European Patent No. 73,636, JP-A Nos. 55-118, 034, 60-35,730, 60-43,659, 60-185,951, and 61-72,238, International Patent Application Laid Open No. WO 88/04795, Research Disclosure No. 24220, Research Disclosure No. 24230, and so on. Examples of yellow couplers include couplers described in U.S. Pat. Nos. 3,933,501, 3,973,968, 4,022,620, 4,248,961, 4,314,023, 4,326,024, 4,401,752, and 4,511,649, European Patent No. 249,473A, JP-B No. 58-10,739, U.K. Patent Nos. 1,425,020 and 1,476, 760, and so on.

Typical examples of dye-forming couplers that are polymerized are described in U.S. Pat. Nos. 3,451,820, 4,080, 211, 4,367,282, 4,409,320, and 4,576,910, European Patent No. 341,188A, U.K. Patent No. 2,102,137, and so on.

Other couplers include those described, for example, in Japanese Patent Application No. 9-260336, JP-A No. 11-116544, and so on.

Next, the linking group X in the general formula (1) is described below. Preferably, X is a bivalent group having the following structural formula.

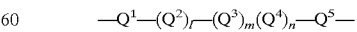

In the formula described above, $Q^1$, $Q^2$, $Q^3$, $Q^4$, and $Q^5$ are linking groups constituting X; and l, m, and n are each 0 or an integer of 1. Examples of $Q^1$, $Q^2$, $Q^3$, $Q^4$, and $Q^5$ include the following groups. $Q^1$ is on the side linked to the carbon atom while $Q^5$ is on the side linked to the nitrogen atom.

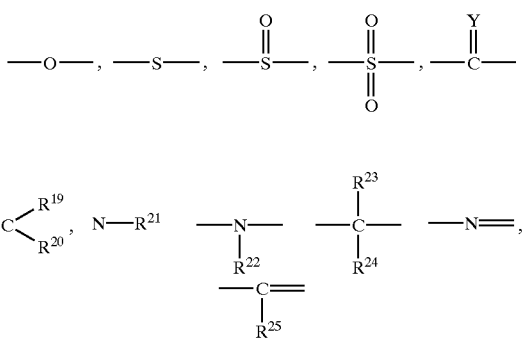

In the formulae described above, Y represents an oxygen atom or a sulfur atom.

In the formulae described above, $R^{19}$, $R^{20}$, and $R^{21}$ each represents a substituent, examples of which include the substituents listed as examples of $R^{11}$. $R^{19}$, $R^{20}$, and $R^{21}$ may each form a ring with other atoms in X.

In the formulae described above, $R^{22}$ represents a substituent, examples of which include the substituents listed as examples of $R^{11}$. $R^{22}$ may form a ring with other atoms in X.

In the formulae described above, $R^{23}$ and $R^{24}$ each represents a substituent, examples of which include the substituents listed as examples of $R^{11}$. $R^{23}$ and $R^{24}$ may each form a ring with other atoms in X.

In the formulae described above, $R^{25}$ represents a substituent, examples of which include the substituents listed as examples of $R^{11}$. $R^{25}$ may form a ring with other atoms in X.

In the formula described above, $Q^1$, $Q^2$, $Q^3$, $Q^4$, and $Q^5$ may each independently form an aryl group or a heterocyclic group (i.e., a so-called arylene group or a bivalent heterocyclic group). Examples of the aryl group include a phenyl group, a chlorophenyl group, a methoxyphenyl group, a naphthyl group, and the like. Examples of the heterocyclic group include pyrazole, imidazole, triazole, tetrazole, pyridine, pyrimidine, triazine, pyridazine, pyrazine, furan, thiophene, pyrrole, isooxazole, isothiazole, oxazole, thiazole, and the like. The aryl group and the bivalent heterocyclic group may have in any position thereof the linking bonds. The aryl group and the heterocyclic group may each have a substituent. Examples of the substituent group include an alkyl group, an aryl group, a hydroxyl group, a nitro group, a cyano group, a halide group, an alkylsulfonyl group, an arylsulfonyl group, an alkoxycarbonyl group, an aryloxycarbonyl group, an acyl group, an amino group, an alkylamino group, a dialkylamino group, an acylamino group, an alkylsulfonylamino group, an arylsulfonylamino group, a carbamoyl group, a sulfamoyl group, an alkylthio group, an arylthio group, a heterocyclic group, an alkoxy group, and an aryloxy group. The aryl group may be fused with a heterocycle; and the heterocyclic group may be fused with an aromatic ring. The linkage may be at any position on the ring of the aryl group or of the heterocyclic group.

In the formula described above, the heterocyclic rings in $Q^1$, $Q^2$, $Q^3$, $Q^4$, and $Q^5$ may each form a salt such as a sulfonium salt, an oxonium salt, or a quaternary salt.

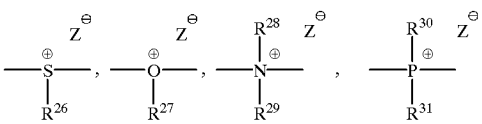

In the formulae described above, $R^{26}$~$R^{31}$ represent alkyl groups and aryl groups, examples of which include the alkyl groups and aryl groups listed as examples of $R^{13}$ and $R^{14}$. $Z^-$ represents an anion. The anion may be an inorganic anion or an organic anion. Examples of the inorganic anion include a hexafluorophosphate ion, a hydrogenfluoride ion, a chloride ion, a bromide ion, a hydrogensulfate ion, and so on. Examples of the organic anion include a polyfluoroalkylsulfonate ion, a polyfluoroalkylcarbonate ion, a tetraphenylborate ion, an aromatic carboxylate ion, an aromatic sulfonate ion, and so on.

In the general formula (1), the ring formed by X, N, and C is preferably a 5~7-membered ring and more preferably a 6-membered ring or a 7-membered ring. More preferably, Ar has the following structure. More preferably, Cp is an acylacetanilide, a pyrazolotriazole, a pyrazolone, a pyridone, a barbituric acid, a pyrrolotriazole, a naphthol, a phenol, or an imidazole. $Q^1$ in X is more preferably —O—, —S—, —N($R^{22}$)—, —N=, or a bivalent heterocycle. $Q^5$ is more preferably —C(=O)— or —SO$_2$—. A combination of the foregoing is particularly preferable.

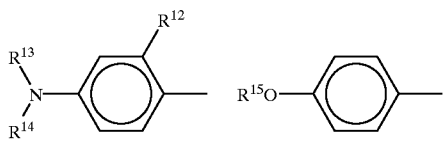

Specific examples of the azomethine dye precursors represented by the general formula (1) are given below. However, it should be noted that the present invention is not limited to these examples.

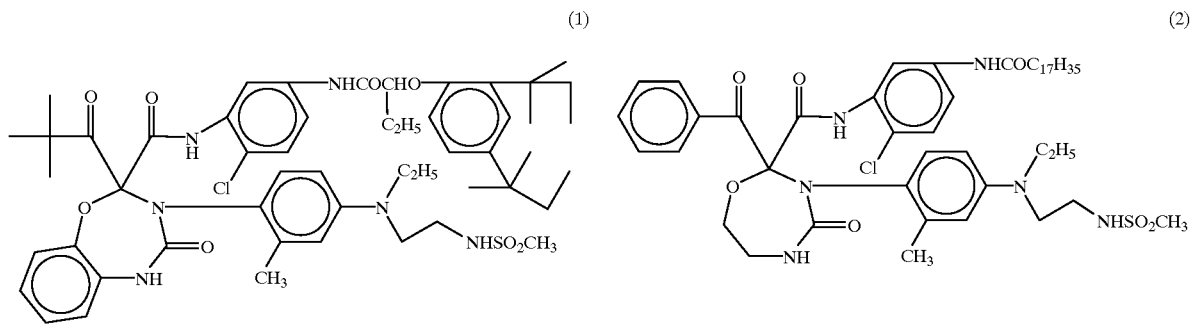

-continued
(3)
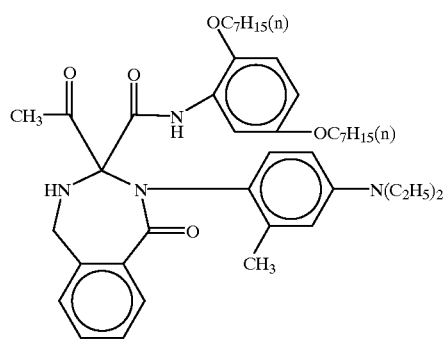
(4)
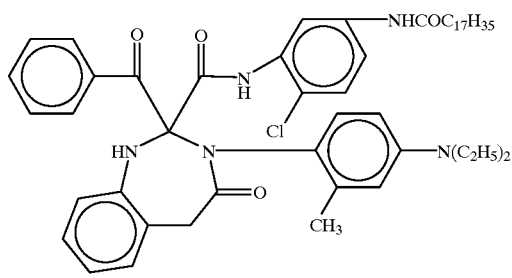
(5)
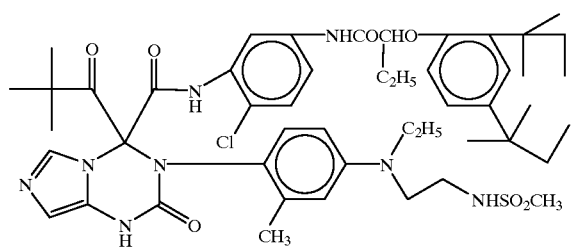
(6)
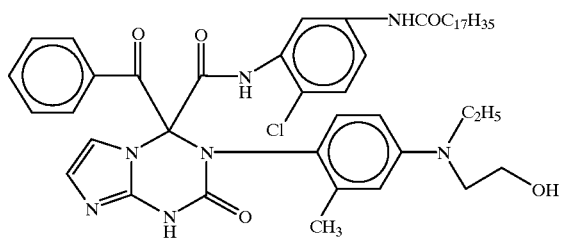
(7)
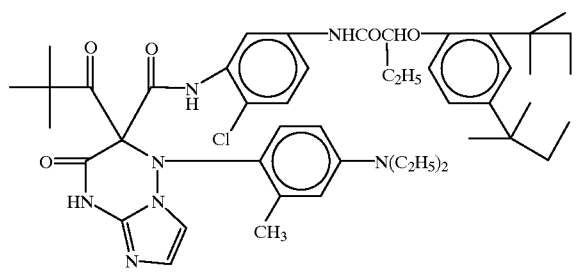
(8)
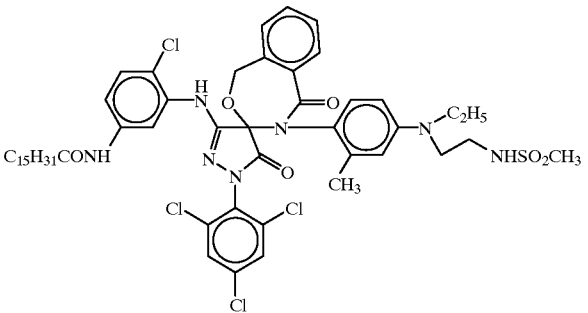
(9)
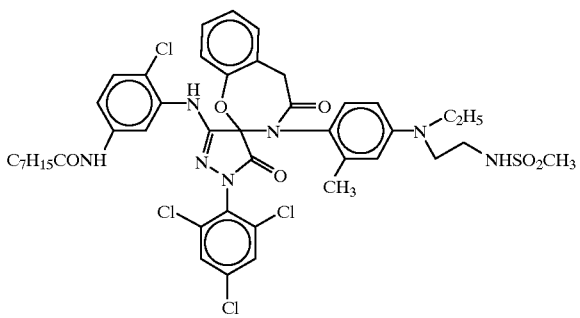
(10)
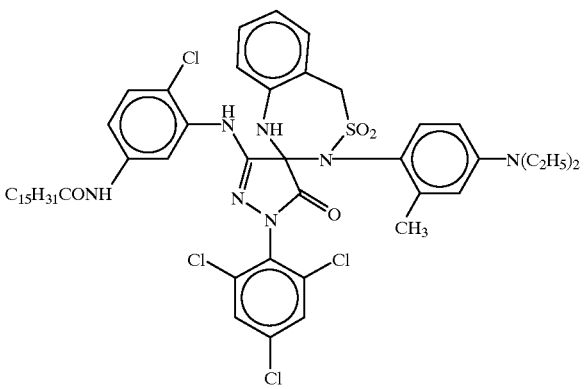

(11)
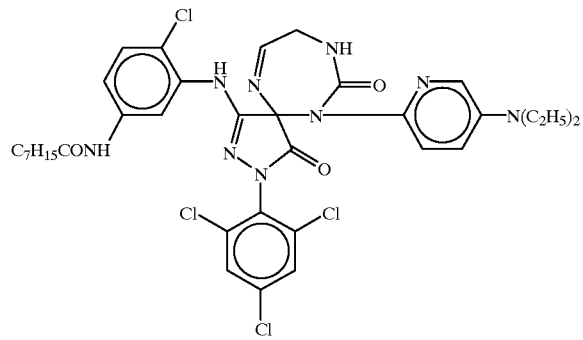
(12)
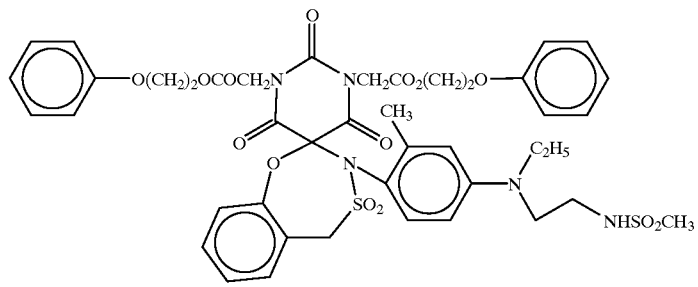
(13)
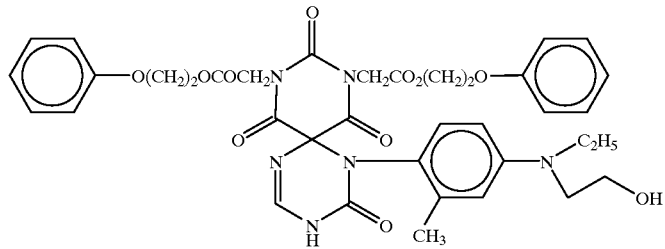
(14)
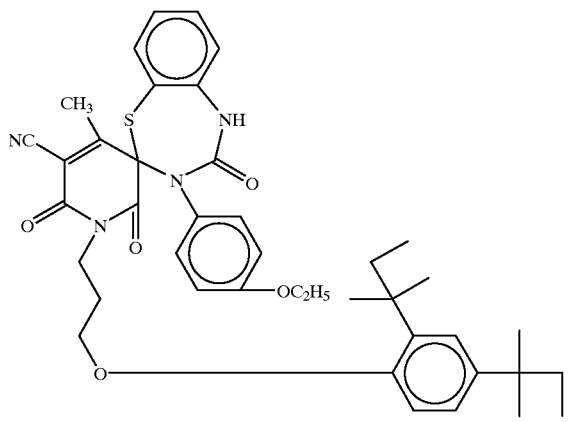
(15)
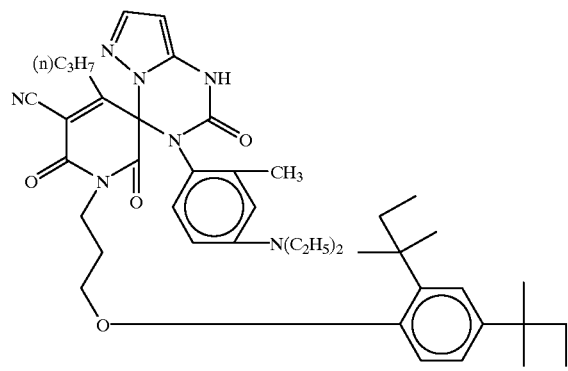

-continued
(16)
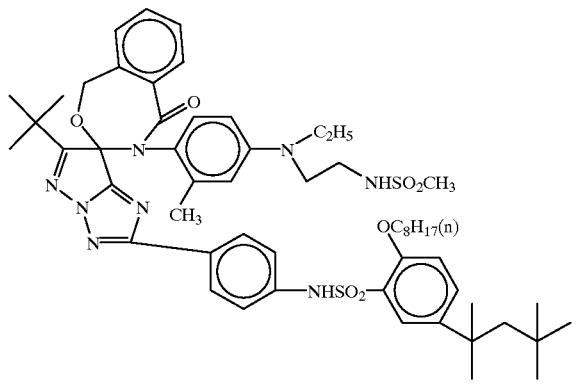
(17)
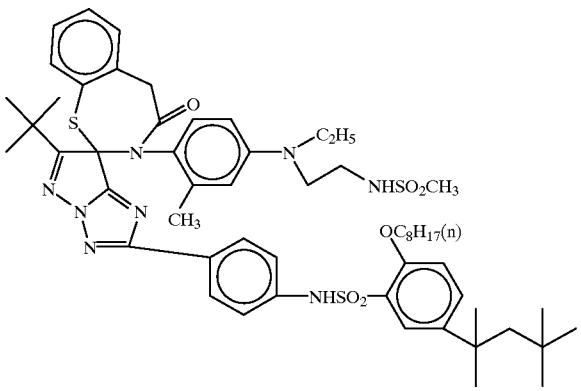
(18)
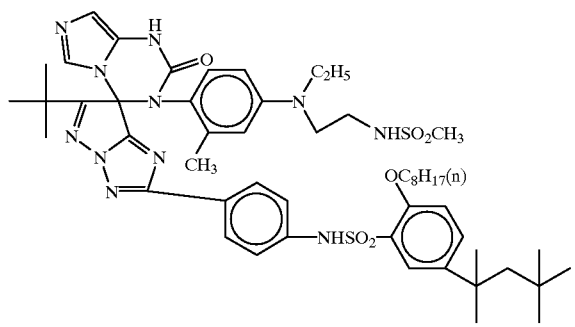
(19)
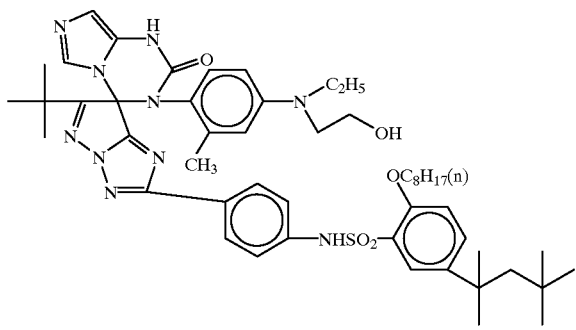
(20)
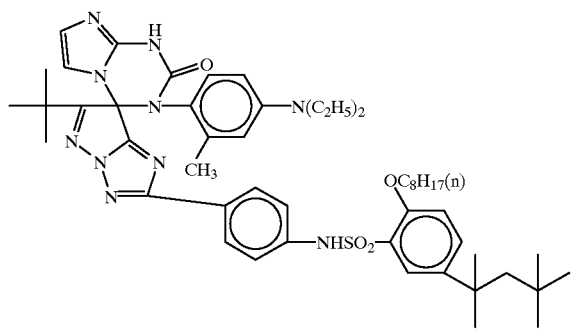
(21)
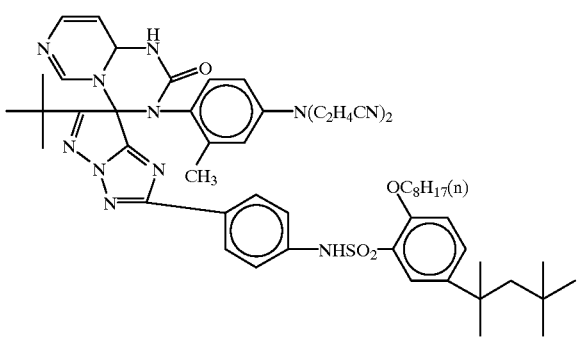
(22)
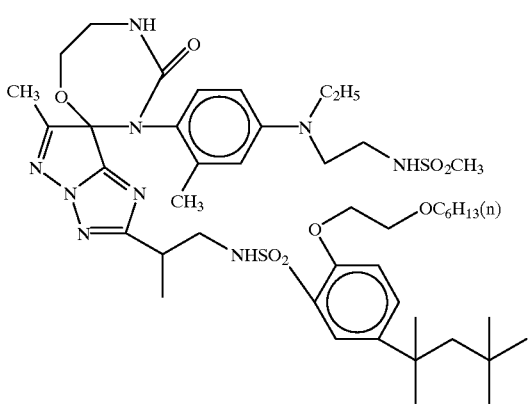
(23)
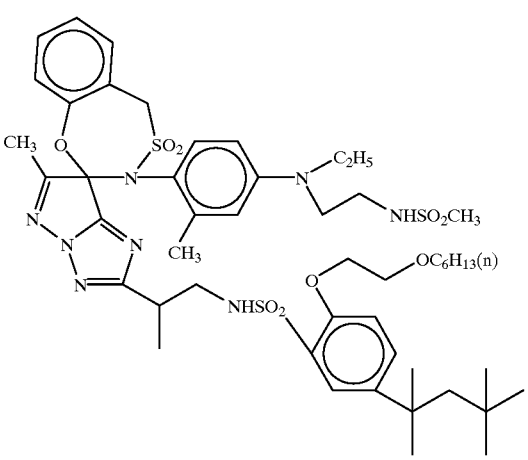

-continued
(24)
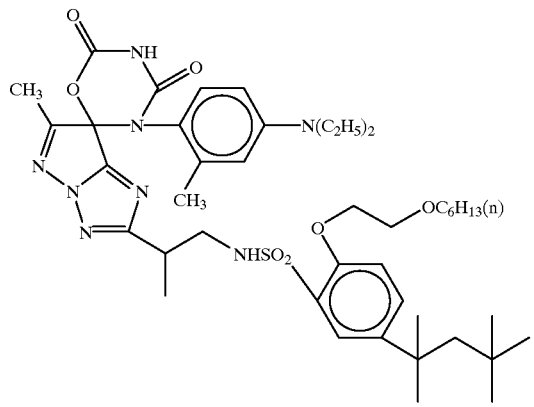
(25)
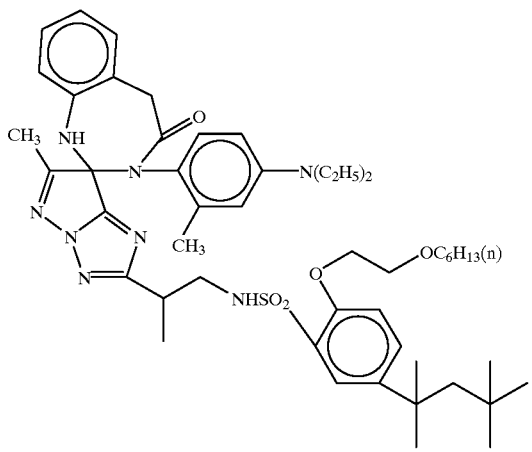
(26)
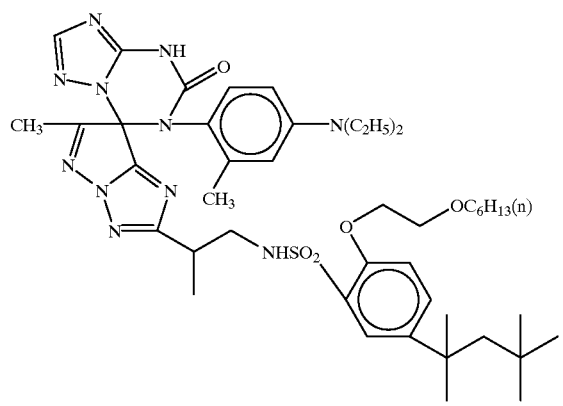
(27)
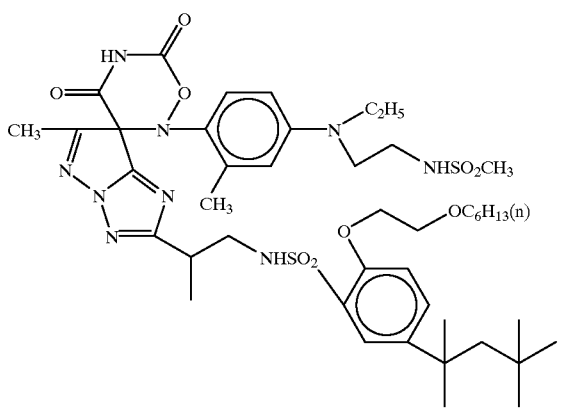
(28)
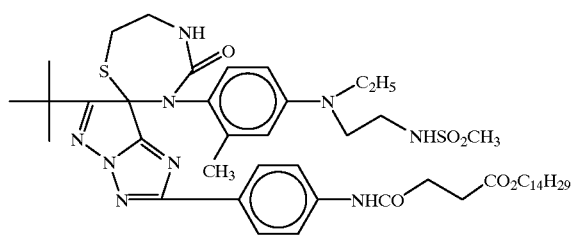
(29)
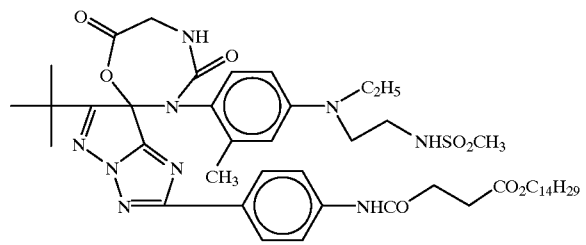
(30)
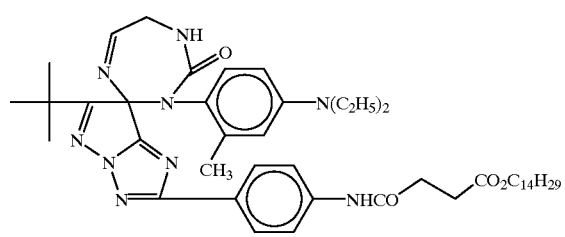
(31)
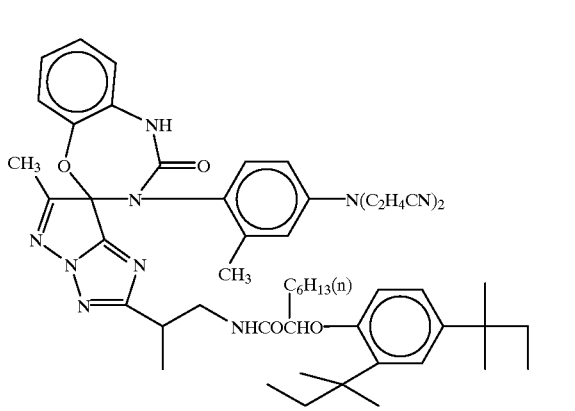

-continued
(32)
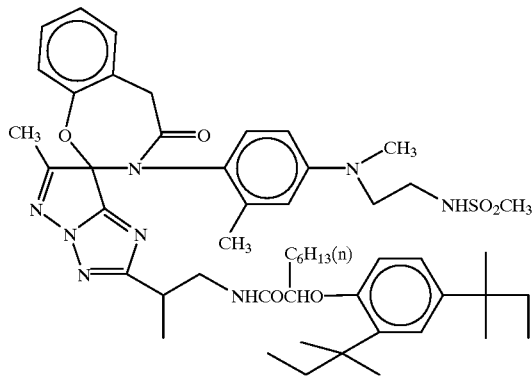
(33)
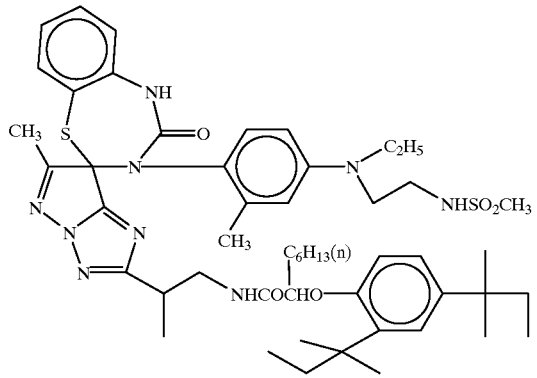
(34)
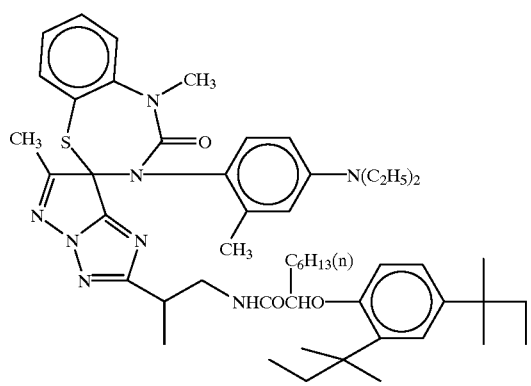
(35)
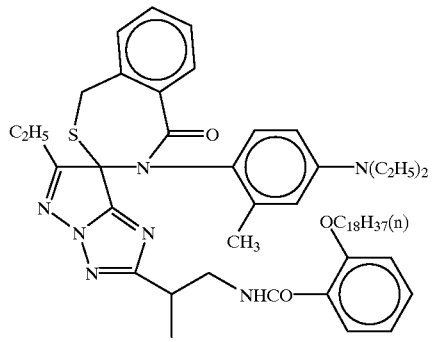
(36)
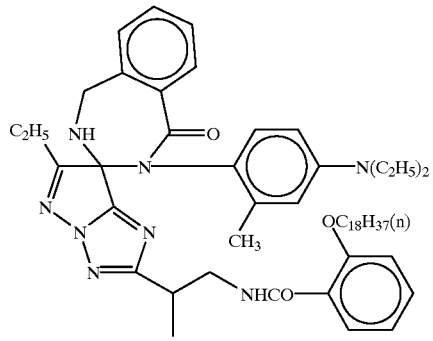
(37)
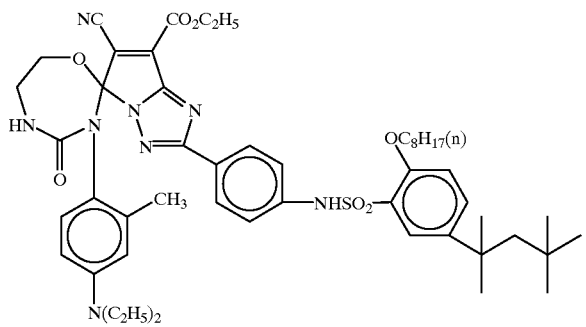
(38)
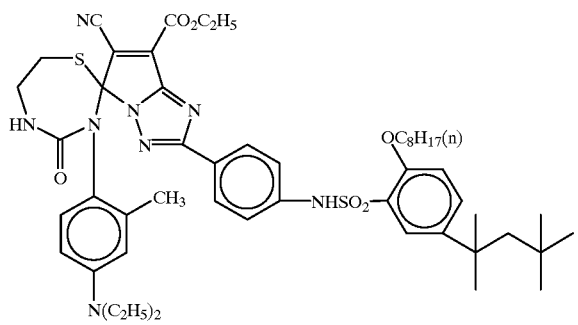
(39)
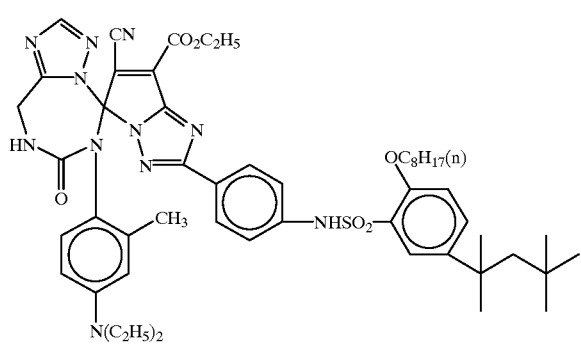

-continued
(40)
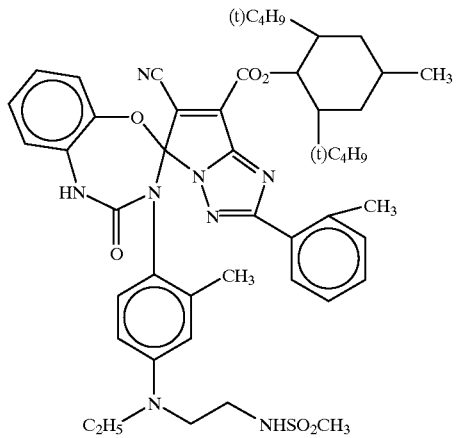
(41)
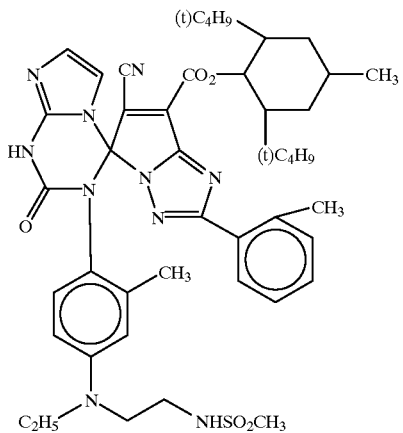
(42)
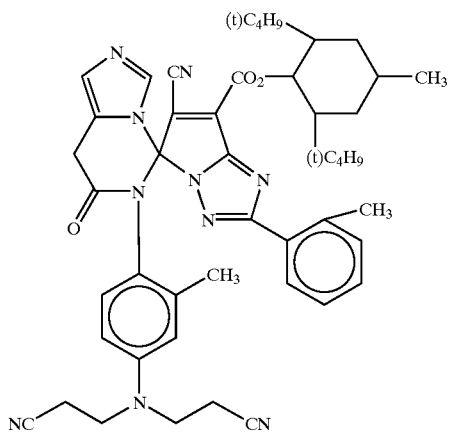
(43)
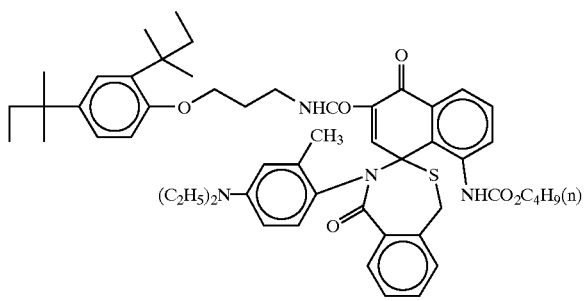
(44)
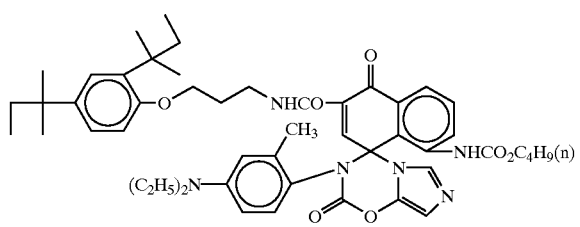
(45)
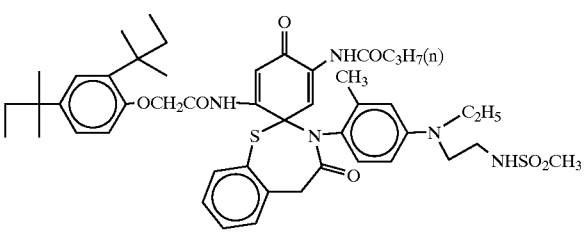
(46)
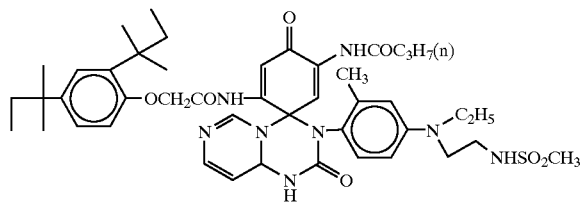
(47)
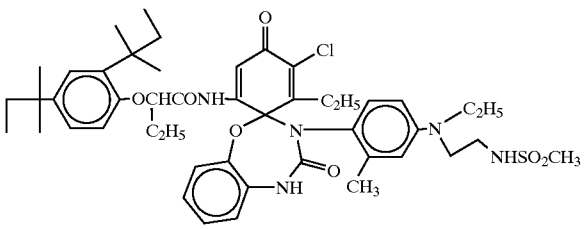

-continued
(48)
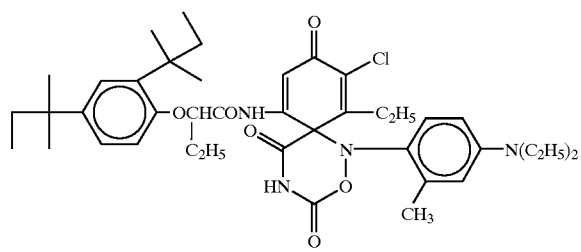
(49)
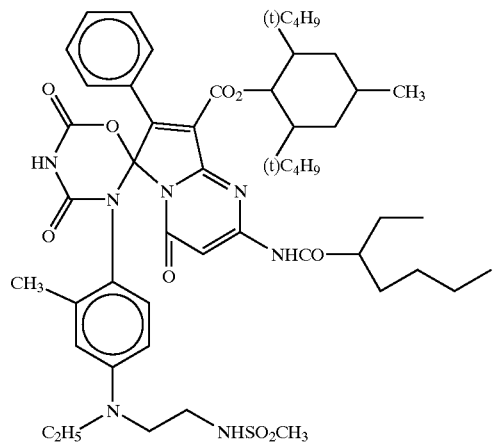
(50)
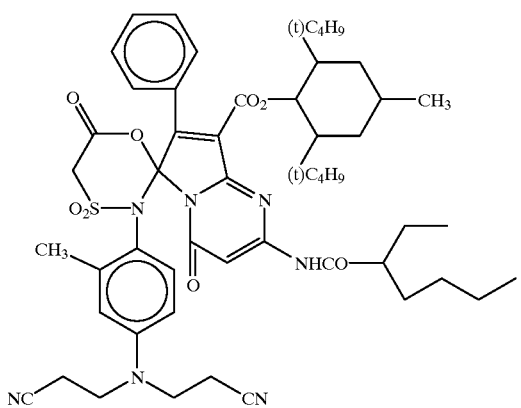
(51)
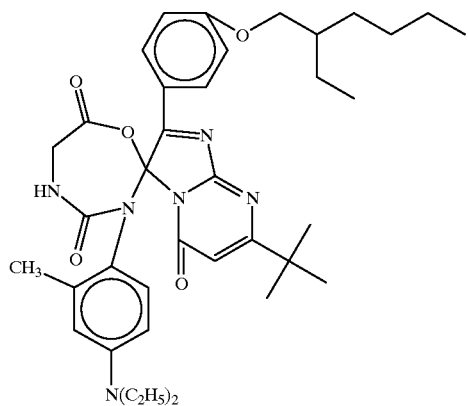
(52)
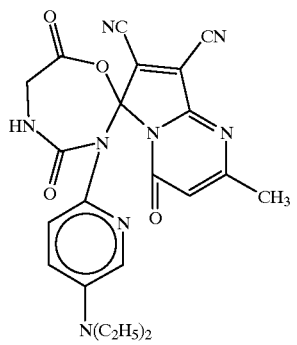
(53)
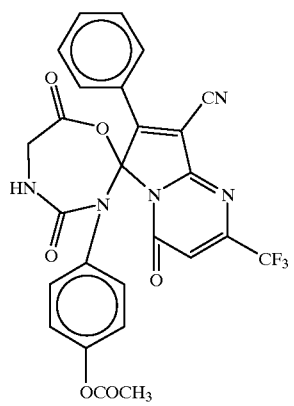

-continued
(54)
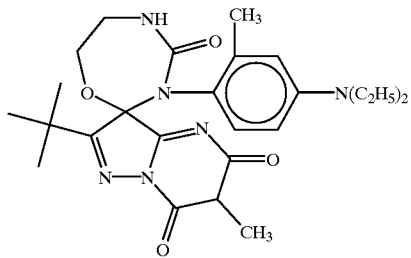
(55)
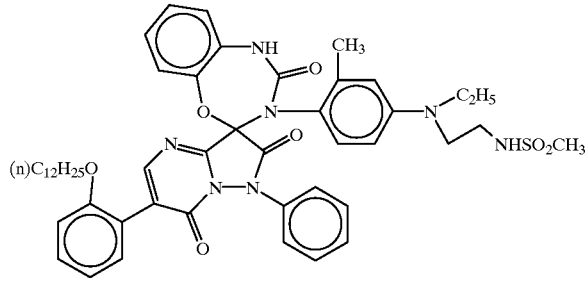
(56)
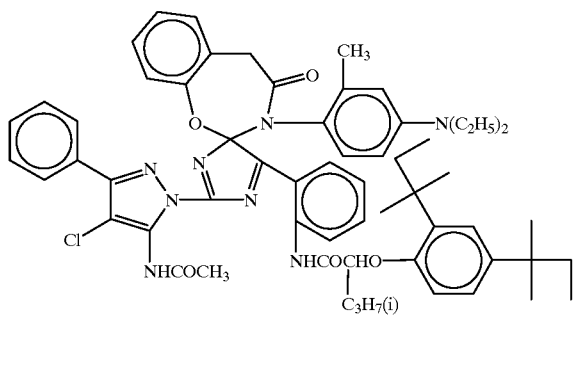
(57)
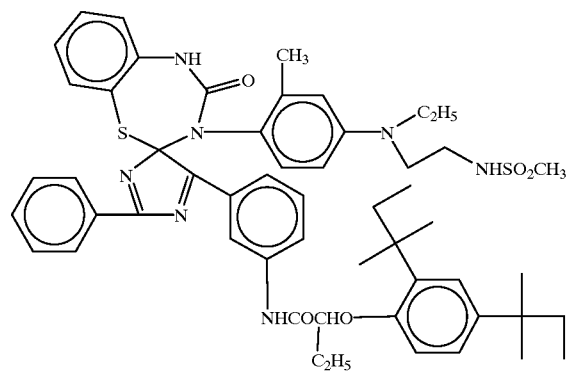
(58)
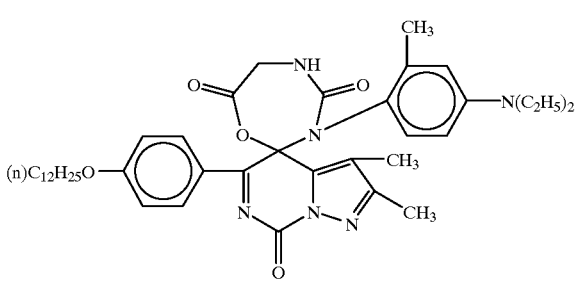
(59)
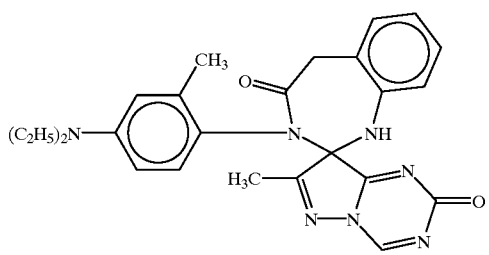
(60)
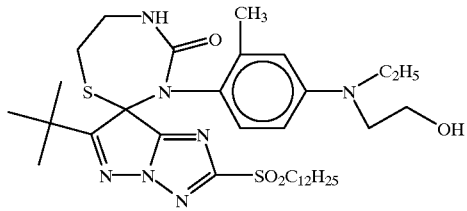
(61)
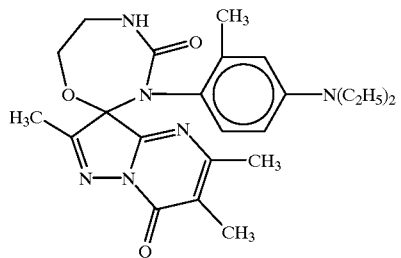

-continued
(62)
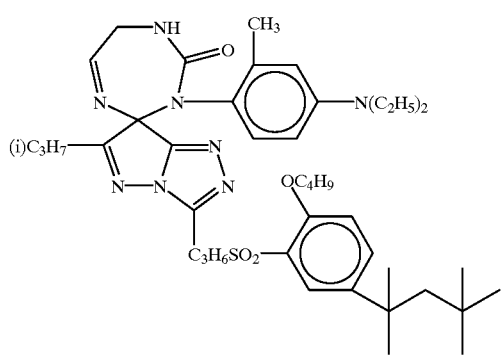
(63)
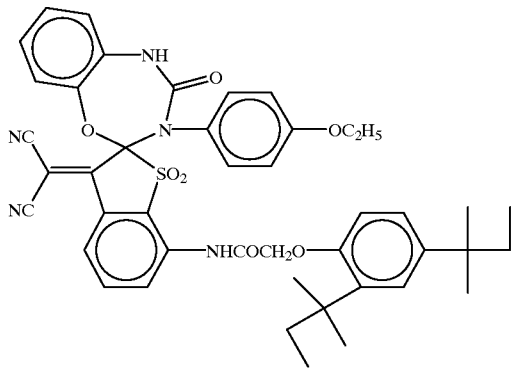
(64)
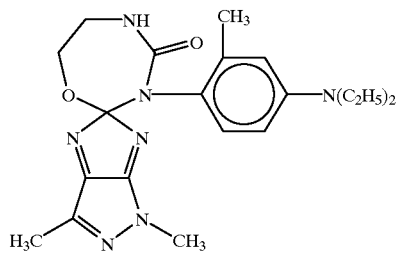
(65)
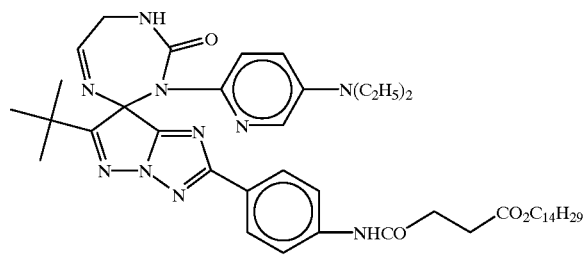
(66)
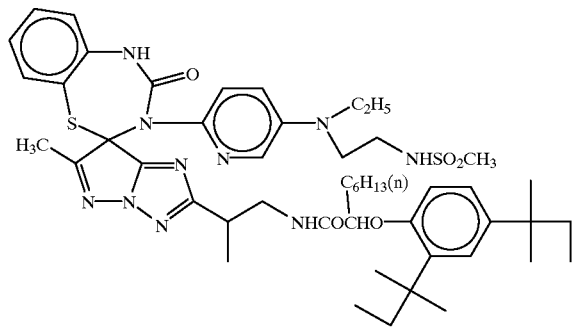
(67)
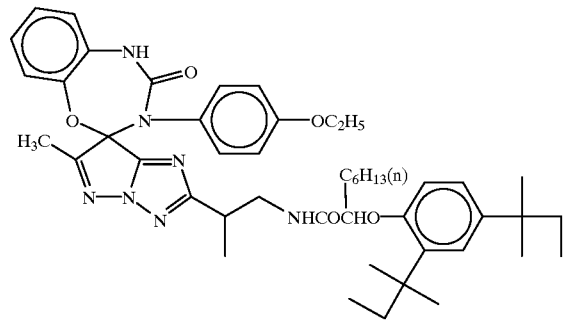
(68)
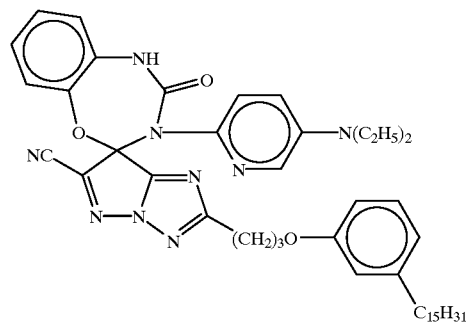
(69)
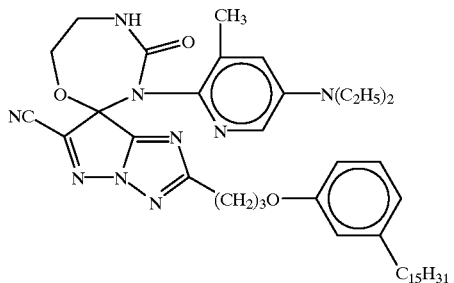

-continued

(70)
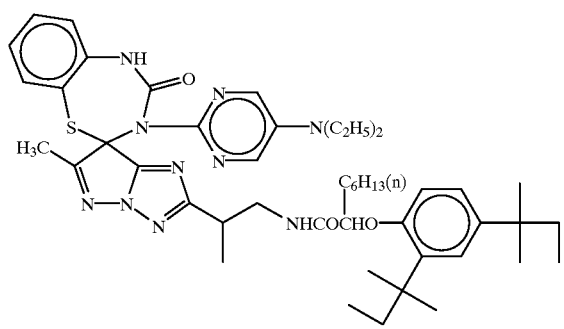

(71)
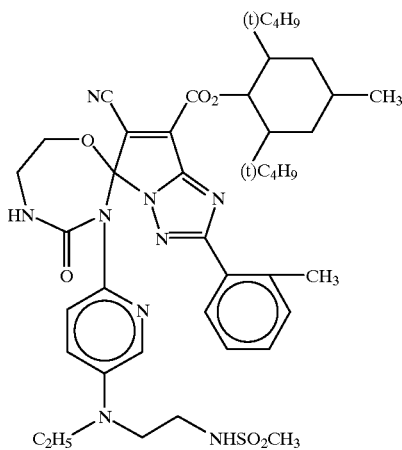

(72)
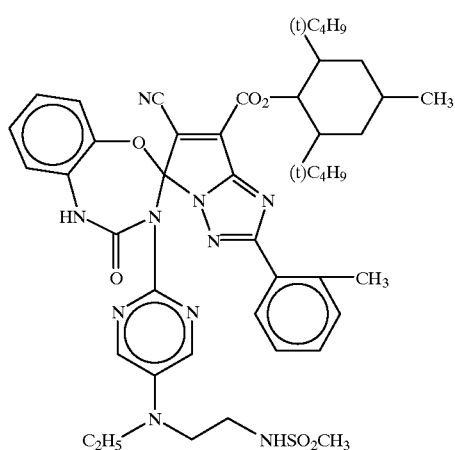

Next, the methods of preparing the azomethine dye precursors represented by the general formula (1) are explained. The azomethine dye precursors represented by the general formula (1) can be prepared by any one of the following 3 methods.

The first method is a method wherein a compound A in which a coupler portion and N—Ar are linked by X is prepared by oxidative coupling (see the following reaction formula (1)).

reaction formula (1)

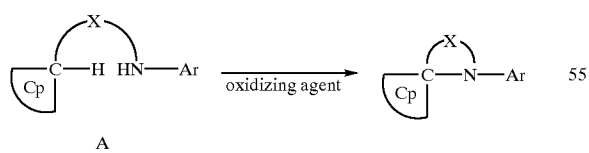

A

The second method is a method comprising the steps of forming a compound B by oxidative coupling of a coupler portion having Y and N—Ar having Z, said Y and Z, when combined, becoming a linking group X, and thereafter linking Y and Z (i.e., conversion into x) (see the following reaction formula (2)).

reaction formula (2)

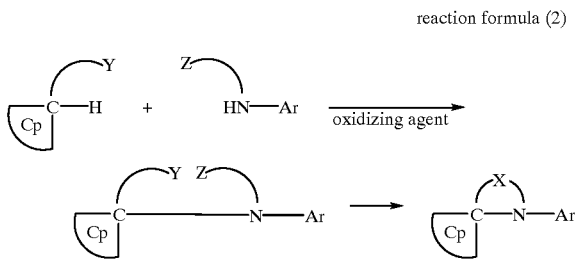

B wherein, for example,

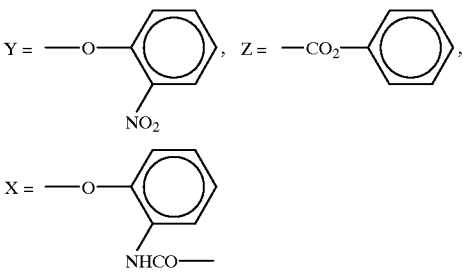

The third method is a method comprising the steps offorming a compound C by oxidative coupling of a coupler portion having a substituent L capable of easily leaving as an anion and N—Ar having X and thereafter introducing X into the coupler portion (see the following reaction formula (3)).

reaction formula (3)

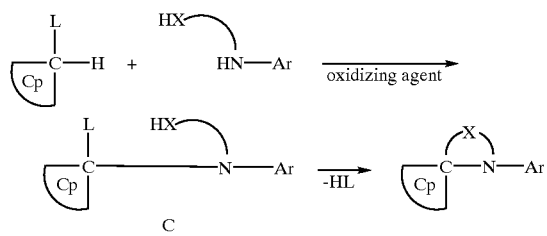

wherein, for example, L is a halogen atom (e.g., Cl, Br, or the like) or the following formula.

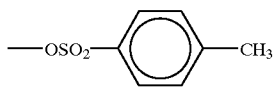

The oxidative coupling in the above-described reaction represented by the reaction formula (1), (2), or (3) is explained below.

Although this oxidative coupling reaction may be performed under any of acidic, neutral, and basic conditions, the reaction is preferably performed under a basic condition.

Examples of the oxidizing agent include manganese peroxide, potassium permanganate, manganese (III) acetate, potassium hexacyanoferrate (III), chromium(VI) oxide/pyridine complex, mercury (II) acetate, lead tetraacetate, silver (II) oxide, and so on. Among these compounds, manganese peroxide and potassium hexacyanoferrate (III) are preferable. The suitable amount to be used of the oxidizing agent is 1 to 10 equivalents, preferably 1 to 5 equivalents, per equivalent of the substrate.

Examples of the base include organic bases such as triethylamine, pyridine, and DBU, alkali metal hydrides such as sodium hydride and potassium hydride, metal alcoholates such as sodium methylate, sodium ethylate, and potassium butylate, alkaline earth metal hydroxides such as calcium hydroxide and magnesium hydroxide, alkali metal carbonates such as sodium hydrogencarbonate, potassium hydrogencarbonate, sodium carbonate, and potassium carbonate, alkali metal salts of lower carboxylic acids such as sodium formate and sodium acetate, and soon. Among these compounds, organic bases such as triethylamine and pyridine, and alkali metal carbonates are preferable. The suitable amount to be used of the base is 1 to 10 equivalents per equivalent of the substrate.

Examples of the solvent include aromatic hydrocarbons such as benzene, toluene and xylene, chain-like or cyclic aliphatic hydrocarbons such as pentane, hexane, heptane, and cyclohexane, ethers such as diethyl ether, diisopropyl ether, tetrahydrofuran, dioxane, and ethylene glycol dimethyl ether, halogenated hydrocarbons such as dichloromethane and 1,2-dichloroethane, nitrites such as acetonitrile, acetate esters such as methyl acetate and ethyl acetate, N,N-dimethylformamide, N,N-dimethylacetamide, dimethyl sulfoxide, acetic acid, and mixtures of these solvents. In addition, in the case of a water-insoluble solvent, the reaction may be performed in a two-phase system comprising the solvent and an aqueous solution of the base described above. The amounts to be used of these solvents are not particularly limited.

The reaction temperature is normally selected from temperatures ranging from room temperature to the boiling point of the solvent, and is preferably 20 to 70° C.

The reaction time is normally 0.5 to 24 hours, although it depends on the reaction temperature.

After the completion of the reaction, the product can be taken out by ordinary post-treatment such as extraction. Further, if necessary, the product can be purified by a purifying means such as silica gel column chromatography and recrystallization.

Specific examples of the synthesis of the azomethine dye precursors represented by the general formula (1) are given below.

(Synthesis of the azomethine dye precursor (33) of the present invention according to the reaction formula (1))

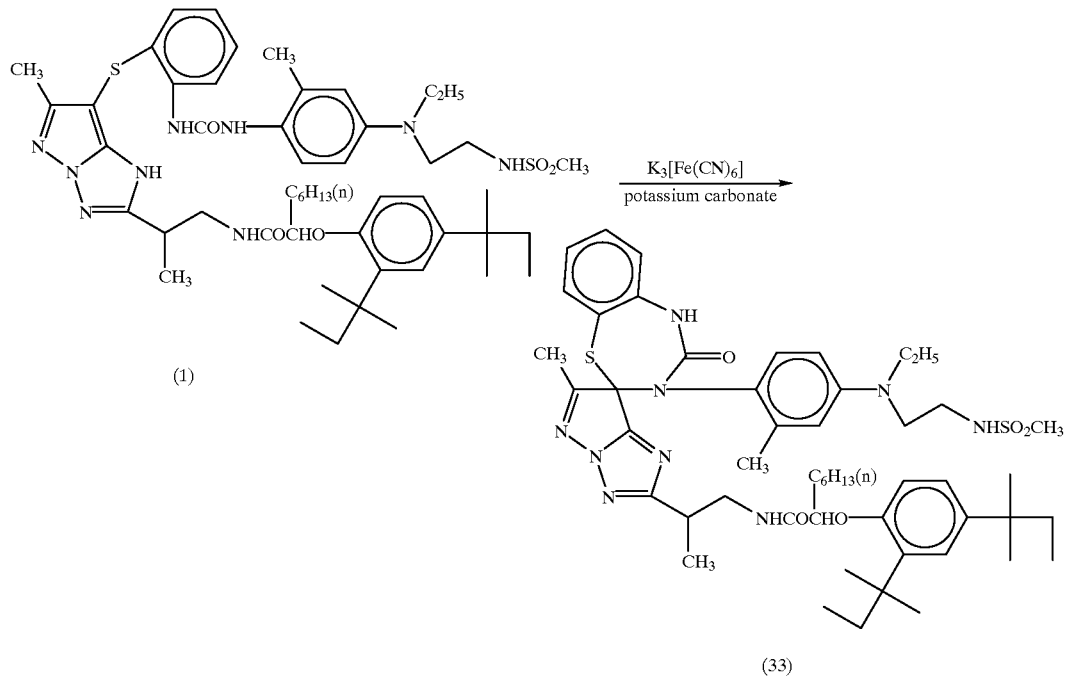

According to the reaction formula described above, 90 mL of ethyl acetate and 46 mL of a 10% sodium carbonate aqueous solution were added to 4.44 g (4.64 mmol) of the compound [1]. While the resulting reaction solution was stirred, 3.21 g (9.75 mmol) of potassium hexacyanoferrate (III) was added. After the addition, the reaction solution was stirred for 30 minutes at room temperature. Next, the reaction solution was separated into layers. The organic layer was washed with water, thereafter dried, and concentrated under a reduced pressure. An oily product thus obtained was purified by silica gel column chromatography (eluent: ethyl acetate/hexane=3/1). As a result, the compound (33) (3.83 g of a yellowish solid substance in 86% yield) was obtained. The physical properties of the compound (33) thus obtained were as follows.

[m.p.: 102~103° C., $^1$H-NMR (CDCl$_3$): 8.07~8.18 (m, 1H), 7.25~7.46 (m, 1H), 7.11~7.25 (m, 2H), 6.96~7.11 (m, 1H), 6.71~6.89 (m, 1H), 6.55~6.65 (m, 2H), 6.43~6.51 (m, 1H), 6.30~6.43 (m, 1H), 6.20~6.23 (m, 1H), 5.80~5.87 (m, 1H), 5.56~5.72 (m, 1H), 4.56 (t, 1H), 3.56~3.67 (m, 1H), 3.42~3.56 (m, 1H), 3.40 (t, 2H), 3.32 (q, 2H), 3.21 (t, 2H), 2.95~3.03 (m, 1H), 2.91 (s, 3H), 2.33 (s, 3H), 2.05~2.18 (s, 3H), 1.82~1.98 (m, 5H), 1.58 (q, 2H), 1.05~1.40 (m, 25H), 0.85 (t,3H), 0.56~0.68 (m, 6H)]

A solution of the compound (33) in ethyl acetate (5× 10$^{-5}$ mol/L) was prepared. When 0.1 mL osurfacetic acid was added to 2 mL of the solution described above and the resulting solution was heated to 90° C., the solution developed a magenta color. When ethyl 6-bromocaproate was used in place of the acetic acid and the solution was heated in the same way, a magenta color was also developed.

The compound [I] in the reaction formula described above can be synthesized in the following way.

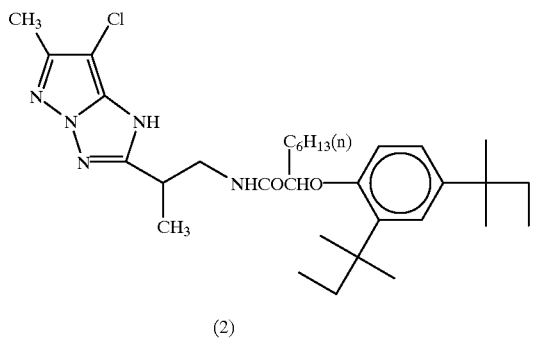

(2)

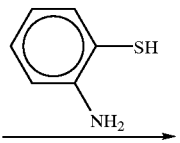

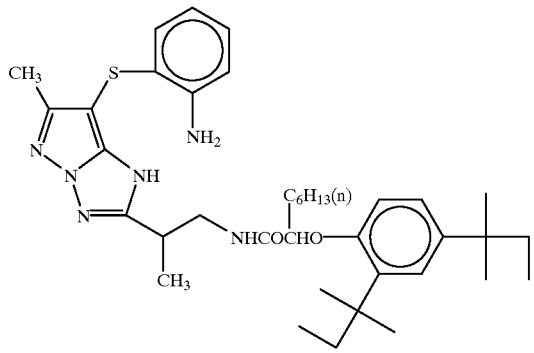

(3)

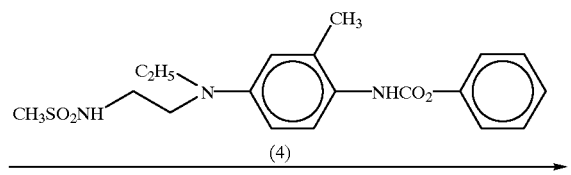

(4)

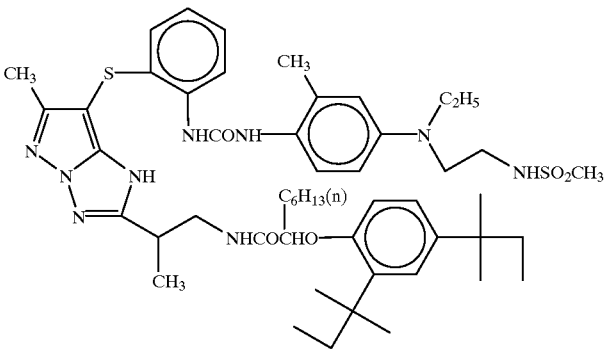

(1)

According to the reaction formula described above, 500 mL of DMAc was added to 60 g (0.105 mol) of the compound [2] and 171 g (0.137 mol) of o-aminobenzenethiol. Further, 10.6 g (0.105 mol) of triethylamine was added. After the addition, the resulting reaction solution was stirred for 3 hours at 100° C. (a gas-washing bottle containing an antifoaming agent was connected to the reaction vessel). After that, the reaction solution was poured into ice water, and a yellowish solid substance which was deposited was collected by filtration and washed with water. The substance thus obtained was dried and thereafter recrystallized from an ethyl acetate/hexane mixture. By this recrystallization, the compound [3] was obtained as a white solid substance (1st: 79 g). The filtrate was concentrated and thereafter recrystallized from an ethyl acetate/hexane mixture. By this recrystallization, the compound [3] was obtained as a white solid substance (2nd: 28.5 g). As a result, the total amount of the compound [3] obtained was 107.5 g and the yield was 78%. The physical properties of the compound [3] thus obtained were as follows.

[m.p. : 185~187° C., $^1$H-NMR (CDCl$_3$): 7.13~7.20 (m, 2H) 6.98~7.04 (m, 1H), 6.80 (dd, 1H), 6.71 (dd, 1H), 6.56~6.66 (m, 2H), 6.36 (d, 1H), 4.55 (t, 1H), 4.31 (brs, 2H), 3.42~3.70 (m, 2H), 3.08~3.22 (m, 1H), 2.43 (S, 3H), 1.77~1.90(m, 5H), 1.55 (q, 2H), 1.12~1.36 (m, 22H), 0.87 (t, 3H), 0.58~0.67 (m, 6H)]

Further, 60 mL osurfacetonitrile was added to 3.95 g (5.98 mmol) of the compound [3] obtained above and 3.04 g (7.77 mmol) of the compound [4]. Furthermore, 0.644 g (6.57 mmol) of triethylamine was added. After the addition, the resulting reaction solution was stirred for 4 hours under a refluxing condition. After that, 6 mL of 1N base was added, and the reaction solution was extracted with ethyl acetate. Next, the organic layer was washed with water, thereafter dried, and concentrated under a reduced pressure. An oily product was obtained. An ethyl acetate/hexane mixture was added to the oily product, and a solid substance that was deposited by the addition was collected by filtration. As a result, the compound [1] (4.24 g of a white solid substance in 74% yield) was obtained. The physical properties of the compound [1] thus obtained were as follows.

[m.p. : 175~176° C., $^1$H-NMR (CDCl$_3$): 7.49 (d, 1H) 7.14~7.25 (m, 2H), 7.02~7.14 (m, 3H), 6.91~7.02 (m, 2H), 6.51~6.65 (m, 3H), 6.38~6.51 (m, 2H), 4.80 (brs, 1H), 4.42~4.51 (m, 1H), 3.71~3.82 (m, 1H), 3.50~3.58 (m, 1H), 3.47(t, 2H), 3.38(q, 2H), 3.39 (t, 2H), 3.01~3.13 (m, 1H), 2.91 (s, 3H), 2.34 (s, 3H), 2.26 (s, 3H), 1.81~1.89 (m, 5H) 1.56 (q, 2H), 1.06~1.39 (m, 25H), 0.85 (t, 3H), 0.56~0.68 (m, 6H)]

The compound [2] in the reaction formula described above can be synthesized according to, for example, the method described in JP-A No. 64-6274. The compound [4] can be synthesized in the following way.

10 mL of water and 30 mL of ethyl acetate were added to 4.365 g (10 mmol) of 4-amino-3-methyl-N-ethyl-N-(methanesulfonamidoethyl)aniline 1.5 sulfate-hydrate. While these materials are being stirred at room temperature, 2.94 g (35 mmol) of sodium hydrogencarbonate was added (since foaming was likely to occur, sodium hydrogencarbonate was added slowly over a period of about 10 minutes). Next, while the resulting reaction solution was cooled, 1.64 g (10.5 mmol) of phenyl chloroformate was added dropwise (phenyl chloroformate was added dropwise in 30 minutes while keeping the interior of the reaction solution at 7~8° C.). After that, the temperature of the reaction solution was returned to room temperature, and the reaction solution was stirred for 2 hours. The reaction solution was then separated into layers, and the organic layer was washed with water, thereafter dried, and concentrated under a reduced pressure. An oily product was obtained. An ethyl acetate/hexane mixture was added to the oily substance. The addition caused the deposition of a solid substance, which was collected by filtration. As a result, the compound [4] (3.6 g of a white solid substance in 92% yield) was obtained. The physical properties of the compound [4] thus obtained were as follows.

[m.p.: 89~90° C., $^1$H-NMR (CDCl$_3$): 7.46 (brs, 1H), 7.30~7.40 (m, 2H), 7.15~7.24 (m, 3H), 6.53~6.64 (m, 3H), 4.74 (brs, 1H), 3.41(t, 2H), 3.34 (q, 2H), 3.26 (t, 2H), 2.89 (s, 3H), 2.31 (s, 3H), 1.12(t, 3H)]

(Synthesis of the azomethine dye precursor (33) of the present invention according to the reaction formula (2))

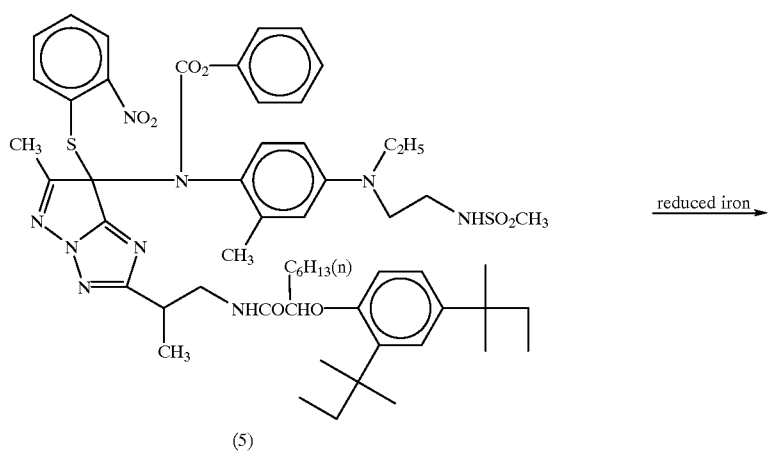

(5)

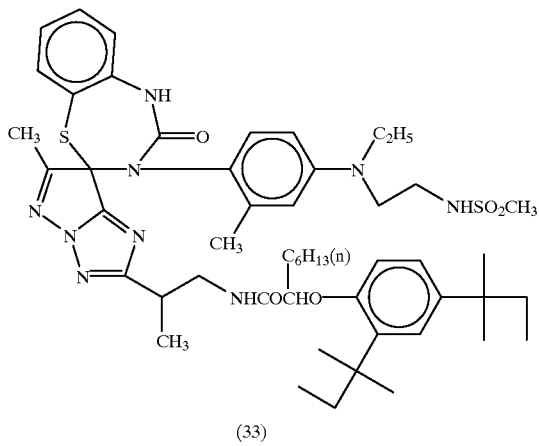

(33)

According to the reaction formula described above, 1 mL of water and 50 mL of isopropanol were added to 0.2 g (3.74 mmol) of ammonium chloride. While the resulting reaction solution was stirred, 1.9 g (34 mmol) of reduced iron was added. Next, while the reaction solution was vigorously stirred for 30 minutes under a refluxing condition, 5.33 g (4.94 mmol) of the compound [5] was added in aliquots over a period of 10 minutes. After the addition, the reaction solution was stirred for one hour under a refluxing condition and thereafter cooled. The reaction solution was then filtered through celite. Water was added to the filtrate and the resulting mixture was extracted with ethyl acetate. The organic layer was washed with water, thereafter dried, and concentrated under a reduced pressure. An oily product thus obtained was purified by silica gel column chromatography (eluent: ethyl acetate/hexane=3/1). As a result, the compound (33) of the present invention (3.21 g of a yellowish solid substance in 68% yield) was obtained.

A solution of the compound (33) in ethyl acetate ($5 \times 10^{-5}$ mol/L) was prepared. When 0.1 mL of n-hexylamine was added to 2 mL of the solution described above and the resulting solution was heated to 90° C., the solution developed a magenta color. When DBU was used in place of the n-hexylamine, the resulting solution rapidly developed a magenta color at room temperature.

In the reaction formula described above, the compound [5] can be synthesized by oxidative coupling between the compound [6] and the compound [4] as shown in the following reaction formula.

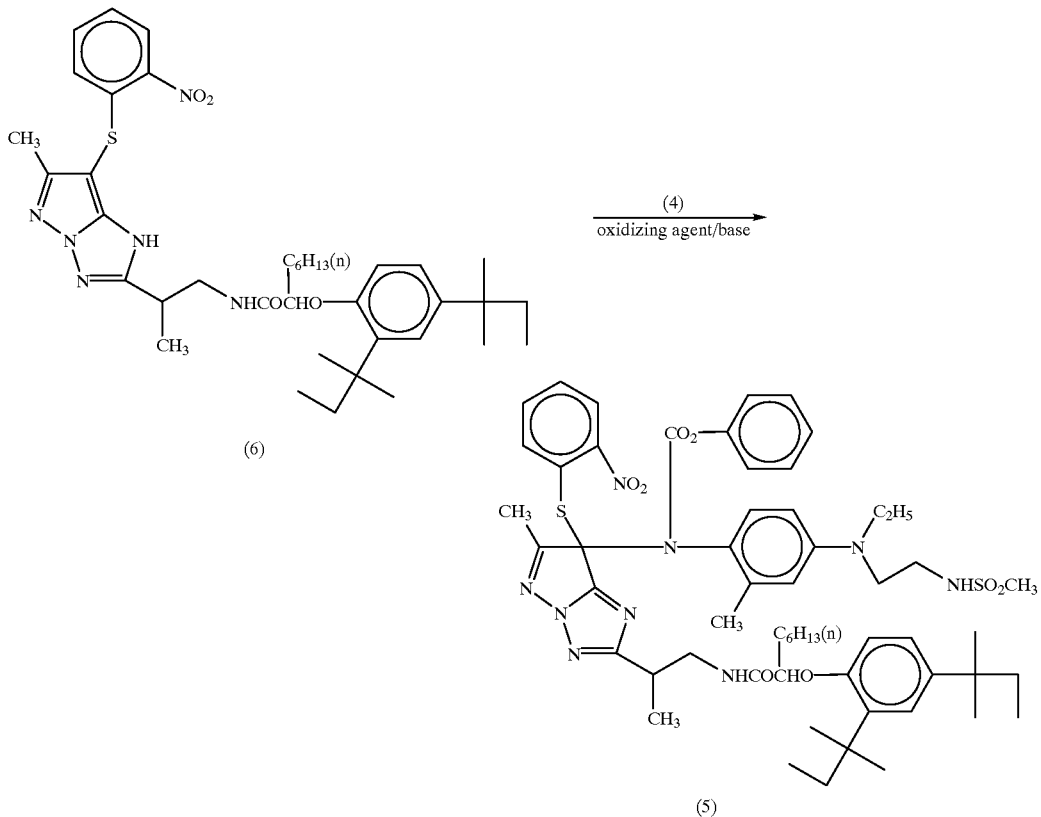

(Synthesis of the azomethine dye precursor (33) of the present invention according to the reaction formula (3))

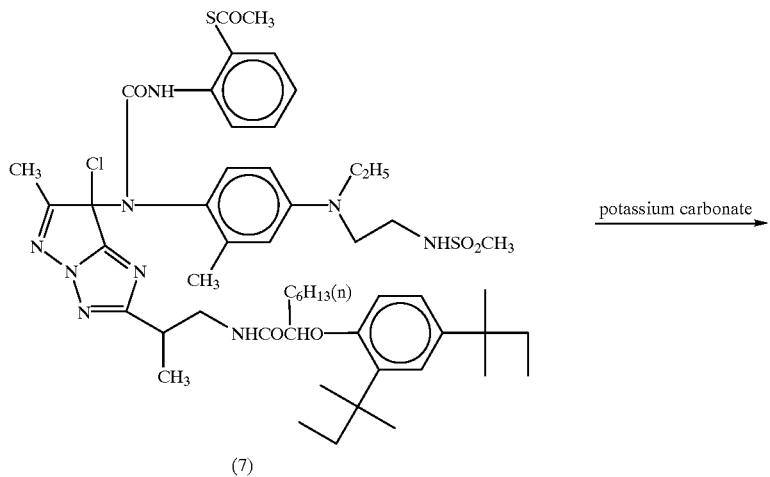

(7)

potassium carbonate →

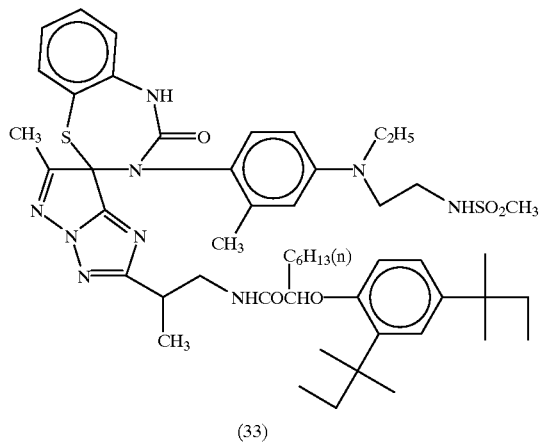

(33)

According to the reaction formula described above, 0.41 g (3 mmol) of potassium carbonate and 20 mL of methanol were added to 3.1 g (3 mmol) of the compound [7]. The resulting reaction solution was stirred for 3 hours under a refluxing condition and thereafter cooled. Water was added to the reaction solution. The resulting mixture was neutralized with a 1N base and thereafter extracted with ethyl acetate. The organic layer was washed with water, thereafter dried, and concentrated under a reduced pressure. An oily product thus obtained was purified by silica gel column chromatography (eluent: ethyl acetate/hexane=3/1). As a result, the compound (33) of the present invention (1.75 g of a yellowish solid substance in 61% yield) was obtained.

A solution of the compound (33) in chloroform ($5 \times 10^{-5}$ mol/L) was prepared. When 10 mg of manganese dioxide was added to 2 mL of the solution described above, the resulting solution rapidly developed a magenta color at room temperature.

In the reaction formula described above, the compound [7] can be synthesized by oxidative coupling between compound [2] and the following compound [8].

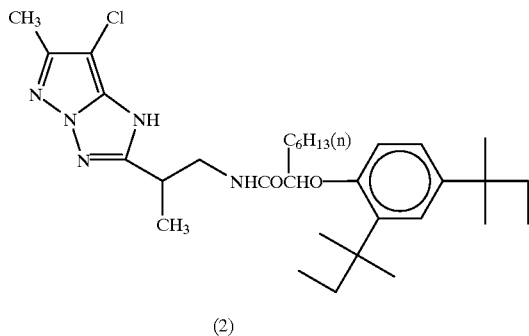

(2)

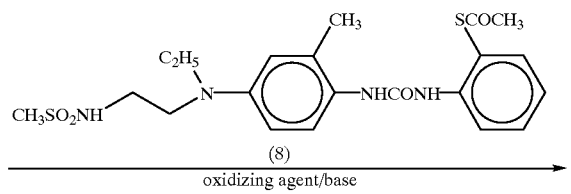

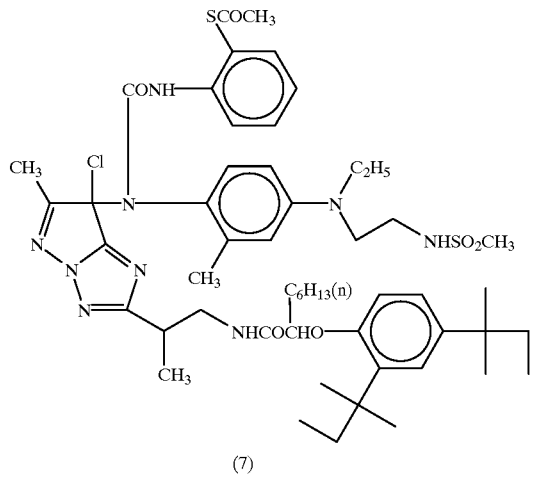

(7)

The azomethine dye precursor of the present invention has a property that it rapidly develops a color when it is brought into contact with a deblocking agent at room temperature or at a temperature falling within a range unable to cause it to develop a color on its own by merely being heated. Because of this property, when the azomethine dye precursor of the present invention is used as a color-forming component of an image-forming material comprising a support having thereon an image-forming layer, the image-forming material develops a color well with a small amount of energy and the storability of the image is very good.

The azomethine dye precursor represented by the general formula (1) can be used in various recording materials. For example, it can be used in heat-sensitive recording materials widely utilized in such field as facsimile and printers. These heat-sensitive recording materials utilize a coloration reaction between an electron-donating colorless dye and an electron-accepting compound (i.e., a color developer). In place of the combination of the electron-donating colorless dye and the electron-accepting compound, a combination of the dye precursor of the present invention and a deblocking agent can be used. Besides, examples, in which an image-forming layer comprising a combination of the electron-donating colorless dye and the electron-accepting compound is used in a multicolor recording layer, have been known. Examples thereof include multicolor diazo heat-sensitive recording materials that are to be fixed by light. These multicolor heat-sensitive recording materials are described in JP-A Nos. 4-135787, 4-144784, 4-144785, 4-194842, 4-247447, 4-247448, 4-340540, 4-340541, 5-34860, and so on. The combination of the dye precursor of the present invention and a deblocking agent can be used in these multicolor recording materials.

Further, the azomethine dye precursor represented by the general formula (1) can also be used in silver halide photosensitive materials. For example, a photo- and heat-sensitive photographing material, which comprises a photosensitive silver halide, a leuco dye reducing agent, an organosilver compound capable of being reduced by the leuco dye reducing agent, and a binder, has been disclosed (PCT National Publication Nos. 8-507885 and 10-502460). In this material, the dye precursor of the present invention can be used as the leuco dye reducing agent. Furthermore, the dye precursor of the present invention can be used as a color former of the coloring material in the field of ordinary silver salt photography, ink jet, and transfer materials.

[2. Image-forming Materials]

Next, the image-forming material of the present invention is explained below. The image-forming material of the present invention comprises a support having thereon an image-forming layer containing at least one azomethine dye precursor of the present invention and at least one deblocking agent. When a plurality of image-forming layers are laminated, the deblocking agent and the azomethine dye precursor of the present invention may be contained in the same layer or the deblocking agent and the azomethine dye precursor of the present invention may be contained in different layers. By incorporating the azomethine dye precursor of the present invention, the image-forming material of the present invention has high sensitivity and can produce high-quality and highly durable images speedily.

In addition, the image-forming layer in the image-forming material may contain at least one photopolymerization initiator and at least one polymerizable compound.

Each constituent component of the image-forming material of the present invention is described in detail below.

A: Support

Any paper support of conventional pressure-sensitive paper, heat-sensitive paper, and dry-process or wet-process diazo copying paper can be used as the support for use in the image-forming material of the present invention. Specific examples thereof include an acidic paper, a neutral paper, a coated paper, a plastic film-laminated paper made by laminating a plastic such as polyethylene to paper, a synthetic paper, and a plastic film such as a polyethylene terephthalate film and a polyethylene naphthalate film. For the purpose of correcting the curl balance of the support or for the purpose of preventing the penetration of chemicals from the back of the support, a backcoat layer may be provided. The backcoat layer may be formed in the same way as a protective layer described later. In addition, a label form can be produced by adhering a strip-off paper via an adhesive layer to the back of the support. Also a so-called seal form can be produced using the support as a strip-off paper by providing an adhesive layer on the image-forming layer. The support may contain a fluorescent brightener, a bluing dye, a pigment, and the like.

Furthermore, when a transparent material is used as the support, it is also possible to write images on the support side of the image-forming material in the optical image-forming step described later or to irradiate the support side of the image-forming material with light in the step in which the image is made visible, also described later.

B: Image-forming Layer

Each constituent component of the image-forming layer and the specific construction of the image-forming layer are explained in detail below.

(Azomethine dye precursor)

The image-forming material may use a single kind of the azomethine dye precursors described above so as to design a single-color image-forming material. Alternatively, the image-forming material may use two or more kinds of the azomethine dye precursors described above so as to design a multicolor image-forming material. When the multicolor image-forming material is prepared, an azomethine dye precursor capable of developing a hue and a dye precursor (including the azomethine dye precursors described above) capable of developing a hue different from that of the foregoing azomethine dye precursor can be used in combination. That is, two or more kinds of azomethine dye precursors, each capable of developing a different hue, can be selected from the azomethine dye precursors represented by the general formula (1) for use, or otherwise an azomethine dye precursor represented by the general formula (1) can be used in combination with a conventionally known dye precursor capable of developing a hue different from that of the foregoing azomethine dye precursor. As described later, a dye precursor capable of developing a hue different from that of the azomethine dye precursor of the present invention and the azomethine dye precursor of the present invention may be used in the same layer. When a plurality of image-forming layers are formed, a dye precursor capable of developing a hue different from that of the azomethine dye precursor of the present invention and the azomethine dye precursor of the present invention may be used in different image-forming layers.

Examples of conventionally known dye precursors that can be used together with the azomethine dye precursor of the present invention include the following combinations (a) to (m) The color-forming component A is listed first and the compound B which reacts with the color-forming component A to cause the color-forming component A to develop a color is listed next.

(a) a combination of a diazonium compound and a coupler;
(b) a combination of an electron-donating dye precursor and an electron-accepting compound;
(c) a combination of a metal salt of an organic acid, such as silver behenate or silver stearate, and a reducing agent such as protocatechinic acid, spiroindan, or hydroquinone;
(d) a combination of an iron salt of a long-chain fatty acid, such as ferric stearate or ferric myristate, and a phenol such as tannic acid, gallic acid, or ammonium salicylate;
(e) a combination of a heavy metal salt of an organic acid, such as a nickel, cobalt, lead, copper, iron, mercury, or silver salt osurfacetic acid, stearic acid, or palmitic acid, and a sulfide of an alkali metal or an alkaline earth metal, such as calcium sulfide, strontium sulfide, or potassium sulfide, or a combination of the above-described heavy metal salt of an organic acid and an organic chelating agent such as s-diphenylcarbazide or diphenylcarbazone;
(f) a combination of a heavy metal sulfate, such as a silver, lead, mercury, or sodium salt of sulfuric acid, and a sulfur compound such as sodium tetrathionate, sodium thiosulfate, or thiourea;
(g) a combination of a ferric salt of a fatty acid, such as ferric stearate, and an aromatic polyhydroxy compound such as 3,4-hydroxytetraphenyl methane;
(h) a combination of a metal salt of an organic acid, such as silver oxalate or mercury oxalate, and an organic polyhydroxy compound such as polyhydroxy alcohol, glycerin, or glycol;
(i) a combination of a ferric salt of a fatty acid, such as ferric pelargonate or ferric laurate, and a thiocesylcarbamide or isothiocesylcarbamide derivative;
(j) a combination of a lead salt of an organic acid, such as lead caproate, lead pelargonate, or lead behenate, and a thiourea derivative such as ethylenethiourea or N-dodecylthiourea;
(k) a combination of a heavy metal salt of a higher fatty acid, such as ferric stearate or copper stearate, and zinc dialkyldithiocarbamate;
(l) a combination capable of forming an oxazine dye such as a combination of resorcinol and a nitroso compound; and
(m) a combination of a formazan compound and a reducing agent and/or a metal salt.

Among the above-listed combinations, preferable are (a) a combination of a diazonium compound and a coupler and
(b) a combination of an electron-donating dye precursor and an electron-accepting compound.

When an electron-donating, colorless dye precursor is used as the color-forming component A, the dye precursor that can be used may be a traditionally known one. Any dye precursor that reacts with the electron-accepting compound and develops a color can be used as the dye precursor. Specific examples of such traditionally known dye precursors are given below. However, it should be noted that the electron-donating, colorless dye precursors that can used in the present invention are not limited to these examples.

Specific examples of the electron-donating, colorless dye precursor include a phthalide-based compound, a fluoran-based compound, a phenothiazine-based compound, an indolylphthalide-based compound, a leucoauramine-based compound, a rhodamine lactam-based compound, a triphenylmethane-based compound, a triazene-based compound, a spiropyran-based compound, a pyridine-based compound, a pyrazine-based compound, a fluorene-based compound, and so on.

Examples of the phthalide-based compound include the compounds described in, for example, re-issued U.S. Pat. No. 23,024, and U.S. Pat. Nos. 3,491,111, 3,491,112, 3,491,116, and 3,509,174. Specific examples thereof include 3,3-bis(p-dimethylaminophenyl)-6-dimethylaminophthalide, 3,3-bis(p-diethylaminophenyl)phthalide, 3-(p-dimethylaminophenyl)-3-(1,3-dimethylindole-3-yl)phthalide, 3-(p-dimethylaminophenyl)-3-(2-methylindole-3-yl)phthalide, and so on.

Examples of the fluoran-based compound include the compounds described in, for example, U.S. Pat. Nos. 3,624,107, 3,627,787, 3,641,011, 3,462,828, 3,681,390, 3,920,510, and 3,959,571. Specific examples thereof include 2-(dibenzylamino)fluoran, 2-anilino-3-methyl-6-diethylaminofluoran, 2-anilino-3-methyl-6-dibutylaminofluoran, 2-anilino-3-methyl-6-N-ethyl-N-isoamylaminofluoran, 2-anilino-3-methyl-6-N-methyl-N-cyclohexylaminofluoran, 2-anilino-3-chloro-6-diethylaminofluoran, 2-anilino-3-methyl-6-N-ethyl-N-isobutylaminofluoran, 2-anilino-6-dibutylaminofluoran, 2-anilino-3-methyl-6-N-methyl-N-tetrahydrofurfurylaminofluoran, 2-anilino-3-methyl-6-piperidinoaminofluoran, 2-(o-chloroanilino)-6-diethylaminofluoran, 2-(3,4-dichloroanilino)-6-diethylaminofluoran, and so on.

Examples of the thiazine-based compound include benzoyl leucomethylene blue, p-nitrobenzyl leucomethylene blue, and so on.

Examples of the leucoauramine-based compounds include 4,4'-bis-dimethylaminobenzhydrin benzyl ether, N-halophenyl leucoauramine, N-2,4,5-trichlorophenyl leucoauramine, and so on.

Examples of the rhodamine lactam-based compound include rhodamine-B-anilinolactam, rhodamine-(p-nitrino)lactam, and so on.

Examples of the spiropyran-based compound include the compounds described in, for example, U.S. Pat. No. 3,971,808. Specific examples thereof include 3-methyl-spiro-dinaphthopyran, 3-ethyl-spiro-dinaphthopyran, 3,3'-dichloro-spiro-dinaphthopyran, 3-benzylspiro-dinaphthopyran, 3-methyl-naphto-(3-methoxybenzo)spiropyran, 3-propyl-spiro-dibenzopyran, and so on.

Examples of the pyridine-based compound and pyrazine-based compound include the compounds described in, for example, U.S. Pat. Nos. 3,775,424, 3,853,869, and 4,246,318.

Examples of the fluorene-based compound include the compounds described in, for example, JP-A No. 63-094878.

As the dye precursors, which develop cyan, magenta, and yellow colors, the dye precursors described in, for example, U.S. Pat. No. 4,800,149 can be used.

Further, as the electron-donating dye precursors for developing yellow colors, the dye precursors described in, for example, U.S. Pat. Nos. 4,800,148 can also be used. As the electron-donating dye precursors for developing cyan colors, the dye precursors described in, for example, JP-A No. 63-53542 can also be used.

On the other hand, examples of the electron-accepting compound which is the compound B include traditionally known electron-accepting compounds such as a phenol derivative, a salicylic acid derivative, a metal salt of an aromatic carboxylic acid, acid clay, bentonite, a novolak resin, a metal-treated novolak resin, a metal complex, and so on. Specific examples thereof are described in, for example, JP-B Nos. 40-9309 and 45-14039, JP-A Nos. 52-140483, 48-51510, 57-210886, 58-87089, 59-11286, 60-176795, and 61-95988.

Among the substances listed above, examples of the phenol derivative include 2,2-bis(4-hydroxy)phenolpropane, 4-t-butylphenol, 4-phenylphenol, 4-hydroxydiphenoxide, 1,1'-bis(3-chloro-4-hydroxyphenyl)cyclohexane, 1,1'-bis(4-hydroxyphenyl)cyclohexane, 1,1'-bis(3-chloro-4-hydroxyphenyl)-2-ethylbutane, 4,4'-sec-isooctylidenediphenol, 4,4'-sec-butylidenediphenol, 4-tert-octylphenol, 4-p-methylphenylphenol, 4,4'-methylcylcohexylidenephenol, 4,4, -isopentylidenephenol, benzyl p-hydroxybenzoate, and so on.

Examples of the salicylic acid derivative include 4-pentadecylsalicylic acid, 3,5-di(α-methylbenzyl)salicylic acid, 3,5-di(tert-octyl)salicylic acid, 5-octadecylsalicylic acid, 5-α-(p-α-methylbenzylphenyl)ethylsalicylic acid, 3-α-methylbenzyl-5-tert-octylsalicylic acid, 5-tetradecylsalicylic acid, 4-hexyloxysalicylic acid, 4-cyclohexyloxysalicylic acid, 4-decyloxysalicylic acid, 4-dodecyloxysalicylic acid, 4-pentadecyloxysalicylic acid, 4-octadecyloxysalicylic acid, zinc salts of these acids, aluminum salts of these acids, calcium salts of these acids, copper salts of these acids, lead salts of these acids, and so on.

When the image-forming layer, containing the electron-donating dye precursor and the electron-accepting compound, is formed, the content of the electron-donating dye precursor in the image-forming layer is preferably 0.1 to 5 g/m² and more preferably 0.1 to 1 g/m². The amount to be used of the electron-accepting compound is preferably 0.5 to 20 parts by weight, more preferably 3 to 10 parts by weight, per part by weight of the electron-donating, colorless dye. If the amount is less than 0.5 parts by weight, sufficient density of developed color may not be obtained, whereas, if the amount exceeds 20 parts by weight, sensitivity may drop or coatability may become inferior.

When a diazonium compound is used as the color-forming component A, it is preferable to use a compound represented by the following formula:

where Ar represents an aromatic group and $Y^{31}$ represents an acid anion.

The diazonium compound is a compound which, when heated, undergoes a coupling reaction with the coupler as the compound B to thereby develop a color, or a compound which is decomposed by light. It is possible to control the maximum absorption wavelength of the compound by selecting the position or kind of the substituent in the Ar portion.

In the general formula described above, Ar represents a substituted or unsubstituted aryl group. Examples of the substituent include an alkyl group, an alkoxy group, an alkylthio group, an aryl group, an aryloxy group, an arylthio group, an acyl group, an alkoxycarbonyl group, a carbamoyl group, a carboamide group, a sulfonyl group, a sulfamoyl group, a sulfonamide group, a ureido group, a halogen group, an amino group, a heterocyclic group, and so on. These substituents may be further substituted.

The aryl group is preferably an aryl group having 6 to 30 carbon atoms. Examples of the aryl group include a phenyl group, a 2-methylphenyl group, a 2-chlorophenyl group, a 2-methoxyphenyl group, a 2-butoxyphenyl group, a 2-(2-ethylhexyloxy)phenyl group, a 2-octyloxyphenyl group, a 3-(2,4-di-t-pentylphenoxyethoxy)phenyl group, a 4-chlorophenyl group, a 2,5-dichlorophenyl group, a 2,4,6-trimethylphenyl group, a 3-chlorophenyl group, a 3-methylphenyl group, a 3-methoxyphenyl group, a 3-butoxyphenyl group, a 3-cyanophenyl group, a 3-2 ethylhexyloxy)phenyl group, a 3,4-dichlorophenyl group, a 3,5-dichlorophenyl group, a 3,4-dimethoxyphenyl group, a 3-(dibutylaminocarbonylmethoxy)phenyl group, a 4-cyanophenyl group, a 4-methylphenyl group, a 4-methoxyphenyl group, a 4-butoxyphenyl group, a 4-(2-ethylhexyloxy)phenyl group, a 4-benzylphenyl group, a 4-aminosulfonylphenyl group, a 4-N,N-dibutylaminosulfonylphenyl group, a 4-ethoxycarbonylphenyl group, a 4-(2-ethylhexylcarbonyl)phenyl group, a 4-fluorophenyl group, a 3-acetylphenyl group, a 2-acetylaminophenyl group, a 4-(4-chlorophenylthio)phenyl group, a 4-(4-methylphenyl)thio-2,5-butoxyphenyl group, a 4-(N-benzyl-N-methylamino)-2-dodecyloxycarbonylphenyl group, and so on.

These groups may be further substituted by an alkyloxy group, an alkylthio group, a substituted phenyl group, a cyano group, a substituted amino group, a halogen atom, a heterocyclic group, and the like.

Specific examples of the diazonium forming the salt include 4-(p-tolylthio)-2,5-dibutoxybenzenediazonium, 4-((4-chlorophenylthio)-2,5-dibutoxybenzenediazonium, 4-(N,N-dimethylamino)benzenediazonium, 4-(N,N-diethylamino)benzenediazonium, 4-(N,N-dipropylamino)benzenediazonium, 4-(N-methyl-N-benzylamino)benzenediazonium, 4-(N,N-dibenzylamino)benzenediazonium, 4-(N-ethyl-N-hydroxyethylamino)benzenediazonium, 4-((N,N-diethylamino)-3-methoxybenzenediazonium, 4-(N,N-dimethylamino)-2-methoxybenzenediazonium, 4-(N-benzoylamino)-2,5-diethoxybenzenediazonium, 4-molpholino-2,5-dibutoxybenzenediazonium, 4-anilinobenzenediazonium, 4-[N-(4-methoxybenzoyl)amino]-2,5-diethoxybenzenediazonium, 4-pyrrolidino-3-ethylbenzenediazonium, 4-[N—(1-methyl-2-(4-methoxyphenoxy)ethyl)-N-hexylamino]-2-hexyloxybenzenediazonium, 4-[N-(2-(4-methoxyphenoxy)ethyl)-N-hexylamino]-2-hexyloxybenzenediazonium, 2-(1-ethylpropyloxy)-4-[di-(di-n-butylaminocarbonylmethyl)amino]benzenediazonium, and so on.

From the standpoint of effectiveness, the maximum absorption wavelength $\lambda_{max}$ of the diazonium compound is preferably 450 nm or less and more preferably 290 to 440 nm. In addition, it is desirable that the diazonium compound has 12 or more carbon atoms and has a solubility in water of 1% or less and a solubility in ethyl acetate of 5% or more.

The diazonium compounds may be used singly or in combinations of two or more kinds for such purpose as adjustment of hue.

Examples of the compound B when the diazonium compound is used as the color-forming component A include couplers such as a so-called active methylene compound having a methylene group adjacent to a carbonyl group, a phenol derivative, and a naphthol derivative. Specific examples thereof include resorcinol, fluoroglycine, 2,3-dihydroxynaphthalene, sodium 2,3-dihydroxynaphthalene-6-sulfonate, 1-hydroxy-2-naphthoic acid morpholinopropylamide, sodium 2-hydroxy-3-naphthalenesulfonate, 2-hydroxy-3-naphthalenesulfonic acid anilide, 2-hydroxy-3-naphthalenesulfonic acid morpholinopropylamide, 2-hydroxy-3-naphthalenesulfonic acid-2-ethylhexyloxypropylamide, 2-hydroxy-3-naphthalenesulfonic acid-2-ethylhexylamide, 5-acetamido-1-naphthol, sodium 1-hydroxy-8-acetamidonaphthalene-3,6-disulfonate, 1-hydroxy-8-acetamidonaphthalene-3,6-disulfonic acid dianilide, 1,5-dihydroxynaphthalene, 2-hydroxy-3-naphthoic acid morpholinopropylamide, 2-hydroxy-3-naphthoic acid octylamide, 2-hydroxy-3-naphthoic acid anilide, 5,5-dimethyl-1,3-cyclohexanedione, 1,3-cyclopentanedione, 5-(2-n-tetradecyloxyphenyl)-1,3-cyclohexanedione, 5-phenyl-4-methoxycarbonyl-1,3-cyclohexanedione, 5-(2,5-di-n-octyloxyphenyl)-1,3-cyclohexanedione, N,N'-dicyclohexylbarbituric acid, N,N'-di-n-dodecylbarbituric acid, N-n-octyl-N'-n-octadecylbarbituric acid, N-phenyl-N'-(2,5-di-n-octyloxyphenyl)barbituric acid, N,N'-bis(octadecyloxycarbonylmethyl)barbituric acid, 1-phenyl-3-methyl-5-pyrazolone, 1-(2,4,6-trichlorophenyl)-3-anilino-5-pyrazolone, 1-(2,4,6-trichlorophenyl)-3-benzamido-5-pyrazolone, 6-hydroxy-4-methyl-3-cyano-1-(2-ethylhexyl)-2-pyridone, 2,4-bis(benzoylacetamido)toluene, 1,3-bis(pivaloylacetamidomethyl)benzene, benzoylacetonitrile, thenoylacetonitrile, acetoacetanilide, benzoylacetanilide, pivalolylacetanilide, 2-chloro-5-(N-n-butylsulfamoyl)-1-pivaloylacetamidobenzene, 1-(2-ethylhexyloxypropyl)-3-cyano-4-methyl-6-hydroxy-1,2-dihydropyridine-2-one, 1-(dodecyloxypropyl)-3-acetyl-4-methyl-6-hydroxy-1,2-dihydropyridine-2-one, 1-(4-n-octyloxyphenyl)-3-tert-butyl-5-aminopyrazole, and so on.

For details of the coupler compounds, reference can be made to those described in, for example, JP-A Nos. 4-201483, 7-223367, 7-223368, 7-323660 5-278608, 5-297024, 6-18669, 6-18670, 7-316280, 9-216468, 9-216469, 9-319025, 10-035113, 10-193801, and 10-264532.

The coupler compounds undergo a coupling reaction with diazonium compounds to form dyes in a basic environment and/or a neutral environment. According to purposes such as color adjustment, a number of kinds of coupler compounds can be used together.

When an image-forming layer, containing the diazonium salt compound and the coupler, is formed, the content of the diazonium salt compound in the image-forming layer is preferably 0.01 to 3 $g/m^2$ and more preferably 0.02 to 1.0 $g/m^2$. If the content is less than 0.01 $g/m^2$, sufficient density of developed color is not obtained, whereas, if the content exceeds 3 $g/m^2$, coatability of the coating liquid becomes inferior. The amount to be used of the coupler compound is preferably 0.5 to 20 parts by weight, more preferably 1 to 10 parts by weight, per part by weight of the diazonium salt compound. If the amount is less than 0.5 parts by weight, sufficient color developability is not obtained, whereas, if the amount exceeds 20 parts by weight, coatability becomes undesirably inferior.

(Deblocking agent)

Preferably, the deblocking agent is at least one selected from an acid, a base, an oxidizing agent, an alkylating agent, and a metal salt.

Acid

A wide range of compounds having an active hydrogen can be used as the acid. The term "acid" as used herein refers an acid in a broad sense and thus includes a Lewis acid as well. Preferable as the acids are organic acids such as aliphatic carboxylic acids, aromatic carboxylic acids, sulfonic acids, phenols, naphthols, carbonamides, sulfoneamides, ureas, thioureas, and active methylene compounds.

Specific examples of these organic acids include aliphatic carboxylic acids such as behenic acid, stearic acid, oleic acid, lauric acid, caproic acid, myristic acid, maleic acid, fumaric acid, palmitic acid, tartaric acid, linoleic acid, levulinic acid, 4-acetylbutyric acid, 7-oxooctanoic acid, monoethyl maleate, mono-2-ethylhexyl maleate, monoethyl fumarate, and o-methoxycinnamic acid, aromatic carboxylic acids such as benzoic acid, 4-octylbenzoic acid, 4-dodecyloxybenzoic acid, phthalic acid, mono-2-ethylhexyl phthalate, 3-chloro-4-hydroxybenzoic acid, salicylic acid, 4-pentadecylsalicylic acid, 4-methoxycarbonylaminosalicylic acid, 4-n-octyloxycarbonylaminosalicylic acid, 3,5-di(α-methylbenzyl)salicylic acid, 3,5-di(tert-octyl)salicylic acid, and 5-octadecylsalicylic acid, sulfonic acids such as ethanesulfonic acid and 4-dodecylbenzenesulfonic acid, phenols such as 3-pentadecylphenol, 4-t-butylphenol, 2,2'-bis(4-hydroxyphenyl)propane, benzyl p-hydroxybenzoate, 2-ethylhexyl p-hydroxybenzoate, and 2-ethylhexyl 3-chloro-4-hydroxybenzoate, octadecaneamide, N-butylbenzenesulfonamide, 4-(isoamyloxy)benzenesulfonamide, 4-(2-ethylhexyl)-N-acetylsulfonamide, N-octadecylurea, N-phenyl-N'-octylurea, N-(2-ethylhexyl)-N'-(p-toluenesulfonyl)urea, 1-benzyl-3-methyl-2-thiourea, n-octyl cyanoacetate, Meldrum's acid, and so on. These acids may be used singly or in combinations of two or more kinds.

Base

Preferably, the bases are organic bases, such as primary to tertiary amines, piperizines, piperazines, amidines, formamidines, pyridines, guanidines, and morpholines. A base precursor that develops the base can also be used as the base. The term "base" as used herein means a base in a broad sense and includes a nucleophilic agent (a Lewis base) in addition to a base in a narrow sense.

Specific examples of the organic base include piperazines such as N,N'-bis(3-phenoxy-2-hydroxypropyl)piperazine, N,N'-bis [3-(p-methylphenoxy)-2-hydroxypropyl] piperazine, N,N'-bis [3-(p-methoxyphenoxy)-2-hydroxypropyl]piperazine, N,N'-bis(3-phenylthio-2-hydroxypropyl)piperazine, N,N'-bis [3-(βnaphthoxy)-2-hydroxypropyl]piperazine, N-3-(βnaphthoxy)-2-hydroxypropyl-N'-methylpiperazine, and 1,4-bis {[3-(N-methylpiperazino)-2-hydroxy]propyloxy}benzene, morpholines such as N-[3-(β-naphthoxy)-2-hydroxy] propylmorpholine, 1,4-bis [(3-morpholino-2-hydroxy) propyloxy]benzene, and 1,3-bis [(3-morpholino-2-hydroxy) propyloxy]benzene, piperidines such as N—(3-phenoxy-2-hydroxypropyl)piperidine and N-dodecylpiperidine, triphenylguanidine, tricyclohexylguanidine, dicyclohexylguanidine, 4-hydroxybenzoic acid 2-N-methyl-N-benzylaminoethyl ester, 4-hydroxybenzoic acid 2-N,N-di-n-butylaminoethyl ester, 4-(3-N,N-dibutylaminopropoxy)benzenesulfonamide, 4-(2-N,N-dibutylaminoethoxycarbonyl)phenoxyacetic acid amide, trioctylamine, octadecylamine, N-methyl-N-octadecylamine, and so on. These organic bases may be used singly or in combinations of two or more kinds.

These organic bases are described in, for example, JP-A Nos. 57-123086, 60-49991, 60-94381, 09-071048, 09-077729, and 09-077737.

The term "base precursor" as used herein means a compound that releases a base when heated and includes a salt of a base and an organic acid. The base that constitutes the base precursor is preferably selected from those listed as examples of the bases described previously. General Brönsted acid and Lewis acid can be used as the organic acids. In addition, a carboxylic acid that releases a base by a decarboxylation reaction can also be used. In this sense, such acids as sulfonylacetic acid and propiolic acid are preferable because these acids easily cause a decarboxylation reaction. Furthermore, sulfonylacetic acid and propiolic acid, which have an aromatic substituent (such as an aryl or heterocyclic group), are preferable because the decarboxylation reaction is further accelerated. The sulfonylacetic acid salts as base precursors are described more specifically in JP-A No. 59-168441. The propiolic acid as a base precursor is described more specifically in JP-A No. 59-180539.

Examples of diacidic precursors capable of releasing amidine or guanidine are shown below. However, it should be noted that the base precursors, which become the deblocking agents in the present invention, are not limited to these examples.

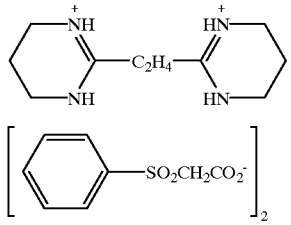

BP-1

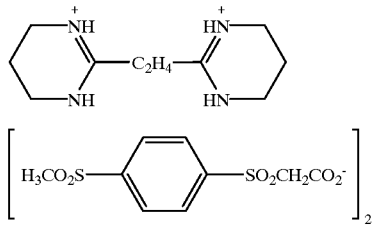

BP-2

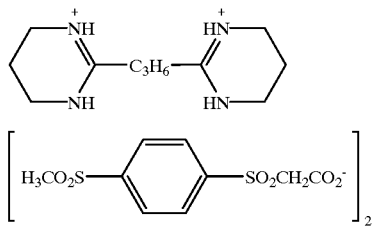

BP-3

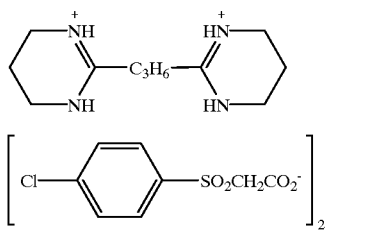

BP-4

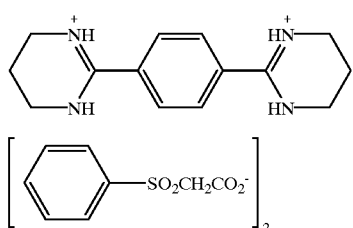

BP-5

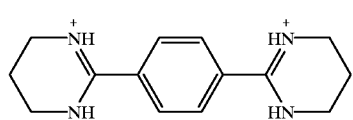

BP-6

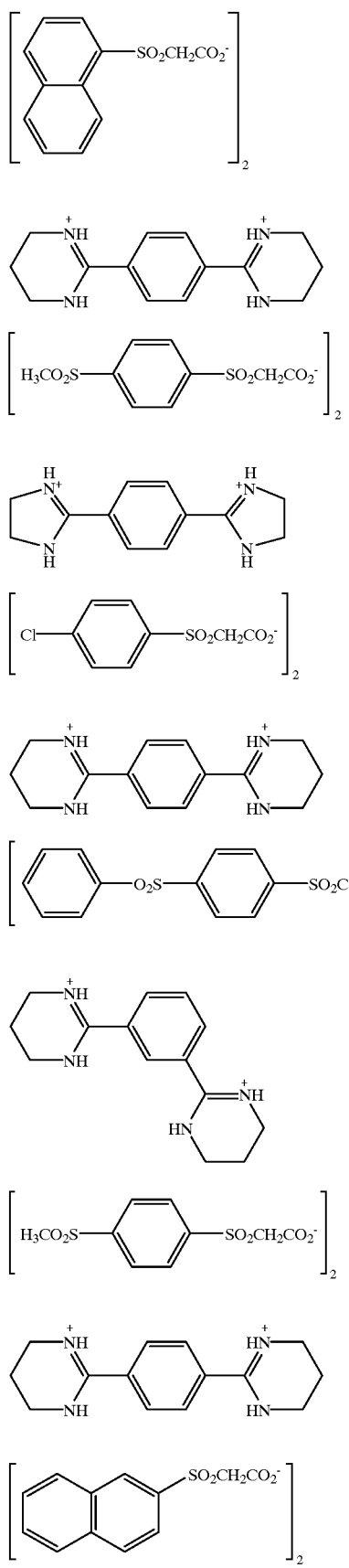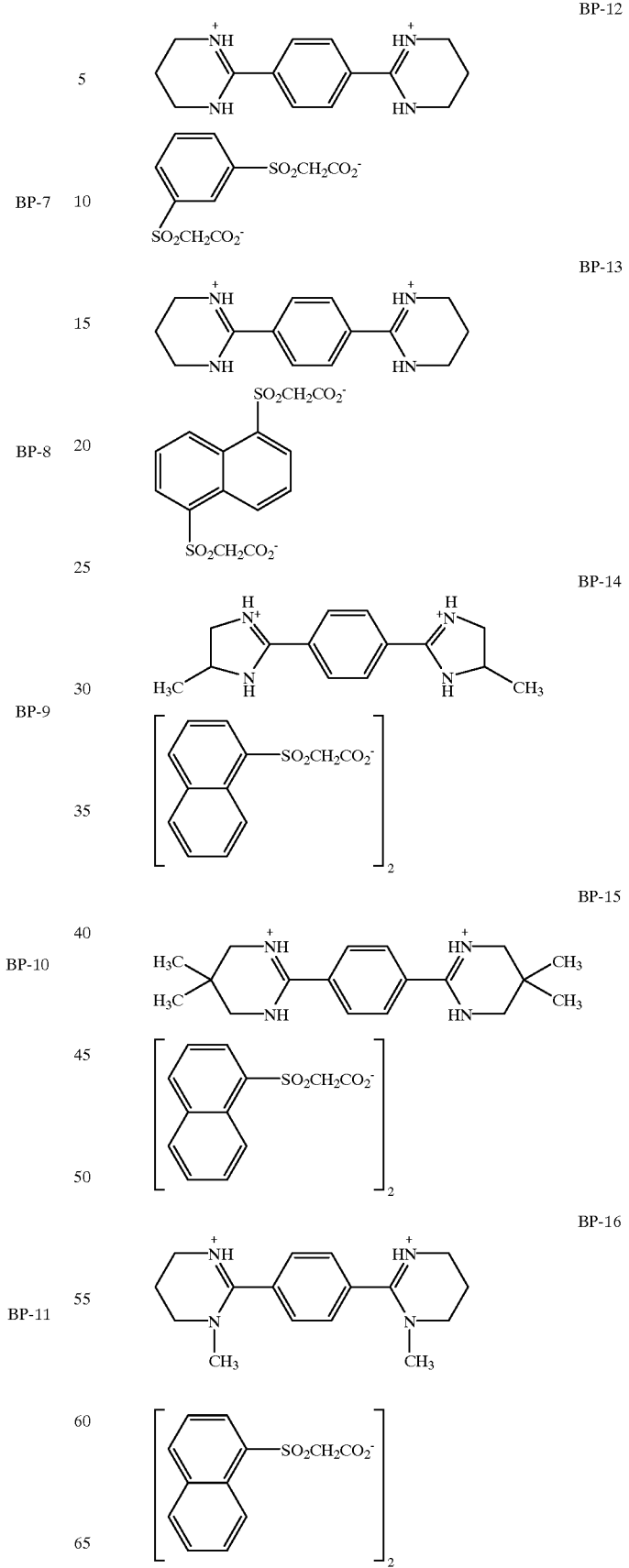

BP-17
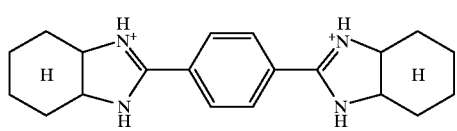
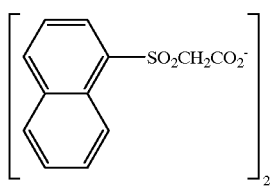
BP-18
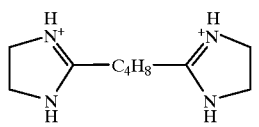
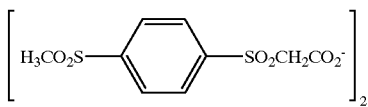
BP-19
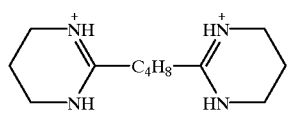
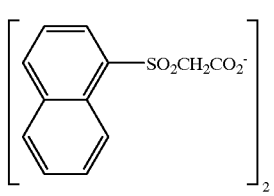
BP-20
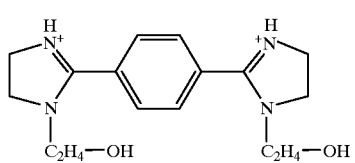
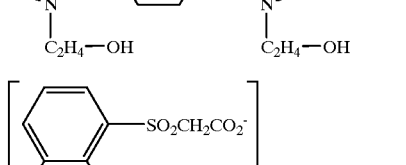
BP-21
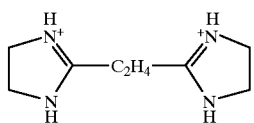
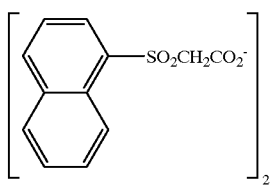
BP-22
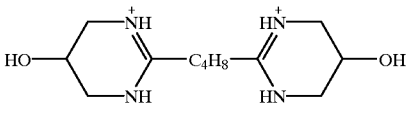
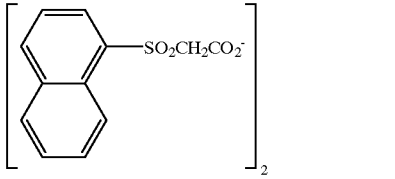
BP-23
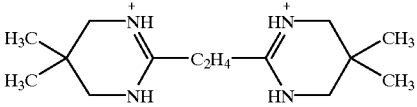
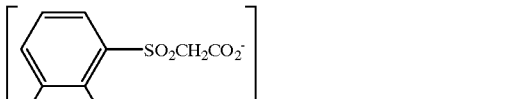
BP-24
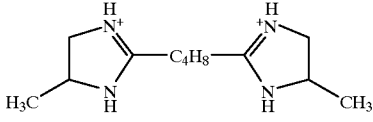
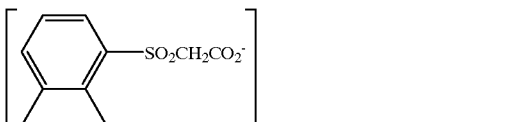
BP-25
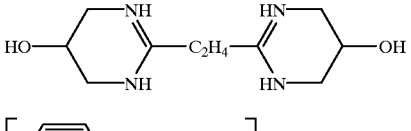
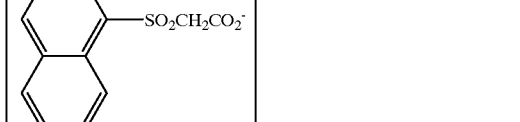
BP-26
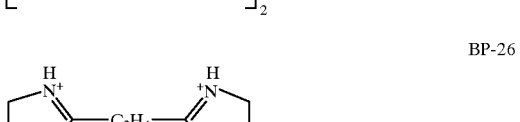
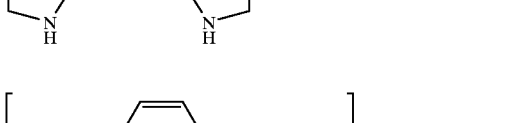

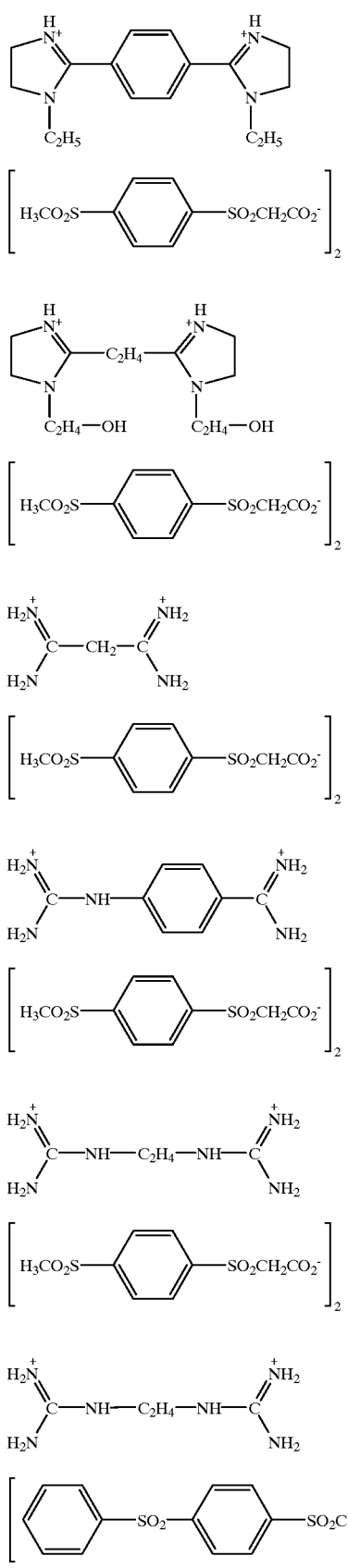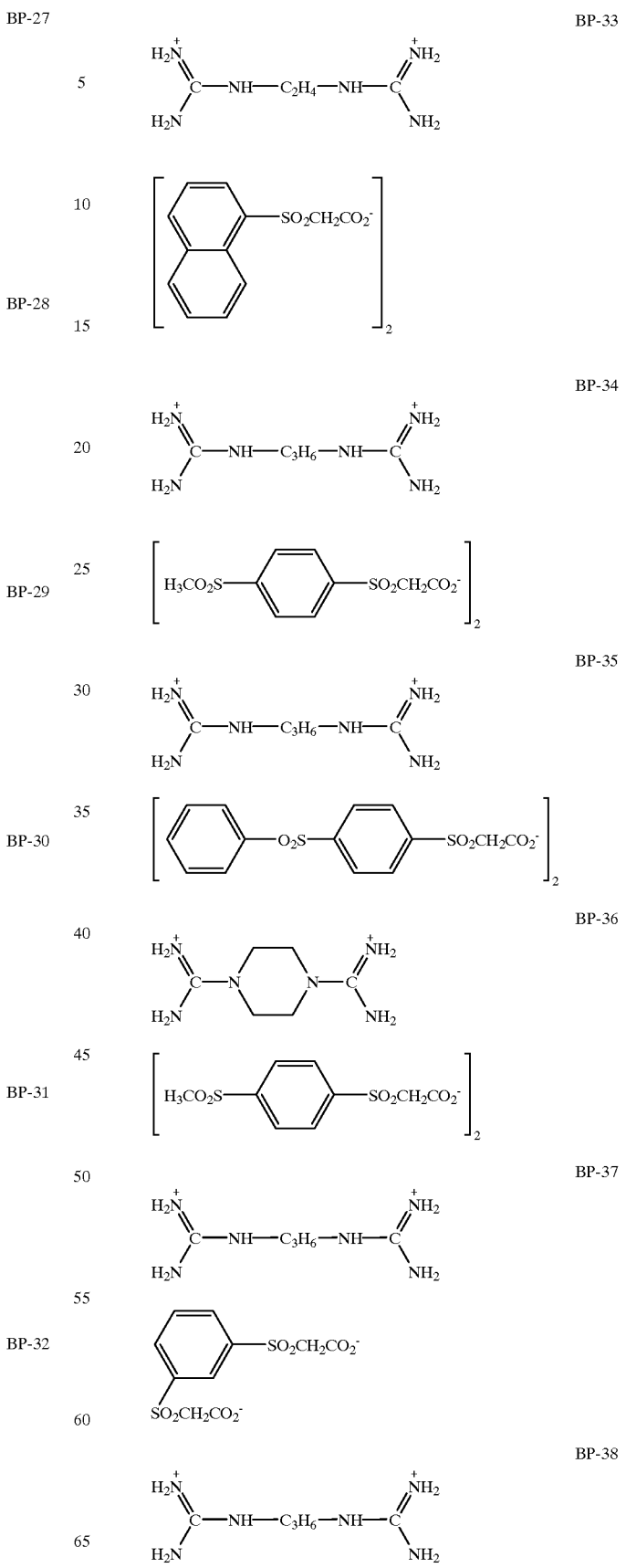

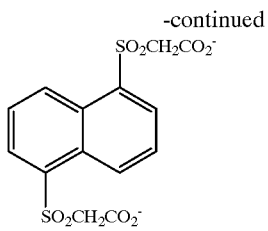

BP-39

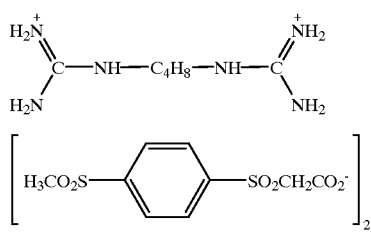

BP-40

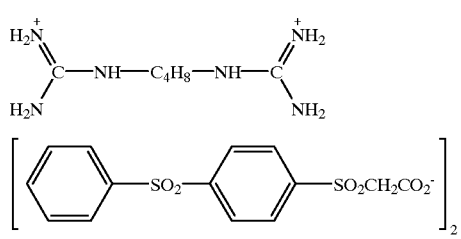

BP-41

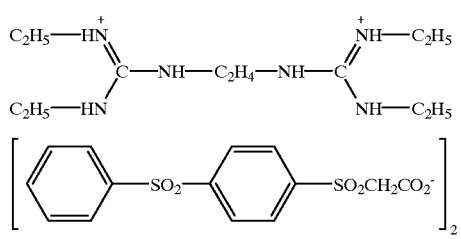

Oxidizing Agent

Examples of the oxidizing agent include quinones such as 2,3-dichloro-5,6-dicyano-1,4-benzoquinone and tetrachloro-1,4-benzoquinone, nitro compounds such as nitrobenzene and m-nitrobenzenesulfonic acid, nitroso compounds such as nitrosobenzene, cations such as triphenylcation, azo compounds such as diethyl azodicarboxylate, nitroxides such as diphenyl nitroxide, porphyrioxide, and 2,2,6,6-tetramethylpiperidine-1-oxyl, N-oxides such as pyridine-N-oxide, peroxides such as sodium perchlorate, potassium periodate, and m-chloroperbenzoate, halogens such as bromine and iodine, hypochlorites such as sodium hypochlorite, metal oxides such as manganese dioxide, and so on. These oxidizing agents may be used singly or in combinations of two or more kinds.

Alkylating Agent

Examples of the alkylating agent include alkyl halides such as alkyl iodide and alkyl bromide, sulfuric acid alkyl esters, and sulfonic acid esters.

The alkyl group may have a substituent. Examples of the substituent include an alkoxycarbonyl group, an aryloxycarbonyl group, a carbamoyl group, a sulfonyl group, a sulfamoyl group, an acyl group, and so on.

Specific examples of the alkylating agent include 1-iodooctane, 1-iodononane, 1-iodododecane, 1-iodoundecane, 1-iodododecane, 1-iodohexadecane, n-decyl bromoacetate, n-dodecyl bromoacetate, n-octadecyl bromoacetate, bromoacetic acid N,N-di-n-butylamide, n-octyl 3-bromopropionate, n-hexadecyl 4-bromobutyrate, 2-(2,5-di-t-amylphenyloxy)ethyl 4-bromobutyrate, 2-(2,5-di-t-amylphenyloxy)ethyl 5-bromovalerate, 6-bromocaproic acid N,N-di-n-butylamide, 6-bromocaproic acid N,N-di-n-hexylamide, dibutyl sulfate, diamyl sulfate, dihexyl sulfate, dioctyl sulfate, n-hexyl p-toluenesulfonate, n-octyl p-toluenesulfonate, n-octadecyl p-toluenesulfonate, n-octadecyl methanesulfonate, and so on. These alkylating agents may be used singly or in combinations of two or more kinds.

Metal Salt

Examples of the metal salt include metal salts of compounds having amercapto group, a thionyl group, or an imino group besides metal salts of the aliphatic carboxylic acids listed as acids and metal salts of aromatic carboxylic acids listed as acids.

Specific examples of these acids include 2-mercaptobenzimidazole, 2-mercaptobenzoxazole, 2-mercapto-5-aminothiazole, thioamide, 5-carboxy-1-methyl-2-phenyl-4-thiopyridine, mercaptotriazine, 3-(2-carboxyethyl)-4-methyl-(4-thiazoline)-2-thione, benzotriazole, 1,2,4-triazole, 1H-tetrazole, imidazole, and so on.

Examples of the metal atom include monovalent metals such as sodium, potassium, lithium, and silver, and polyvalent metals such as zinc, magnesium, barium, calcium, aluminum, tin, titanium, nickel, cobalt, manganese, and iron. In particular, silver, zinc, aluminum, magnesium, and calcium are preferable.

Specific examples of the metal salts include silver behenate, silver stearate, zinc 3,5-di($\alpha$-methylbenzyl) salicylate, zinc 4-n-octyloxycarbonylaminosalicylate, silver salt of 2-mercaptobenzimidazole, silver salt of 5-chlorobenzotriazole, and so on. The metal salts may be used singly or may be used in combinations of two or more kinds.

The deblocking agent may have a polymerizable group and may act as a polymerizable compound simultaneously. Specific examples of such deblocking agents are listed hereinafter in the paragraph on "polymerizable compounds".

The content (in moles) of the deblocking agent is preferably 0.1 to 100 times, more preferably 0.5 to 30 times, the content (in moles) of the azomethine dye precursor described later. However, it should be noted that the content is not limited to the content described above because a preferable content range of the deblocking agent varies depending on the azomethine dye precursor with which it is used.

(Photopolymerization initiator)

The photopolymerization initiator to be used may be a conventionally known one. Photopolymerization initiator is, for example, a benzophenone derivative or an acetophenone derivative. Specific examples of the photopolymerization initiator include $\alpha$-hydroxy- or $\alpha$-aminoacetophenone, 4-aroyl-1,3-dioxolane, benzoyl alkyl ether and benzylketal, monoacylphosphine oxide, bisacylphosphine oxide or titanocene, fluoroscein, anthraquinone, thioxanthone, xanthone, and so on. The photopolymerization initiator is preferably a combination of a dye and a radical generator capable of interacting with the dye to thereby generate a radical. This is because, when irradiated with light, the combination can generate a radical in the exposed portion locally and in an effective way, and can also provide a high level of sensitivity.

Examples of the radical generator include aromatic ketones such as benzophenone, 4,4-bis(dimethylamino)

benzophenone, 4-methoxy-4'-dimethylaminobenzophenone, 4,4'-dimethoxybenzophenone, 4-dimethylaminobenzophenone, 4-dimethylaminoacetophenone, benzylanthraquinone, 2-tert-butylanthraquinone, 2-methylanthraquinone, xanthone, thioxanthone, 2-chlorothioxanthone, 2,4-diethylthioxanthone, fluorenone, acridone, (bis) acylphosphine oxides, e.g., bis(2,4,6-trimethylbenzoyl)-phenylphosphine oxide; benzoin and benzoin ethers such as benzoin methyl ether, benzoin ethyl ether, benzoin isopropyl ether, and benzoin phenyl ether; dimers of 2,4,6-triarylimidazole such as a diner of 2-(o-chlorophenyl)-4,5-diphenylimidazole, a dimer of 2-(o-chlorophenyl)-4,5-di(m-methoxyphenyl)imidazole, a dimer of 2-(o-fluorophenyl)-4,5-diphenylimidazole, a dimer of 2-(o-methoxyphenyl)-4,5-diphenylimidazole, and a dimer of 2-(p-methoxyphenyl)-4,5-diphenylimidazole; polyhalogencompounds such as carbon tetrabromide, phenyltribromomethylsulfone, and phenyltrichloromethyl ketone; compounds described in JP-A Nos. 59-133428, JP-B No. 57-1819, JP-B No. 57-6096, and U.S. Pat. No. 3,615,455; S-triazine derivatives having a trihalogen-substituted methyl group described in JP-A No. 58-29803 such as 2,4,6-tris(trichloromethyl)-S-triazine, 2-methoxy-4,6-bis(trichloromethyl)-S-triazine, 2-amino-4,6-bis(trichloromethyl)-S-triazine, and 2-(p-methoxystyryl)-4,6-bis(trichloromethyl)-S-triazine; organic peroxides described in JP-A No. 59-189340 such as methyl ethyl ketone peroxide, cyclohexanone peroxide, 3,3,5-trimethylcyclohexanone peroxide, benzoyl peroxide, di-t-butyl diperoxyisophthalate, 2,5-dimethyl-2,5-di (benzoylperoxy)hexane, t-butyl peroxybenzoate, a,a'-bis(t-butylperoxyisopropyl)benzene, dicumylperoxide, and 3,3', 4,4'-tetra-(t-butylperoxycarbonyl)benzophenone; azinium salts described in U.S. Pat. No. 4,743,530; organoboron compounds described in European Patent No. 0,223,587 such as tetramethylammonium salt of triphenylbutylborate, tetrabutylammonium salt of triphenylbutylborate, and tetramethylammonium salt of tri(p-methoxyphenyl) butylborate; diaryliodonium salts; and iron allene complexes.

In addition, a combination of two or more radical generators can also be used. Examples of the combination include a combination of a dimer of 2,4,5-triarylimidazole and mercaptobenzoxazole or the like, a combination of 4,4'-bis(dimethylamino)benzophenone and benzophenone or benzoin methyl ether described in U.S. Pat. No. 3,427, 161, a combination of benzoyl-N-methylnaphthothiazoline and 2,4-bis(trichloromethyl)-6-(4'-methoxyphenyl)-triazole described in U.S. Pat. No. 4,239,850, a combination of a dialkylaminobenzoate ester and dimethylthioxanthone described in JP-A No. 57-23602, a combination made up of 3 kinds of compounds, i.e., 4,4'-bis(dimethylamino) benzophenone, benzophenone, and a polyhalogenated-methyl compound described in JP-A No. 59-78339.

Preferable as the radical generators are organoboron compounds, benzoin ethers, S-triazine derivatives having a trihalogen-substituted methyl group, organic peroxides, (bis)acylphosphine oxides, lophine dimers, titanocenes, and azinium salt compounds because, when irradiated with light, these radical generators can generate a radical locally in the exposed portion in an effective way and can provide a high level of sensitivity. In particular, organoboron compounds are preferable from the standpoint of sensitive wavelength and radical generation efficiency.

Examples of the organoboron compounds include the organoboron compounds described in JP-A Nos. 62-143044, 9-188685, 9-188686, 9-188710, 11-269210, etc., and spectral sensitizing dye-based organoboron compounds obtainable from cationic dyes. Organoboron compounds represented by the following general formula (2) are preferable.

General formula (2)

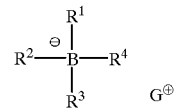

In the general formula (2), $R^1 \sim R^4$ each represents an alkyl group, an aryl group, a heterocyclic group, or $SiR^5R^6R^7$. $R^5$, $R^6$, and $R^7$ each represents an alkyl group or an aryl group, while $G^+$ represents a group capable of forming a cation.

In the general formula (2), it is preferable that at least one of $R^1 \sim R^4$ is an alkyl group. Further, from the standpoint of sensitivity and storability, it is preferable that the general formula (2) has a triarylalkyl borate skeleton.

Furthermore, it is also preferable that a plurality of photopolymerization initiators composed of an organoboron compound and a dye and/or other kinds of photopolymerization initiators are used in combination such that sensitive wavelengths vary.

The organoboron compound represented by the general formula (2) is explained in detail below.

In the general formula (2), the alkyl group of $R^1 \sim R^4$ is preferably an alkyl group having 1 to 18 carbon atoms, and more preferably an alkyl group having 1 to 12 carbon atoms. The alkyl group may have an unsaturated bond. The alkyl group may be a straight-chain alkyl group or may be a branched alkyl group.

In the general formula (2), the aryl group of $R^1 \sim R^4$ is preferably an aryl group having 6 to 26 carbon atoms, and more preferably a phenyl group or a naphthyl group.

These alkyl groups and aryl groups may have substituents. Examples of the substituents include an alkyl group, an aryl group, an alkoxy group, an aryloxy group, an alkylthio group, an arylthio group, a halogen atom, an alkoxycarbonyl group, an aryloxycarbonyl group, an acyloxy group, CN, and $NO_2$.

In the general formula (2), examples of the heterocyclic group include heterocyclic groups having such rings as furan, thiophene, pyrrole, imidazole, pyrazole, triazole, pyridine, and pyrimidine rings.

In the general formula (2), examples of $SiR^5R^6R^7$ include trimethylsilyl, triphenylsilyl, dimethylphenylsilyl, di-t-butylphenylsilyl, and so on.

In the general formula (2), $G^+$ is a group capable of forming a cation, as stated previously. This group is, for example, an alkali metal (particularly lithium or sodium), an alkaline earth metal, a transition metal, a quaternary ammonium, a dye cation, or a cationic coordinate complex compound of transition metal. Preferably, this group is ammonium, a tetraalkylammonium, or a dye cation. The tetraalkylammonium is represented by the following formula:

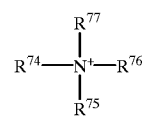

In the formula described above, $R^{74} \sim R^{77}$ each represents an alkyl group. Accordingly, examples of the tetraalkylammonium include tetramethylammonium in which $R^{74} \sim R^{77}$ are methyl groups, tetraethylammonium in which $R^{74} \sim R^{77}$ are ethyl groups, tetrapropylammonium in which $R^{74} \sim R^{77}$ are propyl groups, and tetrabutylammonium in which $R^{74} \sim R^{77}$ are butyl groups.

In the formula described above, $G^+$ is also preferably a benzyltrialkylammonium represented by the following formula:

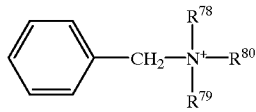

In the formula described above, $R^{78} \sim R^{80}$ each represents an alkyl group. Preferable examples of the benzyltrialkylammonium include benzyltrimethylammonium, benzyltriethylammonium, benzyltripropylammonium, and benzyltributylammonium.

Also preferable is a trisalkylammonium ion, for example, trimethylammonium ion. Besides, $G^+$ may be a phosphonium ion or ammonium ion indicated below.

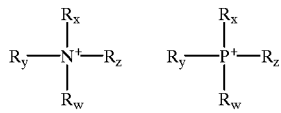

In the general formula described above, $R_w$, $R_x$, $R_y$, and $R_z$ each independently represents a hydrogen atom, a substituted or unsubstituted alkyl, cycloalkyl, alkenyl, phenyl, or arylalkyl group. Specific examples of the substituents of these alkyl, cycloalkyl, alkenyl, phenyl, and arylalkyl groups include a halogen atom, a hydroxyl group, a heterocycloalkyl group (such as an epoxy group, an aziridyl group, an oxetanyl group, a furanyl group, a pyrrolidinyl group, a pyrrolyl group, a thiophenyl group, and a tetrahydrofuranyl group), a dialkylamino group, an amino group, a carboxyl group, an alkylcarbonyl or arylcarbonyl group, an aryloxycarbonyl or alkoxycarbonyl group. The quadrivalent nitrogen atom may be part of a 5- or 6-membered ring, and other ring may be fused with the ring. These rings may contain other heteroatom such as S, N, or O.

Further, $G^+$ may be a polyammonium or polyphosphonium ion which is a poly-ion structure of the above-described ammonium or phosphonium ion. A bis-structure is particularly preferable as the poly-ion. Where the poly-ion has a substituent, examples of the substituent are the same as those listed as the substituents of the mono-ions described above.

The above-described ammonium ion and phosphonium ion may be substituted by a neutral dye (such as thioxanthene, thioxanthone, coumarin, or ketocoumarin). These ions are obtained by the reaction between an ammonium or phosphonium ion having a reactive substituent (such as an epoxy group, an amino group, or a hydroxyl group) and a suitable neutral dye. For example, reference may be made to Quantacure QTX described in EP-A-224967.

Likewise, the ammonium ion and phosphonium ion can be substituted by a colorless, electron-accepting substance (such as benzophenone). Examples of $G^+$, in which an ammonium ion is substituted by benzophenone, are given below. However, it should be noted that the present invention is not limited to these examples.

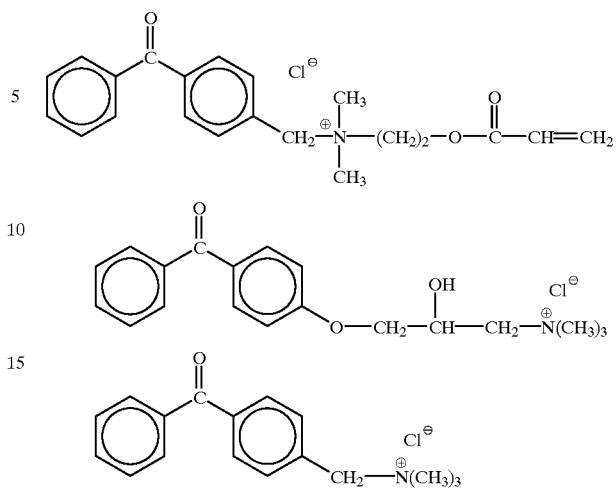

Examples of the quaternary ammonium ion include a trimethylcetylammonium ion and a cetylpyridinium ion.

Other examples of $G^+$ are the cations included in the cation group 1 indicated below.

cation group 1

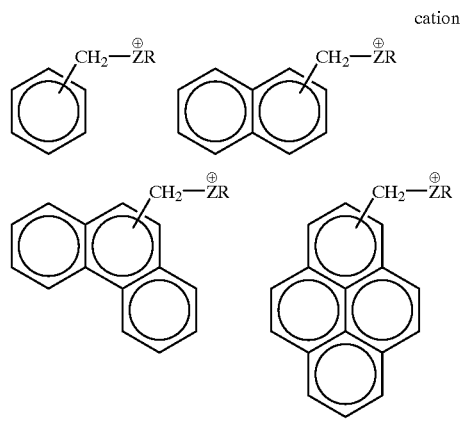

In the formulae described above, Z represents P, S, or N, and R represents an alkyl group or an aryl group.

Yet other examples of $G^+$ are the cations included in the cation group 2 or cation group 3 indicated below. In the formulae of the cation group 2 described below, R represents an alkyl group or an aryl group. These cations are described in Yaguchi, et al., J. Polym. Sci. Part A: Polymer Chem. 1992, 30, 1987 and Polymer, 1993, 34(6), 1130. In the formulae of the cation group 3, R' represents an unsubstituted or substituted benzyl or phenacyl group. These cations are disclosed in JP-A No. 7-770221. The aromatic ring in the pyrimidinium portion of these cations may have a substituent.

cation group 2

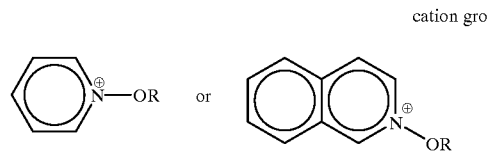

-continued cation group 3

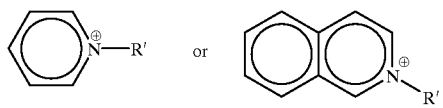

Other cationic counter ion G+ may be other onium ion such as an iodonium ion or a sulfonium ion. These cations are disclosed in, for example, EP-A-555058 and EP-A-690074. Some examples thereof include the cations represented by the following formula:

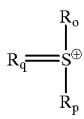

The cations indicated below are also desirable as G+.

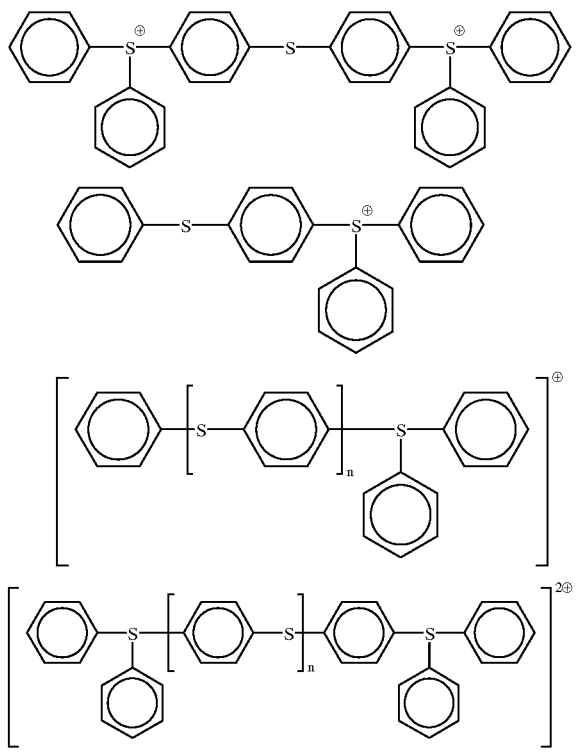

Still other examples of G+ are the cations indicated below. In the formulae described below, $R_g$ represents an alkyl group, an ethyl group in particular, or a benzyl group. The aromatic ring may have a substituent.

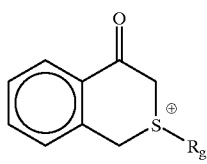

G+ may be a halonium ion. Particularly preferable as the halonium ions are the diaryliodonium ions disclosed in, for example, EP-A-334056 and EP-A-562897.

Also preferable are the ferrocenium cations represented by the following formula and described in EP-A-94915 and EP-A-109851.

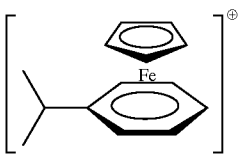

G+ may be an onium ion disclosed in JP-A No. 6-266102 such as an ammonium ion, a phosphonium ion, sulfonium ion, an iodonium ion, a selonium ion, an arsonium ion, a tellonium ion, and a bismuthonium ion.

G+ may be a cationic complex compound of transition metal. Specific examples thereof include the cationic complex compounds of transition metals described in U.S. Pat. No. 4,954,414. Particularly preferable are bis(2,2'-bipyridine) (4,4'-dimethyl-2,2'-bipyridine)ruthenium, tris(4,4'-dimethyl-2,2'-bipyridine)ruthenium, tris(4,4'-dimethyl-2,2'-bipyridine)iron, tris(2,2', 2"-terpyridine)ruthenium, tris(2,2'-bipyridine)ruthenium, and bis(2,2'-bipyridine)(5-chloro-1,10-phenanthrene)ruthenium.

G+ may be a cationic dye. Specific examples thereof include cationic dyes such as cyanine dyes and cationic dyes of triarylmethane.

The organoboron compounds described in the general formula (2) can be used in combinations with conventionally known photopolymerization initiators such as benzophenone or acetophenone derivatives, e.g., α-hydroxy- or α-aminoacetophenone, 4-aroyl-1,3-dioxolane, benzoin alkyl ether and benzylketal, monoacylphosphine oxide, bisacylphosphine oxide, titanocene, fluorescein, anthraquinone, thioxanthone, or xanthone. Particularly suitable photopolymerization initiators are 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4 (2-hydroxyethoxy)-benzoyl]-1-hydroxy-1-methylethane, 1-[4(acryloyloxyethoxy)-benzoyl]-1-hydroxy-1-methylethane, diphenylketone, phenyl-1-hydroxy-cyclohexylketone, (4-morpholinobenzoyl)-1-benzyl-1-dimethylaminopropane, 1-(3,4-dimethoxyphenyl)-2-benzyl-2-dimethylamino-butane-1-one, (4-methylthyrobenzoyl)-1-methyl-1-morpholino-ethane, benzyldimethylketal, bis (cyclopentadienyl)-bis(2,6-difluoro-3-pyryl-phenyl)titan, cyclopentadienyl-allene-iron(II) complexsalt, e.g., ($\eta^6$-isopropylbenzene)-($\eta^5$-cyclopentadienyl)iron(II) hexafluorophosphate, trimethylbenzoyldiphenylphosphine oxide, bis(2,6-dimethoxybenzoyl)-(2,4,4-trimethylpentyl)-phosphine oxide, bis(2,4,6-trimethylbenzoyl)-2,4-dipentyloxyphenyl-phosphine oxide, or bis(2,4,6-trimethylbenzoyl)phenyl-phosphine oxide.

Other suitable additional photopolymerization initiators can be found in U.S. Pat. No. 4,950,581, column 20, line 35, to column 21, line 35. Also suitable are triazine compounds, for example, the triazines described in EP-A-137452, DE-A-2718254, and DE-A-2243621. Other suitable triazines are found in U.S. Pat. No. 4,950,581, column 14, line 60, to column 18, line 44. Among trihalomethyltriazines, particularly interesting is, for example, 2,4-bis(trichloromethyl)-6-(4-styrylphenyl)-s-triazine. When this novel photopolymerization initiator (c) is used in a hybrid system, a cationic photopolymerization initiator such as a peroxide compound, e.g., benzoyl peroxide (other suitable peroxides are described in U.S. Pat. No. 4,950,581, column 19, lines 17~25), an aromatic sulfonium or iodonium salt, or cyclopentadienyl-allene-iron(II) complex salt such as ($\eta^6$-isopropylbenzene)-($\eta^5$-cyclopentadienyl)-iron(II) hexafluorophosphate described in U.S. Pat. No. 4,950,581, column 18, line 60, to column 19, line 10, is used in addition to the novel free radical hardener.

The dye, which is combined with the radical generator, may be any dye selected from a cationic dye, an anionic dye, and a nonionic dye, and is preferably a dye having a maximum absorption wavelength falling within a range of 300 to 1000 nm. By selecting any desired dye from the so-called spectral sensitizing dyes within the wavelength range described above and using the dye for the purpose of adjusting the sensitive wavelength so that the sensitive wavelength matches the light source to be used, it becomes possible to obtain an image-forming material having a high sensitivity. Also, it becomes possible to suitably select a light source such as blue, green, or red light, or otherwise an infrared laser or the like.

As a result, for example when a color image is formed using an image-forming material, which is of a multicolor photo- and heat-sensitive recording type and has an image-forming layer made by laminating single-color image forming layers capable of developing different hues, the multicolor image-forming material as a whole can provide a high sensitivity and a high level of image sharpness, because, even though the image-forming material has a laminate construction, each layer (each color) can have a high sensitivity and form highly sharp images by the incorporation of spectral sensitizing dyes having different absorption wavelengths in the single-color image forming layers capable of developing different hues and by the use of light sources suited to the absorption wavelengths.

When the image-forming material of the present invention is used as photo- and pressure-sensitive paper, the paper may have the laminate construction described above, or alternatively, spectral sensitizers, organoboron compounds, dye precursors, and the like may be incorporated in the same layer so that multicolor development becomes possible. More specific layer construction of the image-forming layer is described later.

Examples of the spectral sensitizing dye include conventionally known keto dyes such as coumarin dyes (including ketocoumarin and sulfonocoumarin), merostyryl dyes, oxonol dyes, and hemioxonol dyes; nonketo dyes such as ketopolymethine dyes, triarylmethane dyes, xanthene dyes, anthracene dyes, rhodamine dyes, acridine dyes, aniline dyes, and azo dyes; nonketopolymethine dyes such as azomethine dyes, cyanine dyes, carbocyanine dyes, dicarbocyanine dyes, tricarbocyanine dyes, hemicyanine dyes, and styryl dyes; quinoneimine dyes such as azine dyes, oxazine dyes, thiazine dyes, quinoline dyes, and thiazole dyes; and so on. More specific examples include spectral sensitizing dyes described in, for example, JP-A No. 62-143044, JP-A No. 3-20260, JP-A No. 1-84245, JP-A No. 1-138204, JP-A No. 1-100536, JP-A No. 9-188686, and PCT National Publication No. 6-505287.

The dye/organoboron compound ratio is preferably 1/0.1 to 1/100 and more preferably 1/0.5 to 1/10.

(Polymerizable compound)

The polymerizable compound is a compound having in the chemical structure thereof at least one ethylenically unsaturated bond. Besides monomers, the polymerizable compounds include prepolymers, that is, dimers of the monomers, trimers of the monomers, oligomers of the monomers, mixtures thereof, copolymers thereof, and so on. Examples of these compounds include unsaturated carboxylic acids and salts thereof, esters thereof with aliphatic polyhydric alcohols, amides thereof with aliphatic polyvalent amines, styrene, vinyl ethers, vinyl esters, N-vinyl heterocycles, allyl ethers, allyl esters, and so on.

Specific examples of the unsaturated carboxylic acids include acrylic acid, methacrylic acid, itaconic acid, crotonic acid, isocrotonic acid, maleic acid, and so on. Examples of the salts of the unsaturated carboxylic acids include sodium salts and potassium salts of the carboxylic acids described above.

The polymerizable compound may contain one or more olefinic double bonds and may be any of a low molecular weight compound (i.e., monomeric compound) and a high molecular weight compound (i.e., oligomeric compound). Examples of the monomer containing a double bond are alkyl or hydroxyalkyl acrylates or methacrylates such as methyl acrylate, ethyl acrylate, butyl acrylate, 2-ethylhexyl acrylate, 2-hydroxyethyl acrylate, isobornyl acrylate, methyl methacrylate, or ethyl methacrylate. In addition, silicone acrylates are advantageous. Other examples are acrylonitrile, acrylamide, methacrylamide, N-substituted (meth)acrylamide, vinyl esters such as vinyl acetate, vinyl ethers such as isobutyl vinyl ether, styrene, alkyl- and halo-styrene, N-vinylpyrrolidone, vinyl chloride, or vinylidene chloride.

Examples of the monomer containing two or more double bonds are a diacrylate of ethylene glycol, propylene glycol, neopentyl glycol, hexamethylene glycol, or bisphenol A, 4,4'-bis(2-acryloyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, and triallyl isocyanurate or tris (2-acryloylethyl) isocyanurate.

Examples of multi-unsaturated compound having a relatively high molecular weight (i.e., oligomeric compound) include acrylisized epoxy resins, acrylisized polyesters, polyesters containing a vinyl ether or epoxy group, polyurethanes, and polyethers. Further examples of the unsaturated oligomer are unsaturated polyester resins which are produced normally from maleic acid, phthalic acid, and one or more diols and which have a molecular weight of about 500 to 3000. In addition, it is also possible to use vinyl ether monomers and oligomers, and/or oligomers which have polyester, polyurethane, polyether, polyvinyl ether, or epoxy main chains and are endstopped with maleate. Particularly suitable is a combination of an oligomer having a vinyl ether group and a polymer described in WO90/01512. Also suitable is a copolymer of a vinyl ether and a maleic acid-functionalized monomer. These oligomers may also belong to prepolymers.

Particularly suitable examples are an ester of an ethylenically unsaturated carboxylic acid and a polyol or a polyepoxide, a polymer having in the main or side chain thereof an ethylenically unsaturated group such as an unsaturated polyester, polyamide, and polyurethane as well as a copolymer thereof, an alkyd resin, a polybutadiene and a butadiene copolymer, a polyisoprene and an isoprene copolymer, a polymer and copolymer having in the side chain thereof a (meth)acryl group, and a mixture of one or more of these polymers.

Examples of the unsaturated carboxylic acid are unsaturated fatty acids such as acrylic acid, methacrylic acid, crotonic acid, itaconic acid, cinnamic acid, linoleic acid, or oleic acid. Among these acids, acrylic acid and methacrylic acid are preferable.

Aromatic polyols, and aliphatic and alicyclic polyols in particular, are suitable as the polyol. Examples of the aromatic polyols are hydroquinone, 4,4'-dihydroxydiphenyl, 2,2-di (4-hydroxydiphenyl)propane, and/or novolak, and resol. Examples of the polyepoxides are those based on polyols, aromatic polyols in particular, and those based on epichlorohydrin. Examples of other suitable polyols are polymers and copolymers having in the polymer chain or side chain thereof a hydroxyl group such as polyvinyl alcohol or copolymers thereof, or polyhydroxyalkyl methacrylate or copolymers thereof. In addition, an oligoester having a hydroxyl terminal group is also suitable as the polyol.

Examples of the aliphatic and alicyclic polyols are preferably alkylene diols having 2 to 12 carbon atoms such as ethylene glycol, 1,2- or 1,3-propanediol, 1,2-, 1,3-, or 1,4-butanediol, pentanediol, hexanediol, octanediol, dodecanediol, diethylene glycol, triethylene glycol, polyethylene glycol preferably having a molecular weight of 200 to 1500, 1,3-cyclopentanediol, 1,2-, 1,3-, or 1,4-cyclohexanediol, 1,4-dihydroxymethylcyclohexane, glycerol, tris($\beta$-hydroxyethyl)amine, trimethylolethane, trimethylolpropane, pentaerythritol, dipentaerythritol, and sorbitol.

The polyol can be partially or completely esterified by one unsaturated carboxylic acid or by different unsaturated carboxylic acids. In the partially esterified product, the free hydroxyl group can be modified. For example, the free hydroxyl group can be etherified or esterified by other carboxylic acid.

Examples of the ester include the following compounds. That is, trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylate and methacrylate, glycerol diacrylate and triacrylate, 1,4-cyclohexane diacrylate, bisacrylate and bismethacrylate of polyethylene glycol having a molecular weight of 200 to 1500, and mixtures of the foregoing compounds.

In addition, suitable as the polymerizable compound are amides made up of the same or different unsaturated carboxylic acids and aromatic, alicyclic, or aliphatic polyamines having preferably 2 to 6, particularly preferably 2 to 4, amino groups. Examples of such polyamines are ethylenediamine, 1,2- or 1,3-propylenediamine, 1,2-1,3-, or 1,4-butylenediamine, 1,5 -pentylenediamine, 1,6-hexylenediamine, octylenediamine, dodecylenediamine, 1,4-diaminocyclohexane, isophoronediamine, phenylenediamine, bisphenylenediamine, di-$\beta$-aminoethyl ether, diethylene triamine, triethylene tetramine, and di($\beta$aminoethoxy)- or di($\beta$-aminopropoxy)ethane. Other suitable polyamines are polymers and copolymers having an additional amino group preferably in the side chain and oligo-amides having terminal amino groups. Examples of such unsaturated amides are methylenebisacrylamide, 1,6-hexamethylenebisacrylamide, diethylenetriaminetrismethacrylamide, bis(methacrylamidepropoxy)ethane, $\beta$-methacrylamideethyl methacrylate, N-[($\beta$-hydroxyethoxy) ethyl]acrylamide, and so on.

Suitable unsaturated polyesters and polyamides can be derived, for example, from maleic acid and from diols or diamines. Part of the maleic acid can be replaced by other dicarboxylic acid. These can be used together with an ethylenically unsaturated comonomer, for example, styrene. The polyesters and polyamides can also be derived from dicarboxylic acid and ethylenically unsaturated diols or diamines, particularly from those having a relatively long chain, for example, of 6 to 20 carbon atoms. An example of the polyurethane is one made up of a saturated or unsaturated diisocyanate and a saturated or unsaturated diol.

Polybutadiene and polyisoprene as well as copolymers thereof are conventionally known. Examples of suitable comonomers are olefins, such as ethylene, propene, butene, and hexene, (meth)acrylate, acrylonitrile, styrene, and vinyl chloride. Similarly, polymers having in the side chain thereof a (meth)acrylate group are also known. For example, these polymers can be obtained as a reaction product from a novolak-based epoxy resin and (meth)acrylic acid. Alternatively, these polymers may be a homopolymer or a copolymer of a hydroxyalkyl derivative produced by esterification with vinyl alcohol or (meth) acrylic acid; or a homopolymer or a copolymer of a (meth) acrylate produced by esterification with a hydroxyalkyl (meth)acrylate.

A polymeric compound having a vinyl or vinylidene group, which is, for example, a condensation product from a polymeric compound having in the side chain thereof a hydroxyl group, an amino group, an epoxy group, a halogen atom, or a sulfonyloxy group and acrylic acid, methacrylic acid, or a polymer thereof, can also be used in the present invention.

In addition, a color-image forming material, which is, for example, a compound having a vinyl group in the molecule of the dye precursor, can also be used as a polymerizable compound.

In the image-forming material of the present invention, as stated previously, the deblocking agent may have a polymerizable group and function as a polymerizable compound, that is, the deblocking agent may be a polymerizable compound simultaneously. When the image-forming material of this aspect is irradiated with light image-wise, the radical generator in the irradiated portions undergoes a photolysis and generates a radical. The radical causes the deblocking agent, which is a polymerizable compound, to undergo a polymerization reaction and to harden. As a result, even if heat and/or pressure is applied to the image-forming material after the irradiation with light, the radical generator (including the base to be generated from a base precursor) in the irradiated portions does not contact or react with the dye precursor and therefore the dye precursor does not develop a color. On the other hand, the deblocking agent in the non-irradiated portions is diffused by the application of heat and/or pressure and is caused to contact or react with the dye precursor to thereby cause the dye precursor to develop a color. Accordingly, the non-irradiated portions develop a color, while the irradiated portions retain a white color.

The deblocking agent having a polymerizable group is preferably a deblocking agent having in the molecule thereof a polymerizable group such as an ethenyl group. Specific examples thereof include the above-illustrated deblocking agents having linked thereto directly or via a linking group such substituents as a polymerizable ethenyl group, a (meth)acryl group, and a (meth)acrylamido group.
More specifically, some suitable deblocking agents having a polymerizable group are shown below. However, it should be noted that the present invention in not limited to these blocking agents.
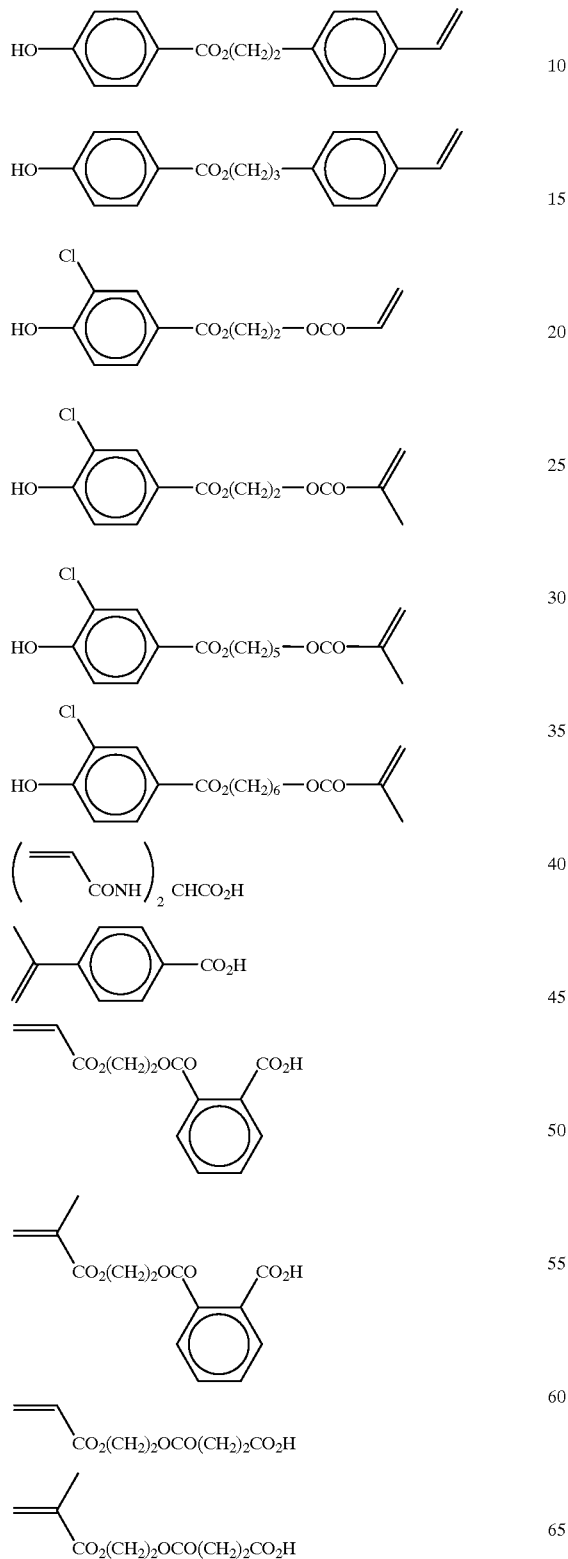
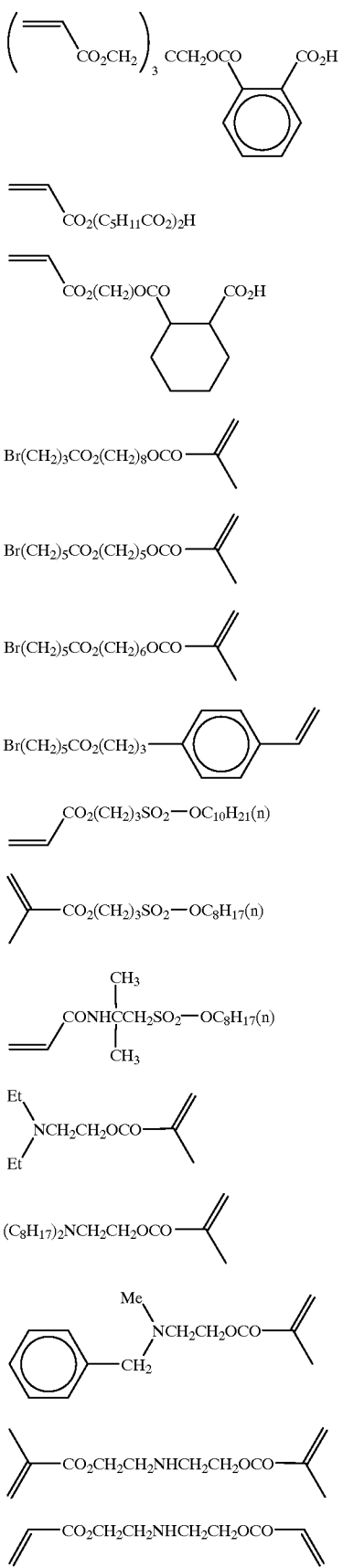

-continued

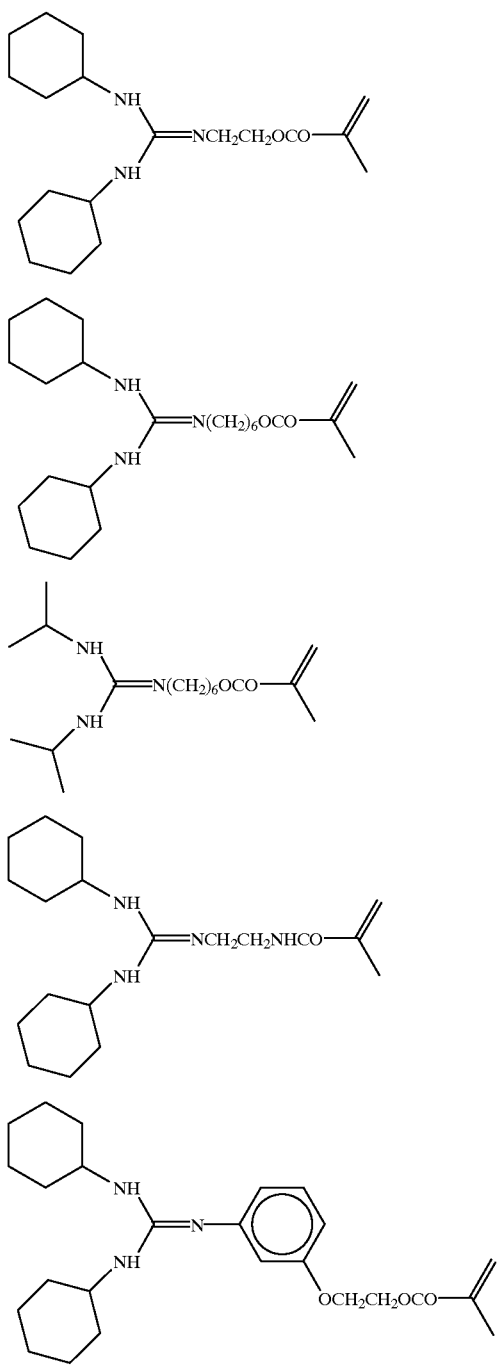

It is possible to accelerate the hardening by adding another polymerizable compound in addition to the deblocking agent having a polymerizable group. Examples of the other polymerizable compound include the compounds previously listed as polymerizable compounds.

(Other constituent components)

In the image-forming material of the present invention, in order to accelerate the coloration reaction, it is possible to add a color-developing aid in addition to the oxidizing agent that can be present together with the dye precursor described above.

The color-developing aid includes a substance that enhances the density of the color to be developed at the time of recording by heat or pressure and a substance that reduces the lowest coloration temperature. More specifically, the color-developing aid is used in order to create a condition that facilitates the reaction between the azomethine dye precursor and the deblocking aid by lowering the melting point of the dye precursor or the deblocking agent, by stabilizing an emulsion, or by lowering the softening point of the wall of microcapsules.

A color-developing aid usable in the present invention is, for example, a compound that enables low-energy printing in the image-forming layer. Examples thereof include a phenol derivative, a naphthol derivative, an alkoxy-substituted benzene, an alkoxy-substituted naphthalene, an aromatic ether, a thioether, an ester, an amide, a ureido, an urethane, a sulfonamide, a carboxyl- or hydroxyl-containing compound, and so on.

Further, in order to accelerate the polymerization reaction, the photopolymerizable composition of the image-forming material of the present invention may be incorporated with an additional aid such compound as an oxygen scavenger, a reducing agent, e.g., a chain-transfer agent as an active hydrogen donor, or a polymerization promoter acting in a chain-transferring manner.

Examples of the oxygen scavenger include phosphine, phosphonate, phosphite, and other compound that can be easily oxidized by oxygen.

Specific examples of the oxygen scavenger include N-phenylglycine, trimethylbarbituric acid, N,N-dimethyl-2,6-diisopropylaniline, and N,N,N,-2,4,6-pentamethylanilinic acid. In addition, a thiol, a thioketone, a trihalomethyl compound, a lophine dimer compound, an iodonium salt, a sulfonium salt, an azinium salt, an organic peroxide, a diazonium salt, a quinone diazide, and the like are also useful as the polymerization accelerator.

(Microcapsules)

It is preferable that any one of the azomethine precursor, capable of developing color when brought into contact with the deblocking agent, and the deblocking agent is encapsulated in microcapsules. For the encapsulation, a conventionally known method can be employed. Examples of the method include a method utilizing coacervation of a hydrophilic wall-forming material described in U.S. Pat. Nos. 2,800,457 and 2,800,458; an interfacial polymerization method described in U.S. Pat. No. 3,287,154, U.K. Patent No. 990,443, and JP-B Nos. 38-19574, 42-446, and 42-771; a method utilizing polymer deposition described in U.S. Pat. Nos. 3,418,250 and 3,660,304; a method utilizing an isocyanate-polyol wall-forming material described in U.S. Pat. No. 3,796,669; a method utilizing an isocyanate wall-forming material described in U.S. Pat. No. 3,914,511; a method utilizing urea-formaldehyde and urea-formaldehyde-resorcinol wall-forming materials described in U.S. Pat. Nos. 4,001,140, 4,087,376, and 4,089,802; a method utilizing wall-forming materials such as a melamine-formaldehyde resin and hydroxypropylcellulose described in U.S. Pat. No. 4,025,455; an in-situ method utilizing a polymerization of monomers described in JP-B No. 36-9168 and JP-A No. 51-9079; a method utilizing electrolytic dispersion cooling described in U.K. Patent Nos. 952,807 and 965,074; a spray-drying method described in U.S. Pat. No. 3,111,407 and U.K. Patent No. 930,442; and methods described in JP-B No. 7-736, JP-A No. 4-101885 and JP-A No. 9-263057.

The encapsulating method is not limited to the methods listed above. However, it is preferable to employ an interfacial polymerization method comprising the steps of mixing an oil phase, prepared by dissolving or dispersing the azomethine dye precursor in a hydrophobic organic solvent that becomes the core of the capsules, and an aqueous phase having a water-soluble polymer dissolved therein, emulsifying the mixture by means of a homogenizer or the like, heating the emulsion so as to cause a polymer-forming reaction at the intersurface of droplets so that polymeric microcapsule walls are formed. This method makes it possible to form capsules having uniform particle diameters in a short period of time and to obtain a recording material excellent in storability as a raw recording material.

The reactants that form the polymer are added to the inside of the droplets and/or the outside of the droplets. Examples of the polymeric substance include polyurethane, polyurea, polyamide, polyester, polycarbonate, urea/formaldehyde resins, melamine resins, polystyrene, styrene/methacrylate copolymers, styrene/acrylate copolymers, and so on. Among these substances, polyurethane, polyurea, polyamide, polyester, and polycarbonate are preferable, and polyurethane and polyurea are particularly preferable. The above-listed polymeric substances may be used in combinations of two or more kinds.

Examples of the water-soluble polymers include gelatin, polyvinyl pyrrolidone, polyvinyl alcohol, and so on. For example, when polyurethane is used as capsule wall material, the microcapsule wall can be formed by mixing a polyvalent isocyanate and a second substance (e.g., polyol or polyamine) that reacts therewith to form the capsule wall in a water-soluble polymer solution (i.e., aqueous phase) or in an oily medium (oil phase) to be encapsulated, emulsifying the mixture, and heating the resulting emulsion so as to cause a polymer-forming reaction at the intersurface of droplets.

As the polyvalent isocyanate and the polyol or polyamine, with which the polyvalent isocyanate reacts, those which are described in U.S. Pat. Nos. 3,281,383, 3,773,695, and 3,793,268, JP-B Nos. 48-40347 and 49-24159, JP-A Nos. 48-80191 and 48-84086, and K., Iwata, "Polyurethane Handbook", Nikkan Kogyo Shinbun Ltd., 1987, can be used.

When microcapsules containing the azomethine dye precursor are prepared, the azomethine dye precursor to be enclosed in the microcapsules may be present in solution form or may be present in solid form inside the microcapsules. Generally, the solvent (oily medium) can be selected from high-boiling oils. Examples of the solvent that can be used include a phosphate, a phthalate, an acrylate, a methacrylate, other carboxylates, a fatty acid amide, an alkylated biphenol, an alkylated terphenol, a chlorinated paraffin, an alkylated naphthalene, diallylethane, a compound that is a solid at room temperature, an oligomer oil, a polymer oil, and so on. Specific examples of the solvent include the solvents described in JP-A Nos. 60-242094 and Japanese Patent Application No. 62-75409. These solvents may not be used at the time of encapsulation.

When enclosing the azomethine dye precursor in solution form inside the microcapsules, the azomethine dye precursor, which is dissolved in a solvent, may be encapsulated. In this case, the amount of the solvent to be used is preferably 1 to 500 parts by weight per 100 parts by weight of the azomethine dye precursor. When the azomethine dye precursor to be encapsulated has a poor solubility in the solvent or when the solvent described above is not used, a low-boiling solvent having a high solvency may be used as an auxiliary solvent. Examples of the low-boiling solvent include ethyl acetate, propyl acetate, isopropyl acetate, butyl acetate, methylene chloride, and so on.

An aqueous solution having a water-soluble polymer dissolved therein is used as the aqueous phase. The oil phase described above is added to the aqueous phase and thereafter the mixture is emulsified by means of a homogenizer or the like. The water-soluble polymer acts as a dispersing medium which enables uniform and easy dispersion and stabilizes the aqueous dispersion thus obtained. In this case, in order to obtain a further uniform and stable dispersion, a surfactant may be added to at least one of the oil phase and the aqueous phase. As the surfactant, a conventionally known surfactant for emulsification may be used.

An example, in which the azomethine dye precursor is enclosed in microcapsules, is explained above. In the image-forming material, however, as stated previously, the deblocking agent may be enclosed in microcapsules. The aspect, in which the deblocking agent is enclosed in microcapsules, is similar to the example in which the azomethine dye precursor is enclosed in microcapsules.

When any one of the azomethine dye precursor and the deblocking agent is encapsulated, the average particle diameter of the microcapsules is preferably 20 $\mu$m or less, and more preferably 7 $\mu$m or less, from the standpoint of obtaining high resolution. If the microcapsules formed are too small, a larger amount of capsule wall-forming agents is required because the surface area per unit amount of the solid components becomes larger. Therefore, the average particle diameter of the microcapsules is preferably 0.1 $\mu$m or greater.

Among the image-forming materials of the present invention which use microcapsules, in those which are heat-sensitive, substances pass through the microcapsule wall when the image-forming material is heated. Since the microcapsules are not broken when the substances pass through the microcapsule wall, color is developed inside the microcapsules or in the area very close to the periphery of the microcapsules. As a result, the image granularity is excellent.

Among the image-forming materials of the present invention which use microcapsules, in those which are pressure-sensitive, the enclosed substances can be diffused to the outside by the microcapsule being broken. Therefore, in comparison with the heat-sensitive image-forming material using microcapsules, the pressure-sensitive image-forming material using microcapsules tends to be more blurred. Accordingly, the (photo-sensitive) heat-sensitive image-forming material using microcapsules is preferable to the (photo-sensitive) pressure-sensitive image-forming material using microcapsules with respect to sharpness and blurriness of images.

(Specific construction of the image-forming layer)

According to the image-forming material of the present invention, the image-forming layer contains at least one azomethine dye precursor of the present invention and at least one deblocking agent. From the standpoint of photosensitivity, processing speed, and image durability, it is preferable that the image-forming layer further contains at least one photopolymerization initiator and at least one polymerizable compound. If necessary, these components are enclosed in microcapsules and used in the preparation of a coating liquid by being dissolved, emulsified, or dispersed in a suitable solvent together with other additives which are used when necessary. The image-forming layer is formed by applying the coating liquid thus obtained onto a support by a conventionally known method and drying the coating layer.

When the image-forming material of the present invention is used as a multicolor material, generally the image-forming layer is formed by laminating a plurality of image-forming layers developing different hues onto a support such that each image-forming layer contains microcapsules containing an azomethine dye precursor developing different hues, a photopolymerization initiator, and other component. The two or more types of microcapsules which each contain at least one azomethine dye precursor which develops a different hue, at least one photopolymerization initiator, and other components may all be contained in one layer (needless to say, the component to be enclosed in the microcapsules may be the deblocking agent). When the image-forming material is irradiated with light, the image-forming material is sensitized by the different wavelengths of the light source and multicolor images are formed.

In addition, when image-forming layers developing different hues are laminated, an interlayer, which may contain a filter dye, may be provided between single-color, image-forming layers constituting the image-forming layer.

The interlayer comprises a binder as a main component and may contain additives such as a hardener, a polymer latex, mica, an ultraviolet absorber, and the like, when necessary. When a filter dyes is used in an interlayer, although the filter dye may be selected from the spectral sensitizing dyes described previously, it is preferable to use a compound having the same light absorption wavelength as that of the spectral sensitizing compound contained in the layer overlying the interlayer in view of the formation of sharp images.

The dye for filter can be added to a desired layer, an interlayer in particular, as a dispersion prepared by emulsifying dispersion of the dye according to an oil-in-water or polymer dispersing method.

According to the oil-in-water dispersing method, the dye for filter is dissolved in any one or a mixture of a high-boiling organic solvent having a boiling point of 175° C. or above and a low-boiling solvent having a boiling point of 30 to 160° C., and the resulting solution is finely dispersed in an aqueous medium, such as water, an aqueous solution of gelatin, or an aqueous solution of polyvinyl alcohol, in the presence of a surfactant.

Examples of the high-boiling solvent are described in, for example, U.S. Pat. No. 2,322,027. The same solvents as the solvents for the formation of microcapsules described previously can be preferably used as the high-boiling organic solvents and the low-boiling solvents.

The dispersing may be followed by a phase inversion. Further, if necessary, the low-boiling solvent may be removed or lessened by distillation, noodle-water washing, ultrafiltration, or the like, and thereafter the dispersion may be used for coating.

The details of the polymer dispersion process and hardening as well as specific examples of the latex are described in, for example, U.S. Pat. Nos. 4,199,383, German Patent Application (OLS) Nos. 2,541,274 and 2-541,230, JP-A Nos. 49-74538, 51-59943, and 54-32552, and Research Disclosure, Vol. 148 (1976), August, Item 14850.

Preferable examples of the latex described above are latices produced by copolymerization between acrylates or methacrylates (e.g., ethyl acrylate, n-butyl acrylate, n-butyl methacrylate, and 2-acetoacetoxyethyl methacrylate) and acid monomers (e.g., acrylic acid and 2-acrylamide-2-methylpropanesulfonic acid).

It is also possible to provide a layer containing a polymer, which reduces oxygen transmissivity, such as gelatin, PVA, or the like, between the support and the photosensitive layer (image-forming layer). The formation of such layer makes it possible to prevent the images from fading due to photo-oxidation.

In addition, a so-called antihalation layer can be provided between the support and the photosensitive layer or on the side opposite to the photosensitive layer in the case where the support is transparent. Where an antihalation layer is formed, from the standpoint of enhancement of the whiteness of the background, it is preferable that the antihalation layer can be bleached with light or heat. In the case where the antihalation layer is bleached with light, for example, a combination of a dye and a boron compound can be utilized. In the case where the antihalation layer is bleached with heat, for example, a process, in which the dye in color developed by a deblocking agent or a nucleophilic agent is bleached, can be utilized.

In order to raise the durability of images to light and heat or in order to reduce the yellowing due to light after the fixing of images, it is preferable to use the following conventionally known antioxidants or the like in the image-forming layer of the image-forming material of the present invention.

The above-mentioned antioxidants are described in, for example, European Patent Application Laid-Open Nos. 223739, 309401, 309402, 310551, 310552, and 459416, German Patent Application Laid-Open No. 3435443, JP-A Nos. 54-48535, 62-262047, 63-113536, 63-163351, 2-262654, 2-71262, 3-121449, -5-61166, and 5-119449, and U.S. Pat. Nos. 4814262, and 4980275.

It is also effective to use additives, conventionally known in heat-sensitive recording materials and pressure-sensitive recording materials, in the image-forming layer in the image-forming material of the present invention. Specific examples of these additives include the compounds described in JP-A Nos. 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 63-051174, 63-203372, 63-224989, 63-251282, 63-267594, and JP-B Nos. 48-043294 and 48-033212.

Conventionally known water-soluble polymeric compounds and latices can be used as binders for use in the image-forming layer of the image-forming material of the present invention. Examples of the water-soluble polymeric compounds include methyl cellulose, carboxymethyl cellulose, hydroxyethyl cellulose, hydroxypropyl cellulose, starch derivatives, casein, gum arabic, gelatin, ethylene/maleic anhydride copolymers, styrene/maleic anhydride copolymers, polyvinyl alcohol, epichlorohydrin-modified polyamide, isobutylene/maleic anhydride/salicylic acid copolymers, polyacrylic acid, polyacrylic acid amide, and modified products thereof. Examples of the latex include styrene/butadiene rubber latices, methyl acrylate/butadiene rubber latices, vinyl acetate emulsions, and so on.

The pigments that can be used in the image-forming material of the present invention may be any conventionally known organic or inorganic pigments. Examples of the pigments include kaolin, calcined kaolin, talc, pagodite, diatomaceous earth, calcium carbonate, aluminum hydroxide, magnesium hydroxide, zinc oxide, lithopone, amorphous silica, colloidal silica, calcined gypsum, silica, magnesium carbonate, titanium oxide, alumina, barium carbonate, barium sulfate, mica, microballoon, urea/formalin filler, polyester particles, cellulose filler, and so on.

When necessary, conventionally known additives, such as waxes, antistatic agents, defoaming agents, electroconducting agents, fluorescent dyes, surfactants, ultraviolet absorbers, and precursors thereof, can be used in the image-forming layer of the image-forming material of the present invention.

C: Protective Layer

When necessary, a protective layer may be provided on the image-forming layer of the image-forming material of the present invention. If necessary, two or more protective layers may be laminated. Examples of the material for use in the protective layer include water-soluble polymeric compounds such as polyvinyl alcohol, carboxy-modified polyvinyl alcohol, vinyl acetate/acrylamide copolymers, silicon-modified polyvinyl alcohol, starch, modified starch, methyl cellulose, carboxymethyl cellulose, hydroxymethyl cellulose, gelatins, gum arabic, casein, hydrolysates of styrene/maleic acid copolymers, hydrolysates of half esters of styrene/maleic acid copolymers, hydrolysates of isobutylene/maleic acid copolymers, polyacrylamide derivatives, polyvinyl pyrrolidone, polystyrenesulfonic acid sodium salts, and sodium alginate; and latices such as styrene/butadiene rubber latices, acrylonitrile/butadiene rubber latices, methyl acrylate/butadiene rubber latices, and vinyl acetate emulsions. The water-soluble polymeric compounds in the protective layer may be crosslinked so that the storability is further enhanced. The crosslinking agent may be a conventionally known one. Specific examples of the crosslinking agent include water-soluble, initial-stage condensation products such as N-methylol urea, N-methylol melamine, and urea/formalin; dialdehyde compounds such as glyoxal, and glutaraldehyde; inorganic crosslinking agents such as boric acid and borax; and polyamideepichlorohydrin. The protective layer may be hardened by electron beams. Conventionally known additives, such as pigments, metal soaps, waxes, surfactants, fluorescent brighteners, and ultraviolet absorbers, can be used in the protective layer. The coating weight of the protective layer is preferably 0.2 to 5 g/m$^2$ and more preferably 0.5 to 2 g/m$^2$. The thickness is preferably 0.2 to 5 µm and more preferably 0.5 to 2 µm.

[3. Image-forming Method]

Next, the image-forming method of the present invention is explained. The image-forming method of the present invention is a method using the image-forming material of the present invention. According to the image-forming method of the present invention, high-quality and highly durable images can be formed rapidly and with high sensitivity.

(The 1st image-forming method)

Where microcapsules are used in the image-forming layer in the image-forming material of the present invention, images can be formed by applying heat and/or pressure image-wise onto the image-forming layer. On the other hand, where microcapsules are not used in the image-forming layer and the azomethine dye precursor does not develop color by the action of the deblocking agent alone at room temperature, images can be formed by applying heat image-wise onto the image-forming layer. This is because the contact of the azomethine dye precursor with the deblocking agent or the contact while being heated enables the deblocking agent to cause the azomethine dye precursor to develop a color so that images are formed. Unlike the image-forming material which develops color by heat alone, the image-forming material based on the color-developing mechanism described above is less liable to produce fogging in non-image portions and the images obtained can become highly durable by carrying out the same fixing as in the fixing step in the 2nd image-forming method described later.

(The 2nd image-forming method)

Where a polymerizable compound and a polymerization initiator are present in the image-forming layer in the image-forming material of the present invention, images can be formed by a latent-image forming step and a step in which the image is made visible, wherein in the latent-image forming step the image-forming layer is irradiated image-wise with light capable of being absorbed by the polymerization initiator so that polymerization initiator develops a polymerization-starting species which causes the polymerizable compound to undergo a polymerization to thereby form a latent image in the irradiated portions, and wherein heat and/or pressure is applied to the entire surface of the image-forming layer in the step in which the image is made visible and the heat and/or pressure causes the contact of the azomethine dye precursor with the deblocking agent in accordance with the latent image so that colored images are formed.

Since the intensity of the light for irradiation in the latent-image forming step is not more than the intensity required for the photopolymerization initiator to develop the polymerization species so that the polymerizable compound undergoes a polymerization, a high sensitivity is obtained and the processing speed is high. In addition, since the photopolymerization initiator can be selected from a variety of photopolymerization initiators responsive to wavelengths ranging from ultraviolet to near infrared, that is, since the light source can be selected from a variety of light sources having a wide range of coloration wavelengths, the occurrence of color mixing is less likely and an inexpensive light source can be adopted, thereby making it possible for a low-cost image-forming method to be provided.

A laser, an LED, xenon light, a fluorescent lamp, a mercury lamp, a tungsten lamp, a metal halide lamp, and the like can be used as the light source. It is also possible to use light sources having two or more wavelengths to match the organic dyes to be used.

Although the irradiation with light is normally carried out from the image-forming layer side of the image-forming material, the irradiation with light can also be carried out from the support side when the support for the image-forming material is transparent.

The upper limit of the temperature for heating the entire surface in the step in which the image is made visible is a temperature not exceeding the temperature that does not allow the azomethine dye precursor to develop a color on its own unless the deblocking agent is present. If the heating temperature is controlled within this range, the fogging in white portions (non-image portions) does not occur.

Where the image-forming material is prepared by using microcapsules, the heat and/or pressure to be applied onto the entire surface of the image-forming layer may be the heat and/or pressure sufficient to break the microcapsules (the term "break" in this case includes the state in which the substance outside the microcapsules penetrates into the microcapsules).

Although the conditions, such as the heat and/or pressure to be applied onto the entire surface of the image-forming layer and the time period, may be appropriately set by taking into account such factors as kinds and concentrations of the azomethine dye precursor and the deblocking agent and the capsule wall material when the microcapsules are used, the heating temperature is preferably 50 to 180° C. and more preferably 70 to 130° C. Where heat and/or pressure is applied onto the entire surface of the image-forming layer, examples of the heat source usable for the heating include a heat roller, a heat head, a heat stamp, near infrared (laser), infrared (laser), and so on.

After the step in which the image is made visible, if the obtained image is directly subjected to image processing or the like, a fixing step is not required. However, in order to obtain highly durable images, it is preferable to provide, after the step in which the image is made visible, a fixing step in which the image is fixed by irradiating the entire surface of the image-forming layer with light.

The fixing step enables the entire image, including image portions and non-image portions, to undergo a polymerization and to obtain highly durable, superior, fixed images simply. Where a dye is incorporated as a component of the photopolymerization initiator, since the dye is bleached in the fixing step described above, images having a higher level of whiteness and free from background fogging in the non-image portions can be obtained.

Since the light source for use in the fixing step is not for image-wise writing but for irradiating the whole image-forming layer of the image-forming material, the light source is not expensive even if it is a high-power light source. Therefore, the use of the light source presents no impediment to cost reduction and to the speed of the processing.

EXAMPLES

The examples of the present invention will now be explained below. However, it should be noted that the present invention is not limited to these examples. In the following examples, "%" means "weight %" unless otherwise specified.

1. Preparation of a Dye Precursor-enclosing Microcapsule Liquid 1-a Preparation of a Microcapsule Dispersion Liquid (1)

4.16 g of the azomethine dye precursor compound (33) of the present invention was dissolved in 18.4 g of ethyl acetate. To the solution were added 14 g of "TAKENATE D-110N" (manufactured by Takeda Chemical Industries, Ltd.). The resulting solution was added to a mixture of 70 g of a 6% solution of phthalated gelatin and 0.34 g of a 10% solution of sodium dodecylbenzenesulfonate. The resulting mixture was emulsified by using a homogenizer (manufactured by NIPPON SEIKI Co., Ltd.) at 10000 rpm for 10 minutes and an emulsion was obtained. To the emulsion thus obtained were added 54 g of water and 0.62 g of tetraethylene pentamine. After that, while being stirred, the mixture was heated to 65° C. and was kept at that temperature for 3 hours. In this way, a dye precursor-enclosing microcapsule liquid (1), enclosing the compound (33) as the core and having an average microcapsule diameter of 0.5 µm, was prepared 1-b. Preparation of a Microcapsule Dispersion Liquid (2)

A microcapsule dispersion liquid (2) was prepared in the same way as in 1-a., except that the compound (18) of the present invention was used in place of the compound (33) of the present invention.

1-c. Preparation of a Microcapsule Dispersion Liquid (3)

A microcapsule dispersion liquid (3) was prepared in the same way as in 1-a., except that the compound (2 2) of the present invention was used in place of the compound (33) of the present invention.

1-d. Preparation of a Microcapsule Dispersion Liquid (4)

A microcapsule dispersion liquid (4) was prepared in the same way as in 1-a., except that the compound (31) of the present invention was used in place of the compound (33) of the present invention.

1-e. Preparation of a Microcapsule Dispersion Liquid (5)

A microcapsule dispersion liquid (5) was prepared in the same way as in 1-a., except that the compound (40) of the present invention was used in place of the compound (33) of the present invention.

1-f. Preparation of a Microcapsule Dispersion Liquid (6)

A microcapsule dispersion liquid (6) was prepared in the same way as in 1-a., except that the compound (41) of the present invention was used in place of the compound (33) of the present invention.

1-g. Preparation of a Microcapsule Dispersion Liquid (7)

4.16 g of the compound (33) of the present invention was dissolved in 18.4 g of ethyl acetate. To the solution were added 0.05 g of a dye represented by the following structural formula (1) and 0.4 g of an organoboron compound represented by the following structural formula (m) as constituents of a photopolymerization initiator, 3 g of pentaerythritol tetramethacrylate as a polymerizable compound, 2 g of tricresyl phosphate, and 14 g of "TAKENATE D-110N" (manufactured by Takeda Chemical Industries, Ltd.) as an encapsulant. The resulting solution was added to a mixture of 70 g of a 6% solution of phthalated gelatin and 0.34 g of a 10% solution of sodium dodecylbenzenesulfonate. The resulting mixture was emulsified by using a homogenizer (manufactured by NIPPON SEIKI Co., Ltd.) at 10000 rpm for 10 minutes and an emulsion was obtained. To the emulsion thus obtained were added 54 g of water and 0.62 g of tetraethylene pentamine. After that, while being stirred, the mixture was heated to 65° C. and was kept at that temperature for 3 hours. In this way, a microcapsule dispersion liquid (7), enclosing the photopolymerization initiator, polymerizable compound, and oil together with the compound (33) as the core materials and having an average microcapsule diameter of 4 µm, was prepared.

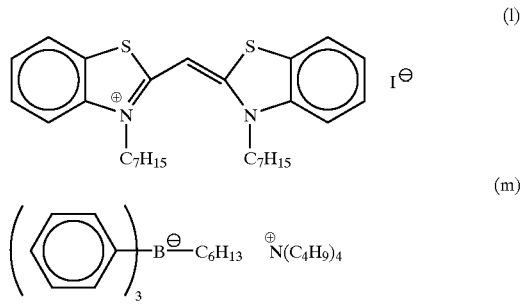

1-h. Preparation of a Microcapsule Dispersion Liquid (8) For Comparison

A microcapsule dispersion liquid (8) was prepared in the same way as in 1-a., except that a compound represented by the following structural formula was used in place of the compound (33) of the present invention.

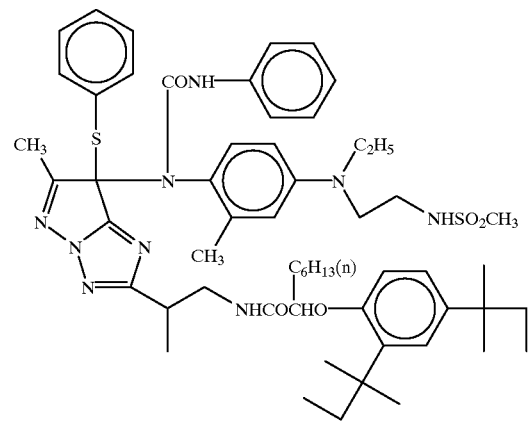

1-i. Preparation of a Microcapsule Dispersion Liquid (9) For Comparison

A microcapsule dispersion liquid (9) was prepared in the same way as in 1-a., except that a compound represented by the following structural formula was used in place of the compound (33) of the present invention.

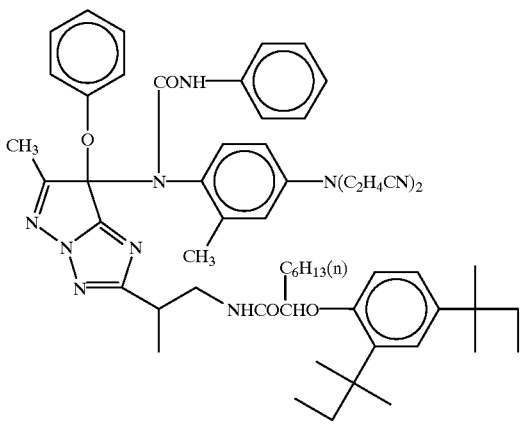

1-j. Preparation of a Microcapsule Dispersion Liquid (10) For Comparison

A microcapsule dispersion liquid (10) was prepared in the same way as in 1-a., except that a compound represented by the following structural formula was used in place of the compound (33) of the present invention.

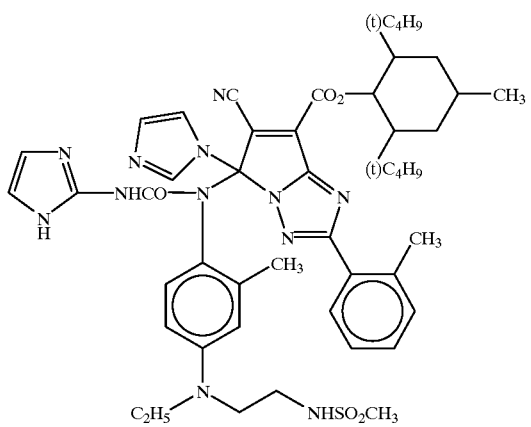

1-k. Preparation of a Microcapsule Dispersion Liquid (11) For Comparison

A microcapsule dispersion liquid (11) was prepared in the same way as in 1-a., except that a compound represented by the following structural formula was used in place of the compound (33) of the present invention.

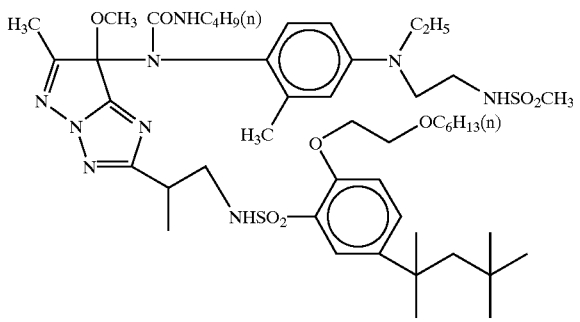

2. Preparation of Acid Emulsions 2-a. Preparation of an Acid Emulsion (1)

2.4 g of mono-2-ethylhexyl phthalate, 1.2 g of a sulfonamide compound (1) indicated below, and 1.2 g of a sulfonamide compound (2) indicated below were dissolved in 20.1 g of isopropyl acetate. The resulting solution was added to a mixture of 37.1 g of a 10% aqueous solution of gelatin and 1.35 g of a 10% aqueous solution of sodium dodecylbenzenesulfonate. The resulting mixture was emulsified by using a homogenizer at 15000 rpm for 5 minutes and an emulsified liquid was obtained. After that, the emulsified liquid was stirred at 40° C. for 3 hours to thereby evaporate the isopropyl acetate. In this way, an acid emulsion (1) was prepared.

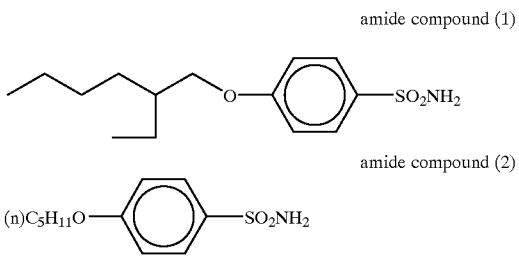

2-b. Preparation of an Acid Emulsion (2)

An acid emulsion (2) was prepared in the same way as in 2-a., except that 2-ethylhexyl 3-chloro-4-hydroxybenzoate was used in place of mono-2-ethylhexyl phthalate.

2-c. Preparation of an Acid Emulsion (3)

0.4 g of IRGACURE 907, 4.2 g of a compound represented by the following structural formula (a) as an acid also acting as a polymerizable compound, 2 g of the amide compound (1), and 2 g of the amide compound (2), i.e., the same compounds as those used in 2-a., were dissolved in 10.5 g of ethyl acetate. To the solution were added 0.48 g of tricresyl phosphate as a high-boiling solvent, 0.24 g of diethyl maleate, and 1.27 g of PIONIN A41C (manufactured by Takemoto Yushi Co., Ltd.). After that, the mixture was heated to thereby obtain a homogeneous liquid. The resulting liquid was added to a mixture of 40 g of a 8% aqueous solution of gelatin (No. 750 Gelatin, manufactured by Nitta Gelatin Co., Ltd.). The resulting mixture was emulsified by means of a homogenizer at 10000 rpm for 5 minutes and an emulsified liquid was obtained. Then, the remaining ethyl acetate was evaporated from the emulsified liquid. In this way, an acid emulsion (3) was prepared.

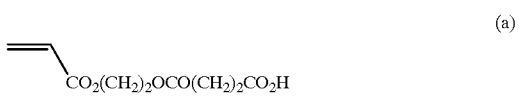

2-d. Preparation of an Acid Emulsion (4)

An acid emulsion (4) was prepared in the same way as in 2-c., except that a compound having the following structural formula (b) was used in place of the compound (a) of the acid emulsion (3).

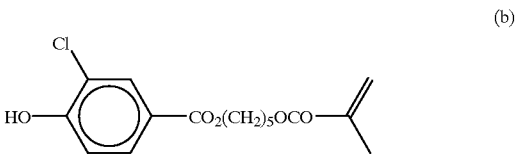

2-e. Preparation of an Acid Emulsion (5)

An acid emulsion (5) was prepared in the same way as in 2-c., except that 0.07 g of a dye having the following structural formula (c) and 0.5 g of an organoboron compound having the following structural formula (d) were used in place of IRGACURE 907 of the acid emulsion (3).

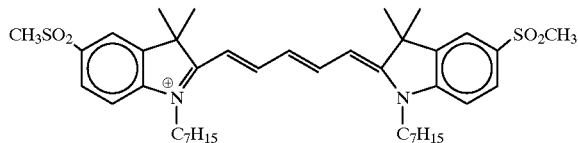

(c)

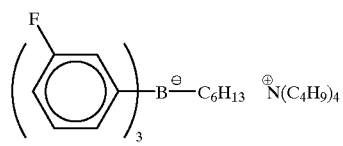

(d)

2-f. Preparation of an Acid Emulsion (6)

An acid emulsion (6) was prepared in the same way as in 2-d., except that a dye having the structural formula (c) described above and an organoboron compound having the structural formula (d) described above were used in place of IRGACURE 907 of the acid emulsion (4).

2-g. Preparation of an Acid Emulsion (7)

An acid emulsion (7) was prepared in the same way as in 2-f., except that a dye having the following structural formula (e) was used in place of the dye (c) and an organoboron compound having the following structural formula (f) was used in place of the organoboron compound (d) of the acid emulsion (6).

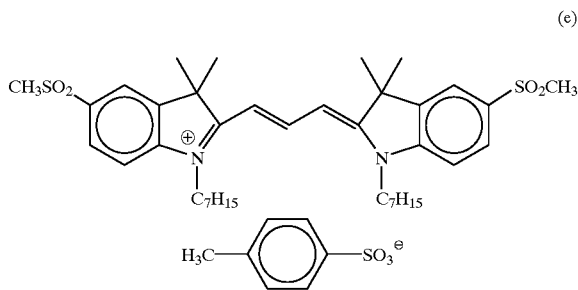

(e)

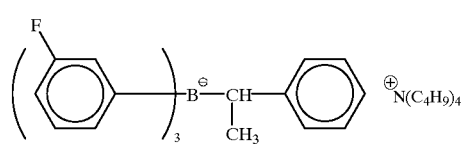

(f)

3. Preparation of Base Emulsions 3-a. Preparation of a Base Emulsion (1)

A base emulsion (1) was prepared in the same way as in 2-a., except that N-methyloctadecylamine was used in place of the mono-2-ethylhexyl phthalate used in the acid emulsion (1).

3-b. Preparation of a Base Emulsion (2)

A base emulsion (2) was prepared in the same way as in 2-c., except that a compound having the following structural formula (g) was used in place of the polymerizable compound (a) used in the acid emulsion (3).

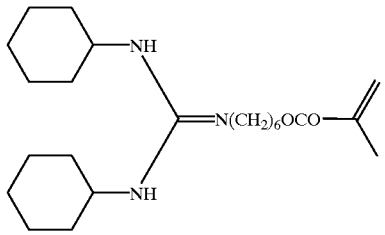

(g)

3-c. Preparation of a Base Emulsion (3)

A base emulsion (3) was prepared in the same way as in 2-e., except that a compound having the structural formula (g) described above was used in place of the polymerizable compound (a) used in the acid emulsion (5).

4. Preparation of Oxidizing Agent Emulsions 4-a. Preparation of an Oxidizing Agent Emulsion (1)

An oxidizing agent emulsion (1) was prepared in the same way as in 2-a., except that 4-methoxy-2,2,6,6-tetramethylpiperidine-1-oxyl was used in place of the mono-2-ethylhexyl phthalate used in the acid emulsion (1).

4-b. Preparation of an Oxidizing Agent Emulsion (2)

An oxidizing agent emulsion (2) was prepared in the same way as in 2-c., except that trimethylolpropane trimethacrylate and 4-methoxy-2,2,6,6-tetramethylpiperidine-1-oxyl were used in place of the polymerizable compound (a) used in the acid emulsion (3).

4-c. Preparation of an Oxidizing Agent Emulsion (3)

An oxidizing agent emulsion (3) was prepared in the same way as in 2-e., except that trimethylolpropane trimethacrylate and 4-methoxy-2,2,6,6-tetramethylpiperidine-1-oxyl were used in place of the polymerizable compound (a) used in the acid emulsion (5).

5. Preparation of Alkylating Agent Emulsions 5-a. Preparation of an Alkylating Agent Emulsion (1)

An alkylating agent emulsion (1) was prepared in the same way as in 2-a., except that 2-(2,5-di-t-amylphenyloxy) ethyl 5-bromo-valerate was used in place of the mono-2-ethylhexyl phthalate used in the acid emulsion (1).

5-b. Preparation of an Alkylating Agent Emulsion (2)

An alkylating agent emulsion (2) was prepared in the same way as in 2-c., except that a compound having the following structural formula (h) was used in place of the polymerizable compound (a) used in the acid emulsion (3).

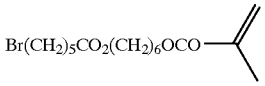

(h)

5-c. Preparation of an Alkylating Agent Emulsion (3)

An alkylating agent emulsion (3) was prepared in the same way as in 2-e., except that a compound having the structural formula (h) described above was used in place of the polymerizable compound (a) used in the acid emulsion (5).

6. Preparation of a Metal Salt Emulsion

A metal salt emulsion was prepared in the same way as in 2-a., except that zinc 3,5-di(α-methylbenzyl)salicylate was used in place of the mono-2-ethylhexyl phthalate used in the acid emulsion (1).

7. Preparation of a Liquid For Coating a Protective Layer

A liquid for coating a protective layer was prepared by blending 2.6 g of the following surfactant (1) and 7.7 g of the following surfactant (2) into 113.5 g of a 9% gelatin aqueous solution.

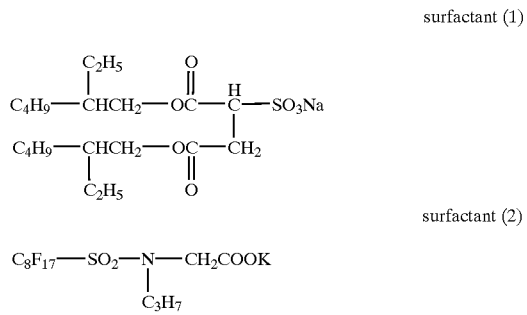

surfactant (1)

surfactant (2)

8. Support

A 100 μm-thick, white polyester base (E68L, manufactured by Toray Industries, Inc.) was used.

Example 1

A liquid for coating an image-forming layer was prepared by blending the microcapsule dispersion liquid (1) and the acid emulsion (1) so that the concentration of the azomethine dye precursor (i.e., the compound (33) of the present invention) was $0.75 \times 10^{-3}$ mol/m² and the concentration of mono-2-ethylhexyl phthalate was $1.5 \times 10^{-3}$ mol/m². The liquid was applied onto the support by using a coating bar and the coating layer was dried at 30° C. for 10 minutes. In this way, an image-forming layer was formed. Next, the liquid for coating a protective layer was applied onto the image-forming layer by using a coating bar so that the dry weight of the protective layer was 2.0 g/m². After that, the coating layer was dried at 30° C. for 10 minutes. In this way, an image-forming material of Example 1 was obtained.

Example 2

The image-forming material of Example 2 was obtained in the same way as in Example 1, except that the acid emulsion (2) was used in place of the acid emulsion (1) used in Example 1.

Example 3

The image-forming material of Example 3 was obtained in the same way as in Example 2, except that the microcapsule dispersion liquid (2) was used in place of the microcapsule dispersion liquid (1) used in Example 2.

Example 4

The image-forming material of Example 4 was obtained in the same way as in Example 2, except that the microcapsule dispersion liquid (3) was used in place of the microcapsule dispersion liquid (1) used in Example 2.

Example 5

The image-forming material of Example 5 was obtained in the same way as in Example 2, except that the microcapsule dispersion liquid (4) was used in place of the microcapsule dispersion liquid (1) used in Example 2.

Example 6

The image-forming material of Example 6 was obtained in the same way as in Example 2, except that the microcapsule dispersion liquid (5) was used in place of the microcapsule dispersion liquid (1) used in Example 2.

Example 7

The image-forming material of Example 7 was obtained in the same way as in Example 2, except that the microcapsule dispersion liquid (6) was used in place of the microcapsule dispersion liquid (1) used in Example 2.

Example 8

The image-forming material of Example 8 was obtained in the same way as in Example 1, except that the base emulsion (1) was used in place of the acid emulsion (1) used in Example 1.

Example 9

The image-forming material of Example 9 was obtained in the same way as in Example 1, except that the oxidizing agent emulsion (1) was used in place of the acid emulsion (1) used in Example 1.

Example 10

The image-forming material of Example 10 was obtained in the same way as in Example 1, except that the alkylating agent emulsion (1) was used in place of the acid emulsion (1) used in Example 1.

Example 11

The image-forming material of Example 11 was obtained in the same way as in Example 1, except that the metal salt emulsion was used in place of the acid emulsion (1) used in Example 1.

(Image formation using the image-forming materials of Examples 1 to 11 and assessment thereof)

When the image-forming materials of Examples 1 to 11 were each heated image-wise for 15 seconds at 120° C. by means of a hot plate, the image-forming materials of Examples 6 and 7 developed a cyan color and the other image-forming materials developed a magenta color. The density of the developed color in image portions and the background fogging of the non-image portions were measured using a Macbeth reflection densitometer (RD918), wherein a cyan filter was used for the image-forming materials of Examples 6 and 7 while a magenta filter was used for the other image-forming materials.

Further, after the image-forming materials were left in an environment of 40° C./90% RH for one day, the background fogging was measured in the same way. The results are shown in Table 1.

TABLE 1

| | Immediately after coating | | After being left at 40° C./ 90% RH for one day |
|---|---|---|---|
| | Density of the developed color | Fogging | Fogging |
| Example 1 | 2.3 | 0.04 | 0.05 |
| Example 2 | 2.2 | 0.04 | 0.05 |
| Example 3 | 2.3 | 0.05 | 0.05 |
| Example 4 | 2.4 | 0.05 | 0.06 |
| Example 5 | 2.4 | 0.06 | 0.07 |
| Example 6 | 2.4 | 0.05 | 0.05 |
| Example 7 | 2.3 | 0.04 | 0.05 |
| Example 8 | 2.4 | 0.05 | 0.06 |
| Example 9 | 2.5 | 0.06 | 0.06 |
| Example 10 | 2.3 | 0.05 | 0.05 |
| Example 11 | 2.3 | 0.05 | 0.05 |

Based on the results shown in Table 1, it is found that the image-forming materials of the present invention exhibit excellent density of developed color, less background fogging, and excellent storability.

Comparative Examples 1 to 11

The image-forming materials of Comparative Examples 1 to 11 were obtained in the same way as in Examples 1 to 11, except that the respective deblocking agent emulsions were not incorporated into the liquids for coating image-forming layers in Examples 1 to 11.

(Image formability test by using the image-forming materials of Comparative Examples 1 to 11)

When the image-forming materials of Comparative Examples 1 to 11 were each heated for 15 seconds at 120° C. by means of a hot plate, the image-forming materials did not develop a color. Even when the image-forming materials were each heated for further 15 seconds at 120° C., the image-forming materials did not develop a color. The color densities of the image-forming materials of Comparative Examples 1 to 11 before and after the treatments described above were measured using a Macbeth reflection densitometer (RD918). The results are shown in Table 2.

TABLE 2

|  | Fresh | 120° C., 15 sec. | 150° C., 15 sec. |
| --- | --- | --- | --- |
| Comparative Example 1 | 0.05 | 0.05 | 0.05 |
| Comparative Example 2 | 0.04 | 0.04 | 0.04 |
| Comparative Example 3 | 0.06 | 0.06 | 0.06 |
| Comparative Example 4 | 0.05 | 0.05 | 0.05 |
| Comparative Example 5 | 0.05 | 0.05 | 0.05 |
| Comparative Example 6 | 0.05 | 0.05 | 0.05 |
| Comparative Example 7 | 0.06 | 0.06 | 0.06 |
| Comparative Example 8 | 0.04 | 0.04 | 0.04 |
| Comparative Example 9 | 0.04 | 0.04 | 0.04 |
| Comparative Example 10 | 0.05 | 0.05 | 0.05 |
| Comparative Example 11 | 0.05 | 0.05 | 0.05 |

Based on the results shown in Table 2, it is found that the microcapsules, which enclose the azomethine dye precursor, do not develop a color by themselves even if heated to a predetermined temperature.

Example 12

The image-forming material of Example 12 was obtained in the same way as in Example 1, except that the acid emulsion (1) in Example 1 was replaced by the acid emulsion (3) (the concentration was adjusted based on the acid also acting as a polymerizable compound).

Example 13

The image-forming material of Example 13 was obtained in the same way as in Example 1, except that the acid emulsion (1) in Example 1 was replaced by the acid emulsion (4) (the concentration was adjusted based on the acid also acting as a polymerizable compound).

Example 14

The image-forming material of Example 14 was obtained in the same way as in Example 6, except that the acid emulsion (2) in Example 6 was replaced by the base emulsion (2) (the concentration was adjusted based on the base).

Example 15

The image-forming material of Example 15 was obtained in the same way as in Example 4, except that the acid emulsion (2) in Example 4 was replaced by the oxidizing agent emulsion (2) (the concentration was adjusted based on the oxidizing agent).

Example 16

The image-forming material of Example 16 was obtained in the same way as in Example 3, except that the acid emulsion (2) in Example 3 was replaced by the alkylating agent emulsion (2) (the concentration was adjusted based on the alkylating agent).

(Image formation using the image-forming materials of Examples 12 to 16 and assessment thereof)

The image-forming materials of Examples 12 to 16 obtained above were each exposed to light by using a vacuum printing frame. The exposure was carried out by irradiating the image-forming materials with light of a 500 W xenon lamp for 30 seconds through a step-wedge (having a density difference in step of 0.15 and 1 to 15 density steps, "FUJI STEPGUIDE P" (manufactured by Fuji Photo film Co., Ltd.) to thereby form latent images (latent-image forming step). After the exposure, the image-forming materials having thereon latent images were each heated for 15 seconds by means of a hot plate at 120° C. (step in which the image is made visible).

Color was not developed in the region of the exposed portions irradiated with light of high intensity and the density of developed color dropped in the region of the exposed portions irradiated with light of low intensity. Among the steps where color was not developed, the step number of the step-wedge corresponding to the step of the smallest exposure amount (i.e., clear step number) was determined. The higher the clear step number, the higher the sensitivity of the image-forming material. The results of the clear step number and the results of the saturated density (Dmax) measurements in unexposed portions [measured by Macbeth reflection densitometer (RD918)] are shown in Table 3.

TABLE 3

|  | Clear step number | Dmax |
| --- | --- | --- |
| Example 12 | 10 | 2.1 |
| Example 13 | 9 | 2.0 |
| Example 14 | 10 | 2.1 |
| Example 15 | 10 | 2.1 |
| Example 16 | 9 | 2.0 |

Comparative Examples 12 to 16

When the entire surface of each of the image-forming materials of Examples 12 to 16 was heated for 15 seconds at 120° C. without exposure to light, color was developed in the entire surface. Accordingly, in these embodiment, it is understood that the image-wise exposure is necessary before heating the entire surface.

Example 17

The image-forming material of Example 17 was obtained in the same way as in Example 4, except that the acid emulsion (2) in Example 4 was replaced by the acid emulsion (5) (the concentration was adjusted based on the acid).

Example 18

The image-forming material of Example 18 was obtained in the same way as in Example 17, except that the acid emulsion (5) in Example 17 was replaced by the acid emulsion (6) (the concentration was adjusted based on the acid).

Example 19

The image-forming material of Example 19 was obtained in the same way as in Example 5, except that the acid emulsion (2) in Example 5 was replaced by the base emulsion (3) (the concentration was adjusted based on the base).

Example 20

The image-forming material of Example 20 was obtained in the same way as in Example 9, except that the oxidizing agent emulsion (1) in Example 9 was replaced by the oxidizing agent emulsion (3) (the concentration was adjusted based on the oxidizing agent).

Example 21

The image-forming material of Example 21 was obtained in the same way as in Example 7, except that the acid emulsion (2) in Example 7 was replaced by the alkylating agent emulsion (3) (the concentration was adjusted based on the alkylating agent).

(Image formation using the image-forming materials of Examples 17 to 21 and assessment thereof)

The image-forming materials of Examples 17 to 21 were each subjected to step-wedge-wise exposure by using a 650 nm semiconductor laser, wherein the irradiation energy was varied so that the maximum irradiation energy became 15 mJ/cm$^2$ by changing the scanning speed (latent-image forming step).

When the entire surface of the image-forming layer of each of the image-forming materials having thereon latent images was heated for 15 seconds by means of a hot plate at 120° C., the image-forming materials of Examples 17 to 20 developed a magenta color and the image-forming material of Example 21 developed a cyan color. Thus, step-wedge images were obtained (step in which the image is made visible).

The entire surface of the image-forming layer of each of the image-forming materials of Examples 17 to 21 having thereon images formed was irradiated with light for 30 seconds on a high-intensity schaukasten of 58000 lux. Since this treatment fixed the entire surface of images and decolorized the dye of the photopolymerization initiator by the decomposition thereof, images whose background had a higher level of whiteness were obtained (fixing step).

The saturated density (Dmax) of the image portions and the fogging (Dmin) of the non-image portions (background) of the images thus fixed were measured by Macbeth reflection densitometer (RD918). In addition, at a step, corresponding to the same exposure amount, within the step-wedge images of the image-forming materials, the energy difference between the irradiated energy at the latent-image forming step at that step and the irradiated energy required until the background of the image-forming materials was formed at the fixing step (i.e., "the irradiated energy required until the background was formed at the fixing step"—"the irradiated energy at the latent-image forming step at that step") was measured and calculated. This value was used as an indicator of sensitivity. The smaller the value, the higher the sensitivity. The results of the sensitivity, Dmax, and Dmin are shown in Table 4.

TABLE 4

|  | Sensitivity (mJ/cm$^2$) | Dmax | Dmin (Fogging of background) |
|---|---|---|---|
| Example 17 | 1.2 | 1.8 | 0.06 |
| Example 18 | 1.5 | 1.7 | 0.07 |
| Example 19 | 1.2 | 1.9 | 0.06 |
| Example 20 | 1.3 | 1.8 | 0.06 |
| Example 21 | 1.3 | 1.8 | 0.07 |

Furthermore, the images of the image-forming materials obtained were subjected to irradiation at 0.9 W/m$^2$ for 48 hours in WEATHER-O-METER CI65 (manufactured by Atlas Electric Devices Corp.) for the purpose of assessing the lightfastness. As an indicator of the lightfastness, the ratio of the image density B after 48 hours' irradiation with light to the fresh image density A (B/A×100%) was used. The results are shown in Table 5.

TABLE 5

|  | Lightfastness (B/AX 100)[%] |
|---|---|
| Example 17 | 91 |
| Example 18 | 91 |
| Example 19 | 93 |
| Example 20 | 90 |
| Example 21 | 95 |

As shown in Table 5, almost no fading was observed.

Comparative Example 17

The image-forming material of Comparative Example 17 was obtained in the same way as in Example 18, except that the microcapsule dispersion liquid (3) in Example 18 was replaced by the microcapsule dispersion liquid for comparison (11) (the concentration was adjusted based on the dye precursor).

Comparative Example 18

The image-forming material of Comparative Example 18 was obtained in the same way as in Example 19, except that the microcapsule dispersion liquid (4) in Example 19 was replaced by the microcapsule dispersion liquid for comparison (9) (the concentration was adjusted based on the dye precursor).

Comparative Example 19

The image-forming material of Comparative Example 19 was obtained in the same way as in Example 20, except that the microcapsule dispersion liquid (1) in Example 20 was replaced by the microcapsule dispersion liquid for comparison (8) (the concentration was adjusted based on the dye precursor).

Comparative Example 20

The image-forming material of Comparative Example 20 was obtained in the same way as in Example 21, except that the microcapsule dispersion liquid (6) in Example 20 was replaced by the microcapsule dispersion liquid for comparison (10) (the concentration was adjusted based on the dye precursor).

(Image formation using the image-forming materials of Comparative Examples 17 to 20 and assessment thereof)

The image-forming materials of Comparative Examples 17 to 20 thus obtained were each subjected to the same treatments as in the latent-image forming step and step in which the image is made visible as those described in the section entitled "Image formation using the image-forming materials of Examples 17 to 21 and assessment thereof". The results of the measurement of the saturated density (Dmax) are shown in Table 6.

TABLE 6

| | Dmax |
|---|---|
| Comparative Example 17 | 0.55 |
| Comparative Example 18 | 0.12 |
| Comparative Example 19 | 0.13 |
| Comparative Example 20 | 0.72 |

As can be seen from Table 6, the densities of the developed color were lower relative to the case where the compounds of the present invention were used.

Example 22

The image-forming material of Example 22 was obtained in the same way as in Example 1, except that the microcapsule dispersion liquid (1) in Example 1 was replaced by the microcapsule dispersion liquid (7).

(Image formation using the image-forming material of Example 22 and assessment thereof)

The image-forming material of Example 22 thus obtained was subjected to the same treatment of the latent-image forming step as that described in the section entitled "Image formation using the image-forming materials of Examples 12 to 16 and assessment thereof". In this way, a latent image was formed by exposure to a xenon lamp. Next, the image-forming material having thereon the latent image was passed through pressing rollers at a line pressure of 100 kg/cm to make the image visible (step in which the image is made visible). In this step, the microcapsules exposed to a larger amount of light in the latent-image forming step were not broken but the microcapsules exposed to a smaller amount of light in the latent-image forming step were broken. In this way, a step-wedge image in accordance with the latent image was formed.

Further, the whole image-forming layer of the image-forming material was exposed to light in the same way of fixing step as that described in the section entitled "Image formation using the image-forming materials of Examples 17 to 21 and assessment thereof" so as to bleach the dye used in the polymerization initiator. In this way, the image whose background had a higher level of whiteness was obtained.

Example 23

1) Preparation of a Liquid For Coating a Cyan-color Developing Image-forming Layer A liquid for coating an image-forming layer was prepared in the same way as in Example 18, except the microcapsule dispersion liquid (3) in Example 18 was replaced by the microcapsule dispersion liquid (5). The liquid thus prepared was used as the liquid for coating a cyan-color developing image-forming layer.

2) Preparation of a Liquid For Coating a Magenta-color Developing Image-forming Layer A liquid for coating an image-forming layer was prepared in the same way as in Example 18, except the acid emulsion (6) in Example 18 was replaced by the acid emulsion (7). The liquid thus prepared was used as the liquid for coating a magenta-color developing image-forming layer.

3) Preparation of a Liquid For Coating an Interlayer

A liquid for coating an interlayer was prepared by mixing 4.5 g of a 15% gelatin aqueous solution, 4.5 g of distilled water, and 0.3 g of a 2% aqueous solution of the following surfactant.

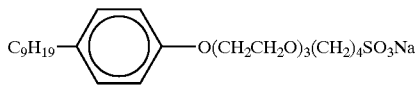

As shown in FIG. 1, a support 1 for print paper, which was prepared by laminating polyethylene on a sheet of fine paper, was coated successively with the above-described liquid for coating a cyan-color developing image-forming layer (layer A 2), liquid for coating an interlayer 3, and liquid for coating a magenta-color developing image-forming layer (layer B 4) in such a manner that the dry coating weight of each image-forming layer became 6 g/m$^2$, and the dry coating weight of the interlayer became 1.5 g/m$^2$. The coating layers were dried successively and an image-forming layer was obtained. Next, the liquid for coating a protective layer 5 was applied onto the image-forming layer in such a manner that the dry coating weight of the protective layer became 2 g/m$^2$, and the coating layer was dried. In this way, the image-forming material of Example 23 was obtained.

The image-forming material of Example 23 was irradiated image-wise with a semiconductor laser having a wavelength of 650 nm and with a fixed laser having a wavelength of 532 nm from the protective layer side so that the maximum irradiation energy of each laser became 15 mJ/cm$^2$ to thereby form a latent image (latent-image forming step). The entire surface of the image-forming layer of the image-forming material having thereon latent images was heated for 10 seconds by means of a hot plate at 105° C. (step in which the image is made visible). After that, the entire surface of the image-forming layer of the image-forming material was irradiated with light for 30 seconds on a high-intensity schaukasten of 58000 lux (fixing step). As a result of this treatment, a vividly colored image with background having a high level of whiteness was obtained. The lightfastness and heat resistance of the image obtained was good.

According to the present invention, it is possible to provide an azomethine dye precursor that is a useful novel compound. More specifically, it is possible to provide an azomethine dye precursor which develops color by the action of a deblocking agent or by the action of heat and a deblocking agent and which, when used in the image-forming layer of an image-forming material, exhibits good color development by a small amount of energy and provides images having very good durability.

Also, according to the present invention, it is possible to provide a single-color or multicolor image-forming material capable of utilizing a variety of light sources emitting light of wavelengths ranging from ultraviolet to near infrared and capable of speedily forming high-quality and highly durable images with a high-sensitivity in a perfectly dry processing system, which does not require a developing solution or the like and does not produce wastes, and to provide an image forming method using the image-forming material.

What is claimed is:

1. An azomethine dye precursor represented by the following general formula (1):

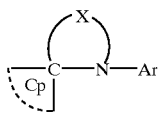

General formula (1)

wherein Ar represents an aryl group or a heterocyclic group which may each have a substituent; X represents a bivalent group linking a carbon atom and a nitrogen atom; and Cp represent a coupler residue which may or may not form a ring.

2. An azomethine dye precursor according to claim 1, wherein Ar is a group represented by the following structural formula (4):

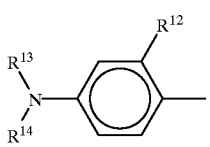

Structural formula (4)

wherein $R^{12}$ represents a substituent; and $R^{13}$ and $R^{14}$ each represents a hydrogen atom, an alkyl group, an aryl group, or a heterocyclic group, with the proviso that the alkyl group, the aryl group, and the heterocyclic group of $R^{13}$ and $R^{14}$ may have a substituent.

3. An azomethine dye precursor according to claim 1, wherein the ring formed by X, N, and C is a 5-membered ring, a 6-membered ring, or a 7-membered ring.

4. An azomethine dye precursor according to claim 1, wherein Cp is an acylacetanilide, a pyrazolotriazole, a pyrazolone, a pyridone, a barbituric acid, apyrrolotriazole, a naphthol, a phenol, or an imidazole.

5. An image-forming material comprising a support having thereon an image-forming layer containing at least one deblocking agent and at least one azomethine dye precursor represented by the following general formula (1):

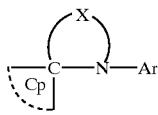

General formula (1)

wherein Ar represents an aryl group or a heterocyclic group which may each have a substituent; X represents a bivalent group linking a carbon atom and a nitrogen atom; and Cp represent a coupler residue which may or may not form a ring.

6. An image-forming material according to claim 5, wherein the deblocking agent is at least one selected from an acid, a base, an oxidizing agent, an alkylating agent, and a metal salt.

7. An image-forming material according to claim 5, wherein any one of the azomethine dye precursor and the deblocking agent is enclosed in microcapsules.

8. An image-forming material according to claim 5, further comprising at least one other image-forming layer containing at least one dye precursor which develops a hue different from that of the azomethine dye precursor.

9. An image-forming material according to claim 5, wherein the image-forming layer further contains at least one photopolymerization initiator and at least one polymerizable compound.

10. An image-forming material according to claim 9, wherein the deblocking agent has a polymerizable group and acts also as a polymerizable compound.

11. An image-forming material according to claim 9, wherein the photopolymerization initiator consists of a dye and a radical generator capable of interacting with the dye so as to generate a radical.

12. An image-forming material according to claim 9, wherein the photopolymerization initiator consists of a dye and an organoboron compound.

13. An image-forming material according to claim 12, wherein the organoboron compound is an organoboron compound represented by the general formula (2):

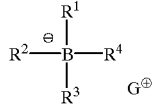

General formula (2)

wherein $R^1$, $R^2$, $R^3$, and $R^4$ each represents an alkyl group, an aryl group, a heterocyclic group, or $—SiR^5R^6R^7$ where $R^5$, $R^6$, and $R^7$ each represents an alkyl group or an aryl group; and $G^+$ represents a group capable of forming a cation.

14. An image-forming material according to claim 8, wherein each of the image-forming layers further contains a photopolymerization initiator consisting of a spectral sensitizing dye having absorption wavelengths which differ from each other and a radical generator capable of interacting with the dye so as to generate a radical.

15. An image-forming method comprising the steps of:
  (a) forming an image-forming material by disposing an image-forming layer on a support, with the image-forming layer containing at least one deblocking agent and at least one azomethine dye precursor represented by the following general formula (1):

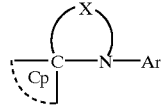

General formula (1)

wherein Ar represents an aryl group or a heterocyclic group which may each have a substituent; X represents a bivalent group linking a carbon atom and a nitrogen atom; and Cp represent a coupler residue which may or may not form a ring;
  (b) producing a visible image by heating and/or pressing the image-forming material.

16. An image-forming method according to claim 15, wherein the step in which the image is made visible includes heating and/or pressing of substantially the entire surface of the image-forming layer of the image-forming material, further comprising the step of:
  a latent-image forming, which precedes the step in which the image is made visible, and in which the image-forming layer containing at least one photopolymerization initiator and at least one polymerizable compound is irradiated image-wise with light which is absorbed by the photopolymerization initiator so that a polymerization initiating species is developed from the photopolymerization initiator in the portions irradiated with the light and the polymerizable compound is polymerized to thereby form a latent image.

17. An image-forming method according to claim 15, wherein the step in which the image is made visible includes heating and/or pressing of substantially the entire surface of the image-forming layer of the image-forming material, further comprising the step of:

a latent-image forming, which precedes the step in which the image is made visible, and in which the multilayer image-forming layers each containing at least one different azomethine dye precursor, at least one different photopolymerization initiator and a polymerizable compound are irradiated image-wise with lights of different wavelengths which are absorbed by the photopolymerization initiator of each of the image-forming layers so that a polymerization initiating species is developed from each photopolymerization initiator in the portions irradiated with the respective light and the polymerizable compound is polymerized to form a latent image and thereby form a multicolor image.

18. An image-forming method according to claim 15, further comprising the step of a fixing in which the image is fixed by irradiating the entire surface of the image-forming layer with light.

* * * * *